US011950279B2

(12) United States Patent
Cirik et al.

(10) Patent No.: US 11,950,279 B2
(45) Date of Patent: Apr. 2, 2024

(54) COMMUNICATION CHANNEL FAILURE DETECTION AND RECOVERY

(71) Applicant: Comcast Cable Communications, LLC, Philadelphia, PA (US)

(72) Inventors: Ali Cirik, Herndon, VA (US); Esmael Dinan, McLean, VA (US); Yunjung Yi, Vienna, VA (US); Hua Zhou, Herndon, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 185 days.

(21) Appl. No.: 17/038,742

(22) Filed: Sep. 30, 2020

(65) Prior Publication Data

US 2021/0100031 A1 Apr. 1, 2021

Related U.S. Application Data

(60) Provisional application No. 62/908,473, filed on Sep. 30, 2019.

(51) Int. Cl.
*H04W 74/08* (2009.01)
*H04W 24/04* (2009.01)
*H04W 74/0808* (2024.01)
*H04W 74/0833* (2024.01)
*H04W 76/19* (2018.01)

(52) U.S. Cl.
CPC ....... *H04W 74/0808* (2013.01); *H04W 24/04* (2013.01); *H04W 74/0833* (2013.01); *H04W 76/19* (2018.02)

(58) Field of Classification Search
None
See application file for complete search history.

(56) References Cited

U.S. PATENT DOCUMENTS

2020/0154480 A1 5/2020 Jose et al.
2021/0068162 A1* 3/2021 Agiwal ................. H04L 5/0023
(Continued)

FOREIGN PATENT DOCUMENTS

EP 3709763 A1 * 9/2020 ............ H04L 41/06

OTHER PUBLICATIONS

Google: "Consistent LBT failure detection and recovery", 3GPP Draft; R2-1910688 Consistent LBT Failure Detection and Recovery, 3rd Generation Partnership Project (3GPP), Mobile Competence Centre ; 650, Route Des Lucioles ; F-06921 Sophia-Antipolis Cedex; France, vol. RAN WG2, No. Prague, Czech Republic; Aug. 26-Aug. 30, 2019 Aug. 15, 2019 (Aug. 15, 2019).
(Continued)

*Primary Examiner* — Kenny S Lin
*Assistant Examiner* — Rodrick Mak
(74) *Attorney, Agent, or Firm* — Banner & Witcoff, Ltd.

(57) ABSTRACT

A wireless device may perform a listen-before transmit (LBT) procedure for an uplink transmission. An LBT failure recovery procedure may be initiated based on a failure of one or more LBT procedures. The LBT failure recovery procedure may be aborted and/or canceled based on one or more conditions, such as receiving configuration (or reconfiguration) parameters, receiving an indication of a bandwidth part switching, deactivating a cell, and/or receiving a request to set (or reset) a communication layer of the wireless device.

20 Claims, 28 Drawing Sheets

(56) References Cited

U.S. PATENT DOCUMENTS

2021/0204345 A1* 7/2021 Shi .................. H04W 76/15
2022/0039016 A1* 2/2022 Terry ............... H04W 52/0235

OTHER PUBLICATIONS

Spreadtrum Communications: "Considerations on UL LBT Failures Handling", 3GPP Draft; R2-1905675, 3rd Generation Partnership Project (3GPP), Mobile Competence Centre ; 650, Route Des Lucioles ; F-06921 Sophia-Antipolis Cedex ; France, vol. RAN WG2, No. Reno, USA; May 13-May 17, 2019 Apr. 30, 2019 (Apr. 30, 2019).
Ericsson: "Running MAC CR for NR-U", 3GPP Draft; R2-1911557_38321_(REL-16)_NRU_Running_MAC_CR, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; Aug. 26-Aug. 30, 2019 Sep. 18, 2019 (Sep. 18, 2019).
Intel Corporation: "Detecting and Handling of UL LBT failures", 3GPP Draft; R2-1907382 Handling of UL LBT Failures_ V02, 3rd Generation Partnership Project (3GPP), Mobile Competence Centre ; 650, Route Des Lucioles ; F-06921 Sophia-Antipolis Cedex ; France, vol. RAN WG2, No. Reno, Nevada, US; May 13-May 17, 2019 May 13, 2019 (May 13, 2019).
VIVO: "Discussion on the Recovery Procedure of the UL LBT Failure", 3GPP Draft; R2-1905626 Discussion on the Recovery Procedure of the UL LBT Failure, 3rd Generation Partnership Project (3GPP), Mobile Competence Centre ; 650, Route Des Lucioles; F-06921 Sophia-Antipo, vol. RAN WG2, No. Reno, USA; May 13-May 17, 2019 May 13, 2019 (May 13, 2019).
Nov. 26, 2020—PCT/US2020/053531—International Search Report and Written Opinion.
3GPP TS 38.213 V15.6.0 (Jun. 2019) 3rd Generation Partnership Project; Technical Specification Group Radio Access Network; NR; Physical layer procedures for control (Release 15).
3GPP TS 38.214 V15.6.0 (Jun. 2019) 3rd Generation Partnership Project; Technical Specification Group Radio Access Network; NR; Physical layer procedures for data (Release 15).
3GPP TS 38.300 V15.6.0 (Jun. 2019) 3rd Generation Partnership Project; Technical Specification Group Radio Access Netwrok; NR; NR and NG-RAN Overall Description; Stage 2 (Release 15).
3GPP TS 38.321 V15.6.0 (Jun. 2019) 3rd Generation Partnership Project; Technical Specification Group Radio Access Network; NR; Medium Access Control (MAC) protocol specation (Relesae 15).
3GPP TS 38.331 V15.6.0 (Jun. 2019) 3rd Generation Partnership Project; Technical Specification Group Radio Access Network; NR; Radio Resorce Control (RRC) protocol specification (Release 15).
R1-190xxxx 3GPP TSG RAN WG1 Meeting #98bis, Chongqing, China Oct. 14-18, 2019, Source: MCC Support, Title: Draft Report of 3GPP TSG RAN WG1 #98 v0.2.0 (Prague, Czech Rep, Aug. 26-30, 2019).
R2-1912001 3GPP TSG RAN WG2 Meeting #107bis, Source: ETSI MCC, Title Report of 3GPP TSG RAN2#107 meeting Prague, Czech Republic.
R2-19xxxxx 3GPP TSG-RAN2 # 107; Prague, Czech Republic, Aug. 26-30, 2019; Title: Running MAC CR for NR-U; Source: Ericsson.
R2-1908693 3GPP TSG-RAN WG2 Meeting #107 Prague, Czech Republic, Aug. 26-30, 2019; Source: vivo, Title: Discussion on the failure detection of the UL transmission.
R2-1908787 3GPP TSG-RAN WG2 Meeting #107 Prague, Czech Republic, Aug. 26-30, 2019; Source: OPPO; Tile: Uplink LBT failure in NR-U.
R2-1909104 3GPP TSG-RAN WG2 Meeting#107 Prague, Czech Republic, Aug. 26-30, 2019; Source: Spreadtrum Communications; Title: Considerations on UL LBT Failures Handling.

R2-1909161 3GPP TSG-WG2 Meeting #107 Prague, Czech Republic, Aug. 26-30, 2019; Source: ZTE Corporation, Sanechips; Title: Frame work for deceting consistent LBT failures.
R2-19xxxxx 3GPP TSG-RAN WG2 Meeting #107 Prague, Czech Republic, Aug. 26-30, 2019, Source: CMCC, Title: Further considerations on LBT failures.
R2-1909554 3GPP TSG-RAN WG2 Meeting #107 Prague, Czech Republic, Aug. 26-30, 2019, Source: Intel Corporation, TitleL Deceting and Handing of UL LBT failures.
R2-1909604 3GPP RAN WG2 Meeting #107 Prague, Czech Republic, Aug. 26-30, 2019, Source: InterDigital, TitleL Handling UL LBT Failures in MAC.
R2-1909956 3GPP TSG-RAN WG2 Meeting#107 Prague, Czech Republic, Aug. 26-30, 2019, Source: ITRI, Title: Detection ofconsistent LBT faliures.
R2-1910091 3GPP TSG-RAN WG2 Meeting #107 Prague, Czech Republic, Aug. 26-30, 2019, Source: Nokia, Nokia Shanghai Bell, Title: UL LBT failure handling.
R2-1910099 3GPP TSG-RAN WG2 Meeting #107, Prague, Czech Republic, Aug. 26-30, 2019, Source: Lenovo, Motorola Mobility, Title: Impact of systematic LBTfailure on UL transmission procedure.
R2-1910688 3GPP TSG-RAN WG2 Meeting #107, Prague, Czech Republic, Aug. 26-30, 2019, Source: Google, Title: Consistent LBT failure dectection and recovery.
R2-1910779 3GPP TSG-RAN WG2 Meeting #107, Prague, Czech Republic, Aug. 26-30, 2019, Source: Ericsson, Title: Handling uplink LBT failures.
R2-1910793 3GPP TSG-RAN WG2 Meeting #107, Prague, Czech Republic, Aug. 26-30, 2019, Source: Ericsson, Title: Draft CR 38300 Overall description of UL LBT failure handling.
R2-19190889 3GPP TSG-RAN WG2 Meeting #107, Prague, Czech Republic, Aug. 26-30, 2019, Source; Qualcomm Incorporated, Title: Report of Email Discussion [106#49][NR-U].
R2-1911059 3GPP TSG-RAN WG2 Meeting#107, Prague, Czech Republic, Aug. 26-30, 2019, Source: ETRI, Title; Consideration on handling consistent UL LBT failures.
R2-1911101 3GPP TSG-RAN WSG2 Meeting #107, Prague, Czech Republic, Aug. 26-30, 2019, Source: Charter Communications, Title: Handling of Persisitentn LBT Failures in NR-U.
R2-1911167 3GPP TSG-RAN WG2 Meeting#107, Prague, Czech Republic, Aug. 26-30, 2019, Source: Huawei, HiSilicon, Title: Discussion on hadling of consistent UL LBT failure.
R2-1911168 3GPP TSG-RAN WG2 Meeting#107, Prague, Czech Republic, Aug. 26-30, 2019, Source: Huawei, HiSilicon [to be RAN2], Title: LS on UL LBT failure.
Xxxxxx 3GPP TSG-RAN WG2 Meeting#107, Prague, Czech Republic, Aug. 26-30, 2019, Source: Huawei, HiSlicon, Title: TP on stage-2 for handling of consistent UL LBT failure.
R2-1911195 3GPP TSG-RAN WG2 Meeting #107, Prague, Czech Republic, Aug. 26-30, 2019, Source: LG Electronics Inc., Title: Recovery from the consistent uplink LBT failure.
R2-1911196 3GPP TSG-RAN WG2 Meeting#107, Prague, Czech Republic, Aug. 26-30, 2019, Source: LG Electronics Inc., Title: Dettection of the consistent uplink LBT failures.
R2-1911197 3GPP TSG-RAN WG2 Meeting#107, Prague Czech Republic, Aug. 26-30, 2019, Source: LG Electronics Inc. [TSG RAN WG2], Title: LS on handling of the consistent LBT failures.
R2-190xxxx 3GPP TSG-RAN WG2 Meeting#106, Reno, USA, May 13-17, 2019, Source: R2 Vice Chairman (Mediatek), Title: Breakout Session Notes NRUP IAB IIOT NR-U.
R2-1910404, 3GPP TSG-RAN WG2 Meeting #107, Prague, Czech Republic, Aug. 26-30, 2019, Source: ZTE, Sanechips, Title: Consideration on Beam Failure Recovery on SCell.
R2-1907055, 3GPP TSG-RAN WG2 Meeting #106, Reno, USA, May 13-17, 2019, Source: MediaTek Inc., Title: Actions upon consistent UL LBT failures in MAC.
May 30, 2023—Japanese Office Action—JP App. No. 2022-519433.

* cited by examiner

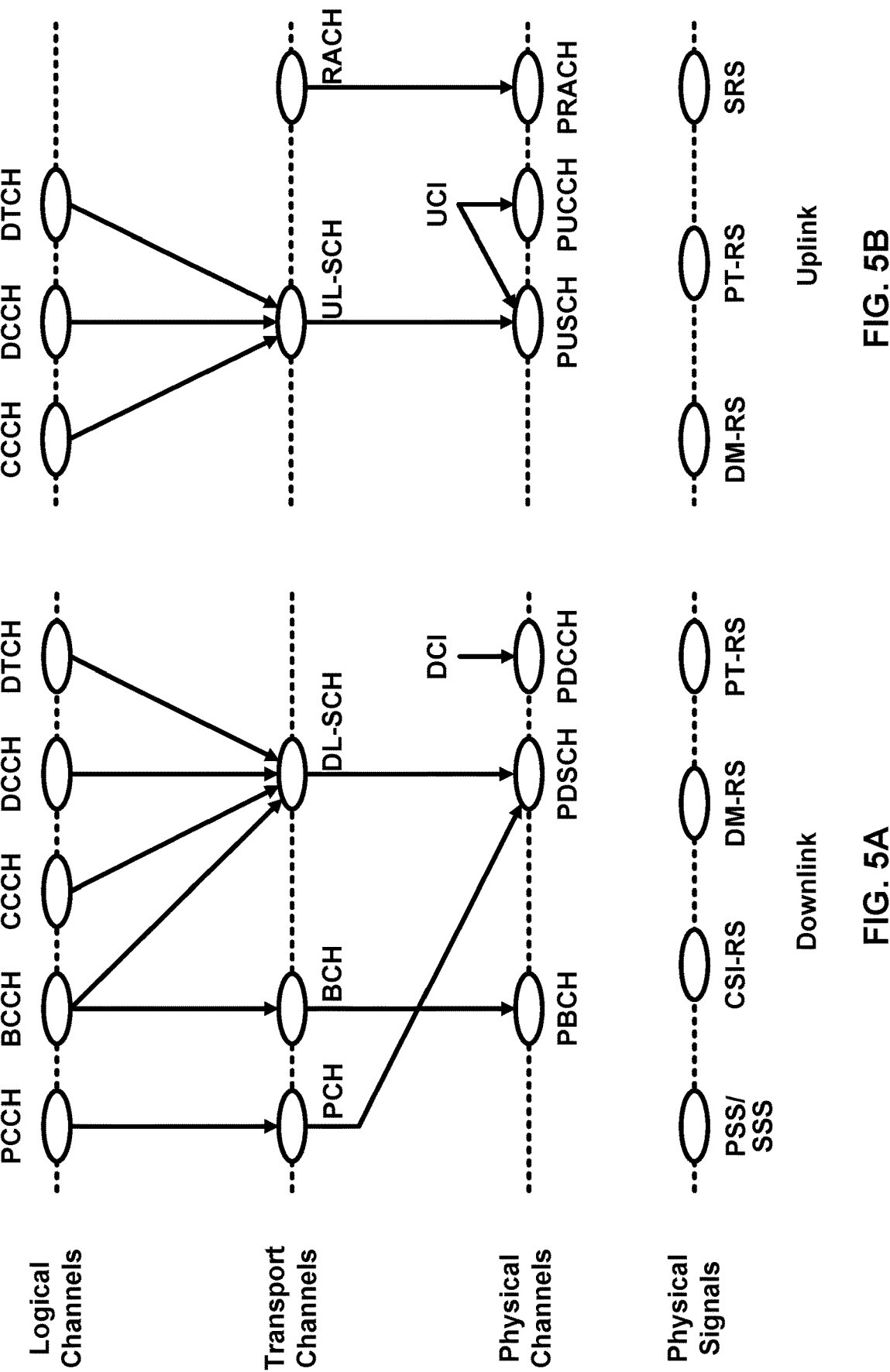

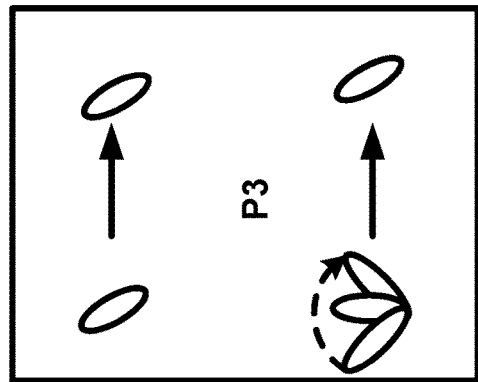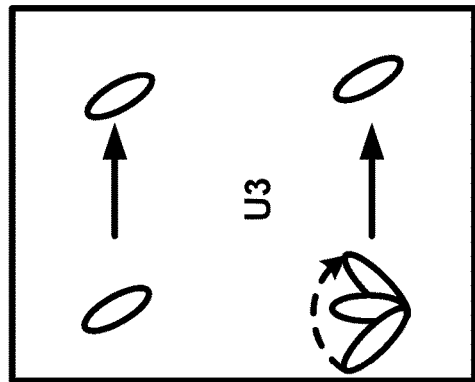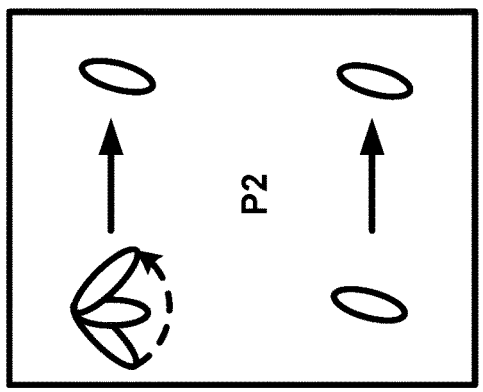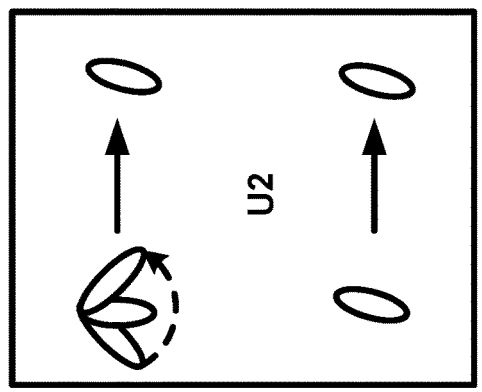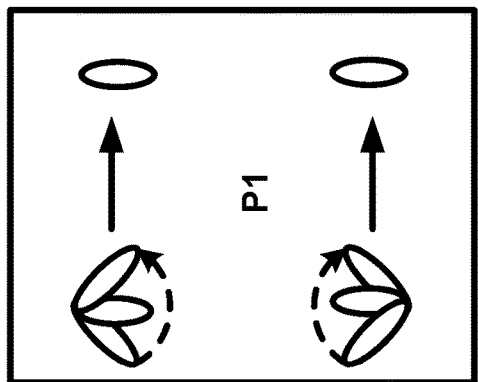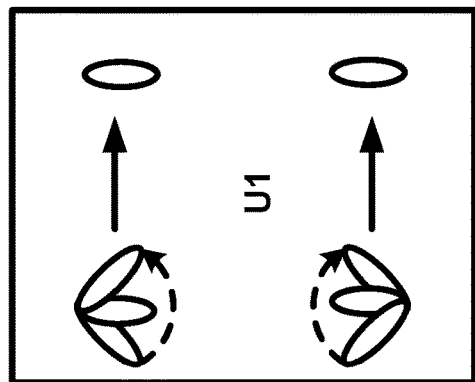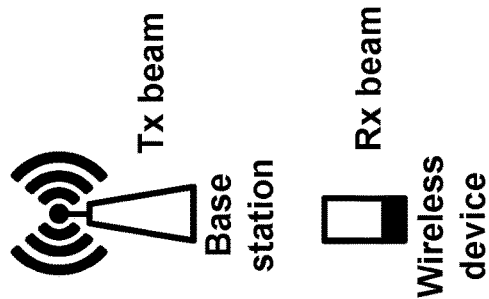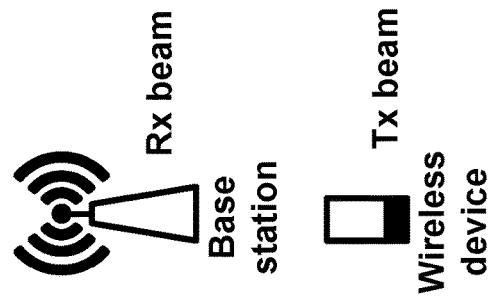
FIG. 12A
FIG. 12B

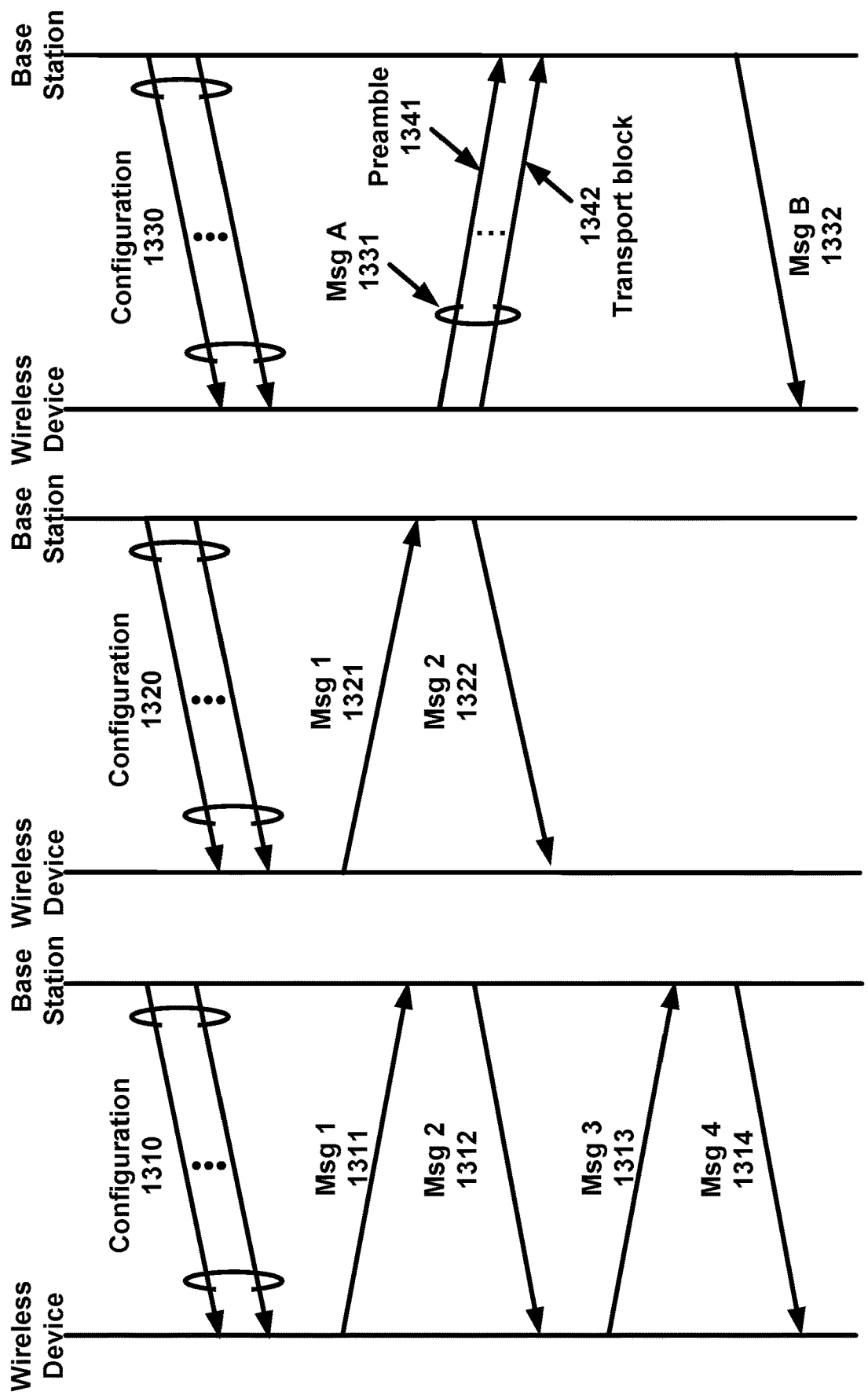

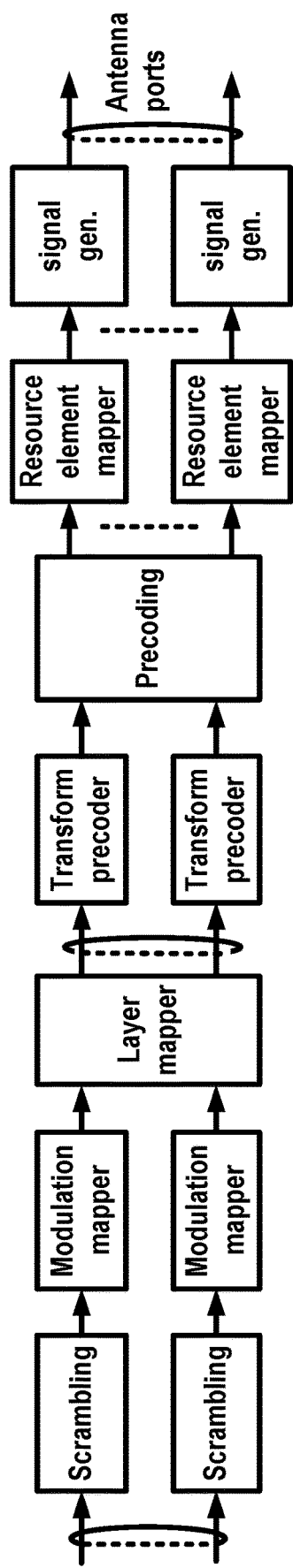
FIG. 16A
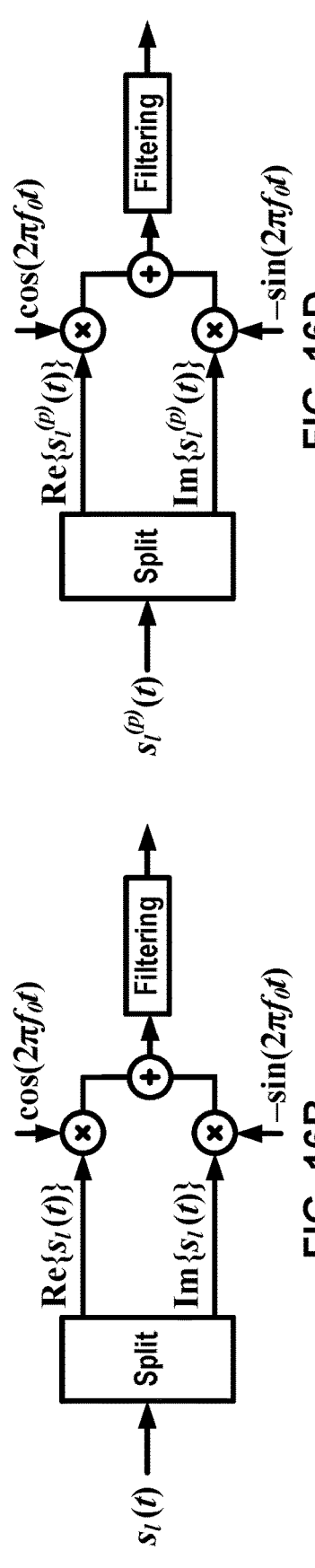
FIG. 16B
FIG. 16D
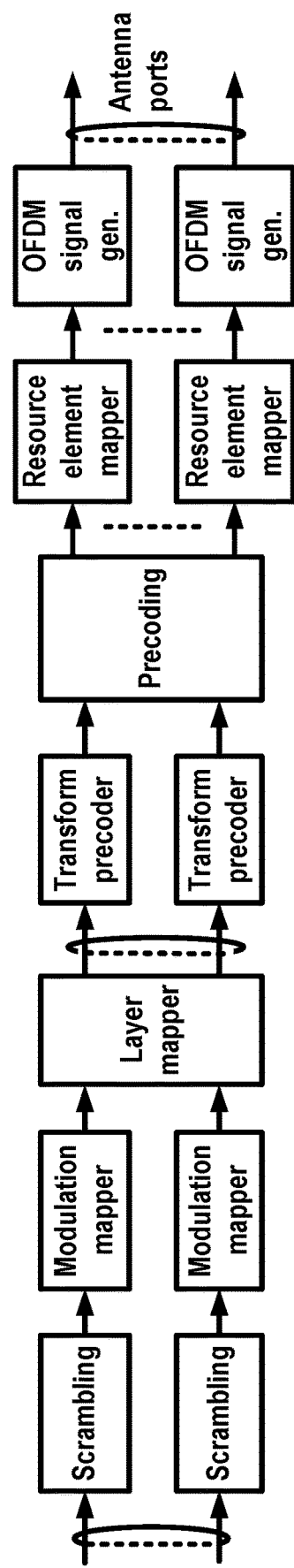
FIG. 16C

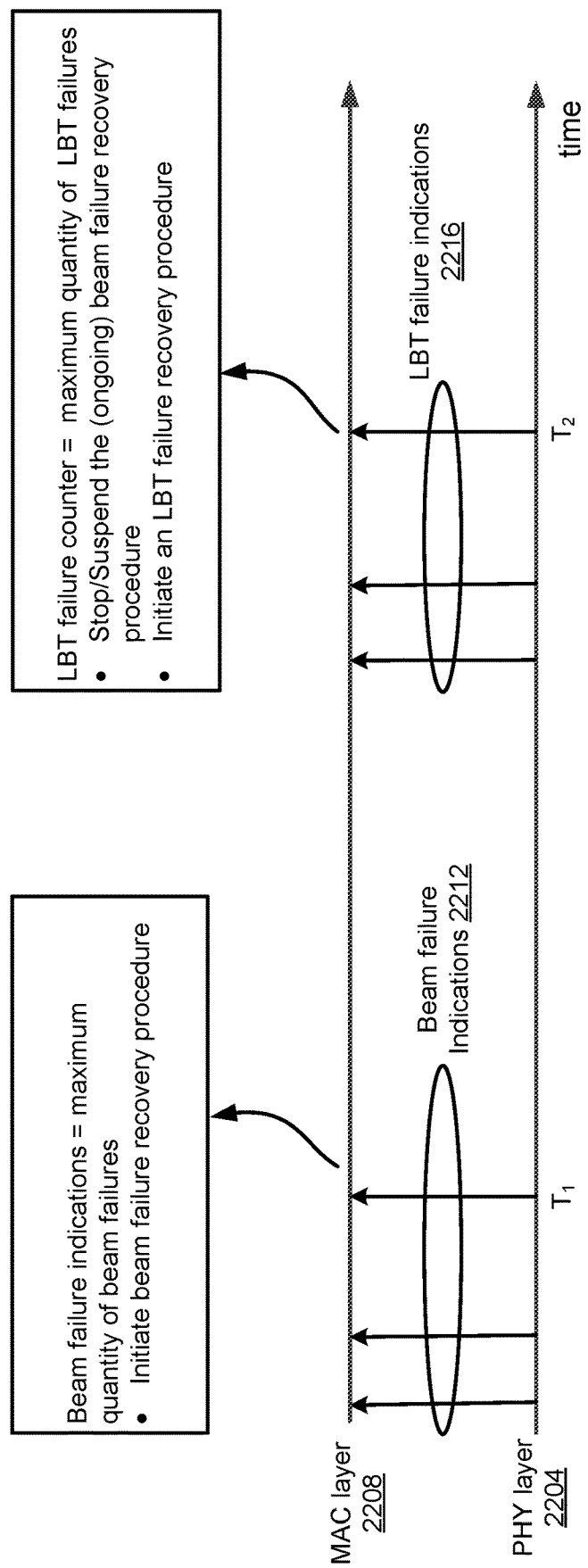
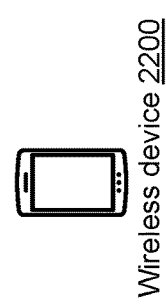
FIG. 22

COMMUNICATION CHANNEL FAILURE DETECTION AND RECOVERY

CROSS-REFERENCE TO RELATED APPLICATIONS

This application claims the benefit of U.S. Provisional Application No. 62/908,473, filed on Sep. 30, 2019. The above-referenced application is hereby incorporated by reference in its entirety.

BACKGROUND

Multiple communication devices use a same communication channel for transmission and/or reception of signals. A communication device determines channel availability for transmission of signals to avoid interfering with communications from other communication devices.

SUMMARY

The following summary presents a simplified summary of certain features. The summary is not an extensive overview and is not intended to identify key or critical elements.

Wireless communications may be sent and/or received via one or more communication channels. Communications via a communication channel may be initiated based on a determination that the communication channel is available and/or not occupied. For example, a wireless device may not send a signal via a communication channel if the channel is determined to be occupied and/or unavailable. The wireless device may repeat one or more operations (e.g., such as a listen-before-talk procedure) to determine occupancy and/or availability of the channel, which may delay transmission of a signal via the channel. Based on one or more determinations of an occupancy and/or an unavailability of the communication channel, the wireless device may initiate a failure recovery procedure (e.g., such as a listen-before-talk failure recovery procedure). The failure recovery procedure may delay transmission of a signal by the wireless device. The failure recovery procedure may be aborted and/or canceled, based on one or more conditions, which may reduce delay of a transmission of a signal by the wireless device and/or reduce the likelihood that the wireless device sends and/or receives messages based on an incorrect and/or inefficient communication configuration. Various examples described herein may enable a wireless device to establish a communication via a channel using failure detection and recovery procedures that may provide advantages such as reduced power consumption, reduced interference, and/or reduced delay.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 22 shows example communication for an LBT failure recovery and a beam failure recovery.

DETAILED DESCRIPTION

Figure 1A:
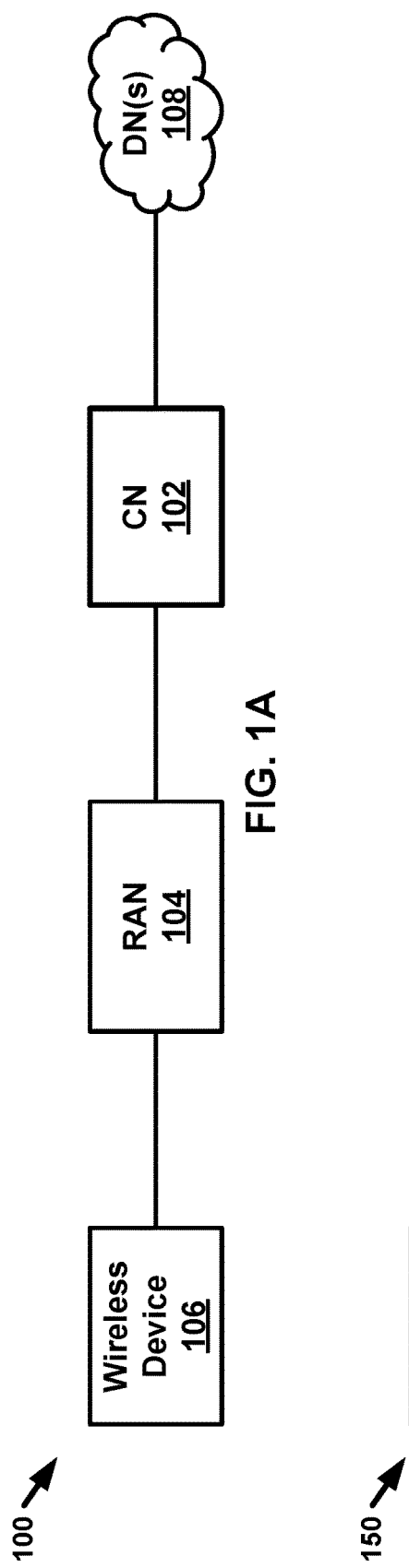
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to communication channel failure detection and recovery.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
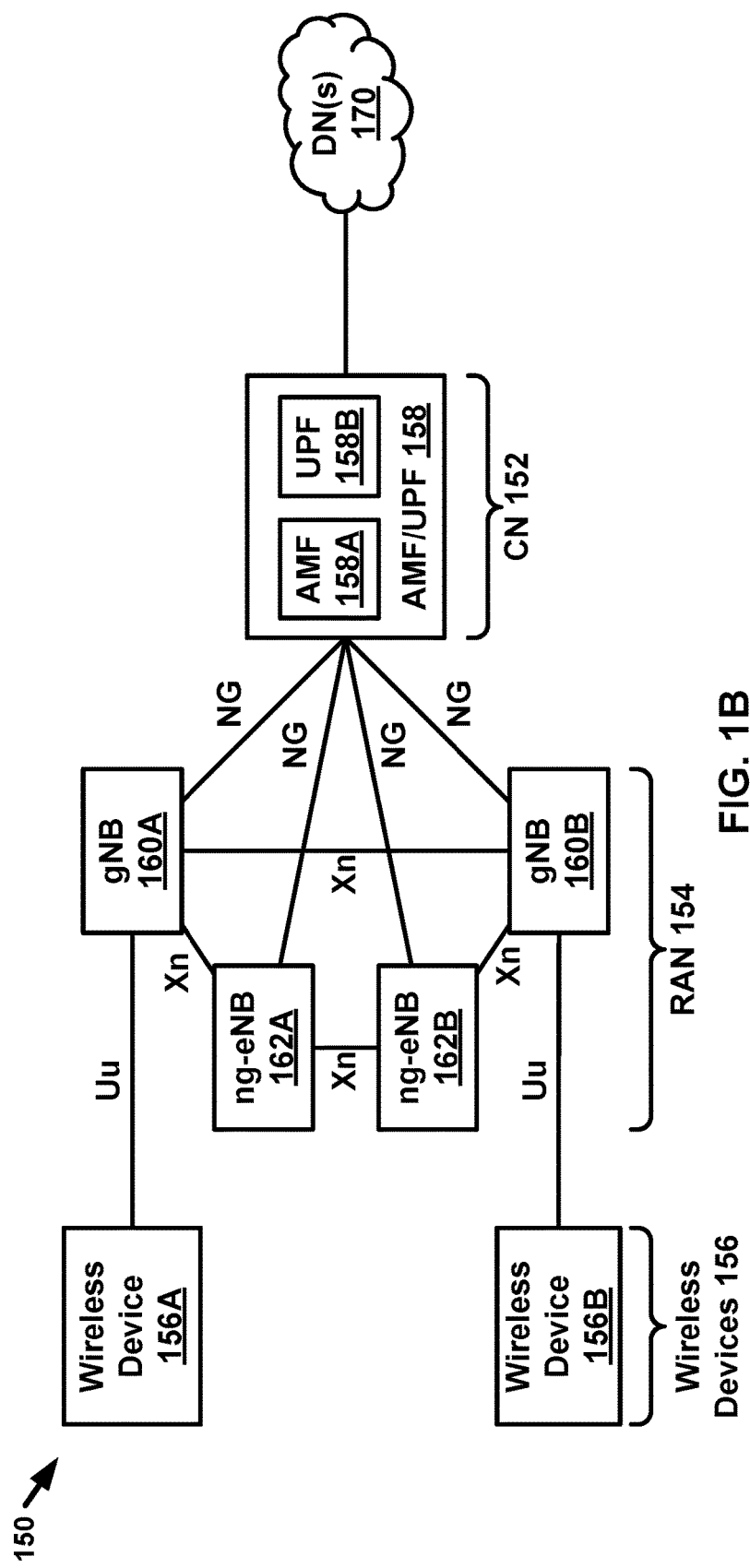

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
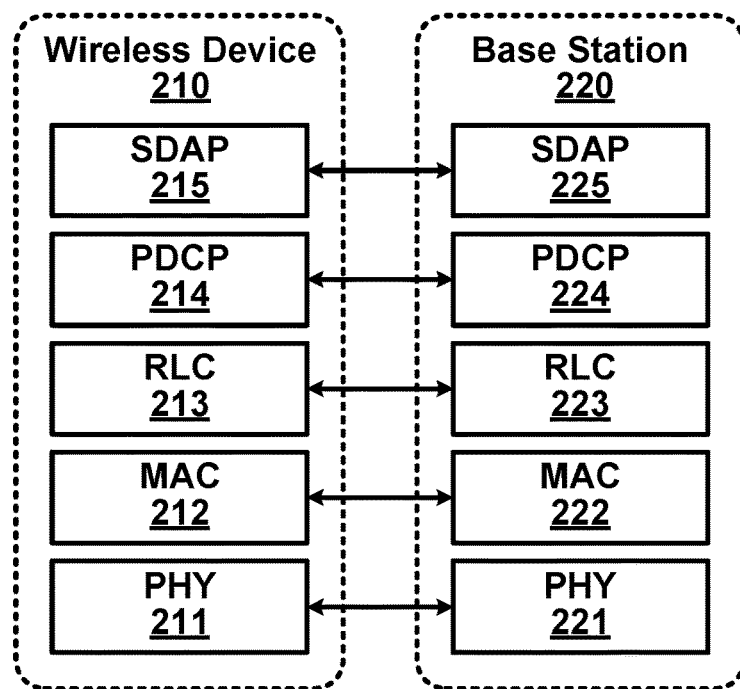
FIG. 2A shows an example user plane.
Figure 2B:
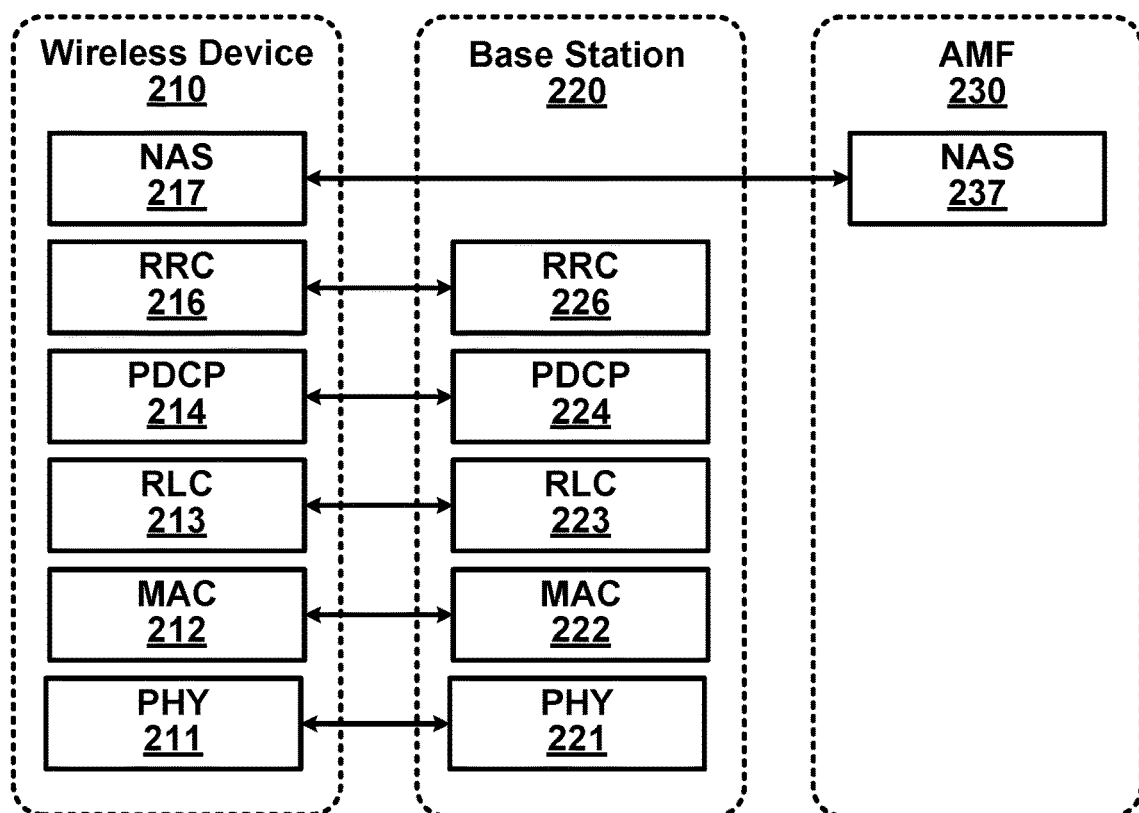
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
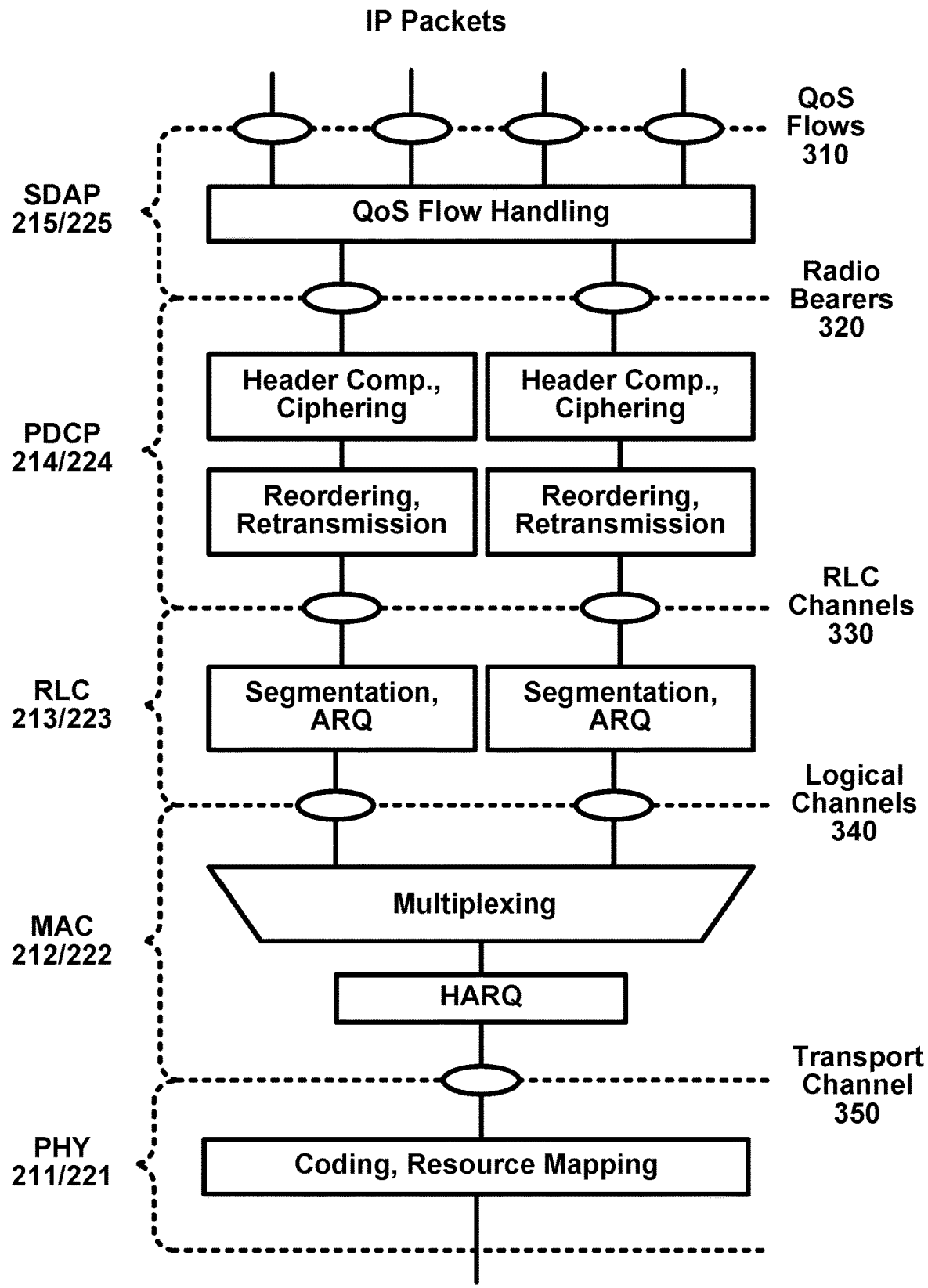
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/ or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
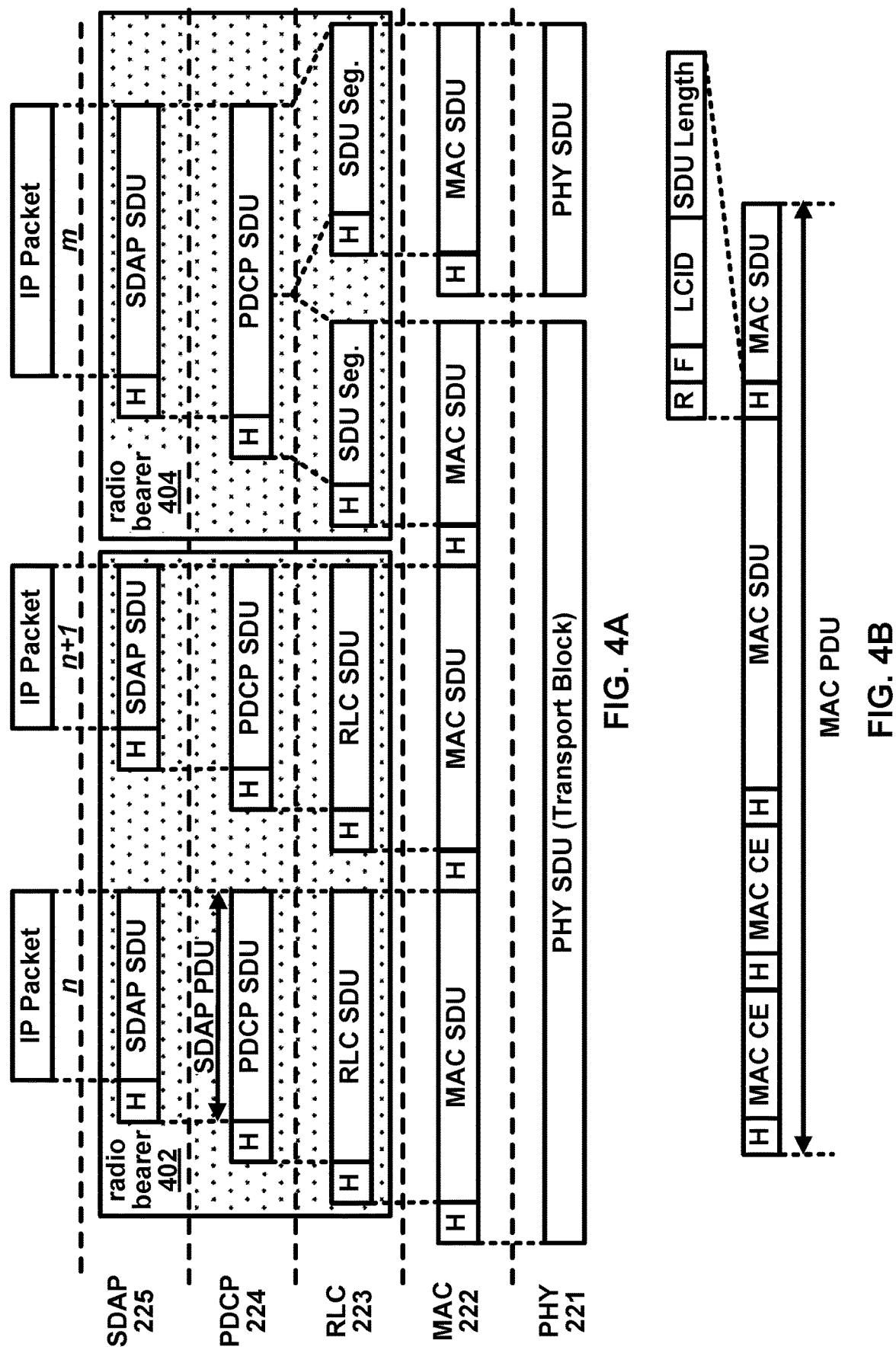
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol laters may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
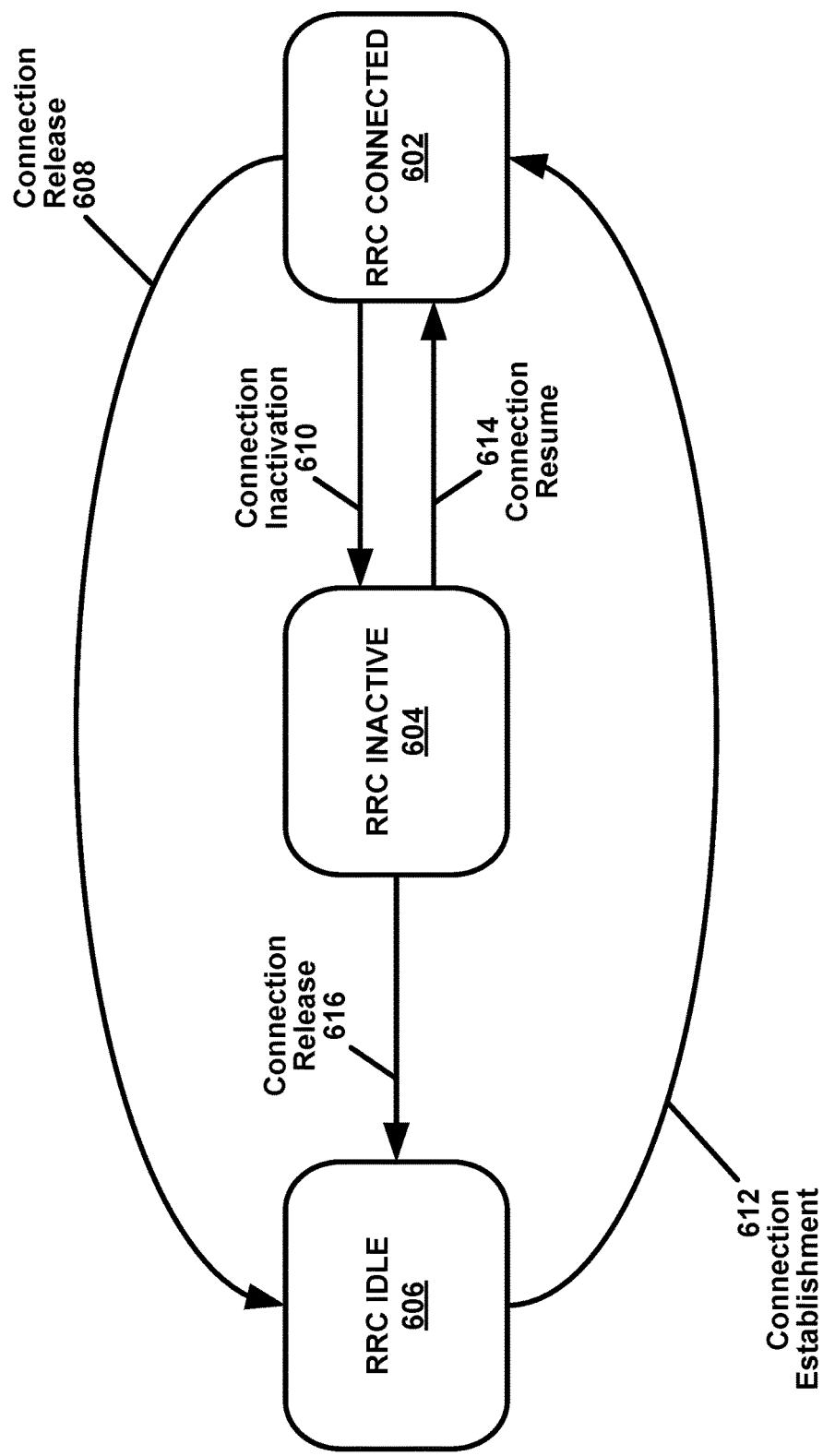
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_I-NACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
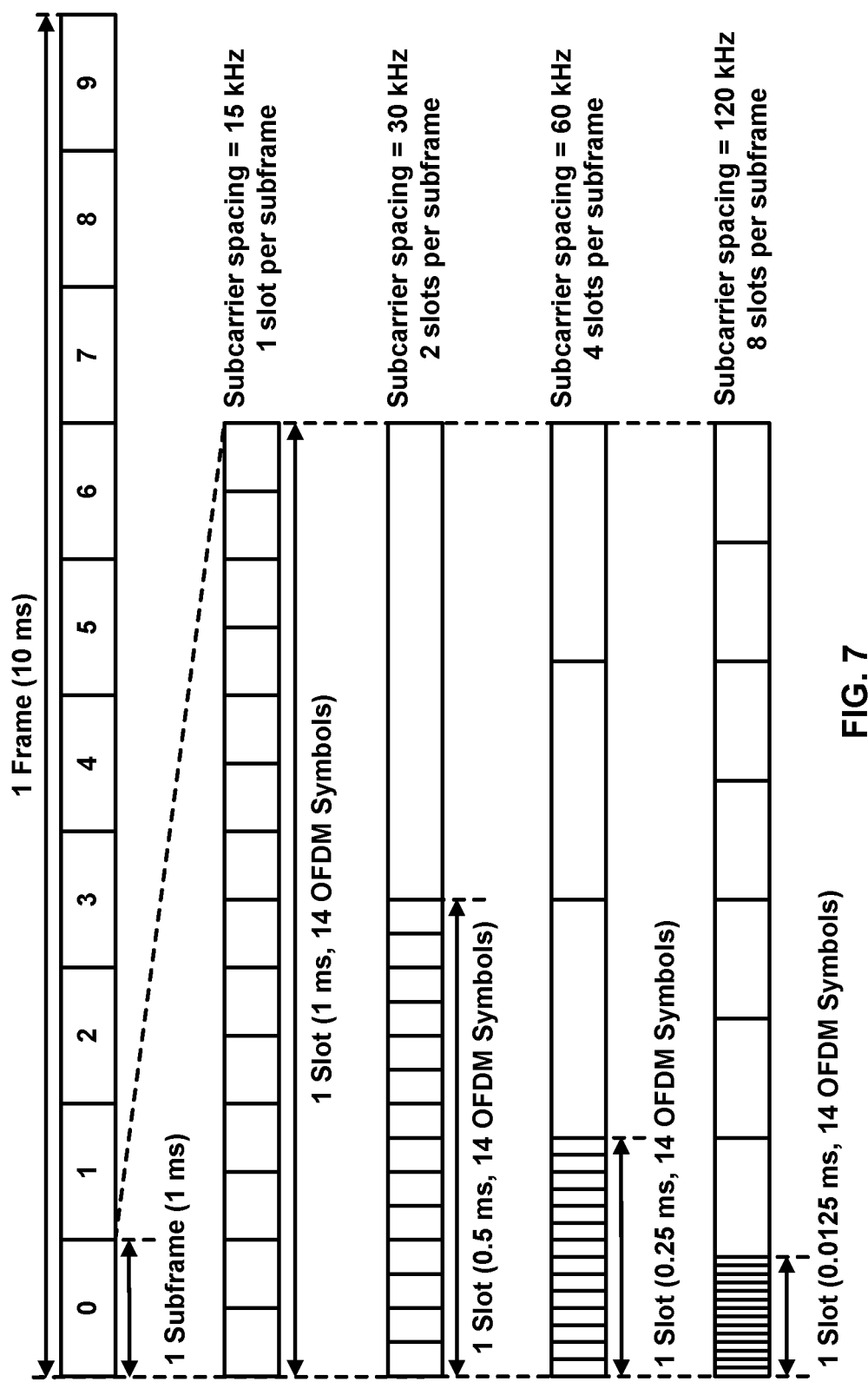
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
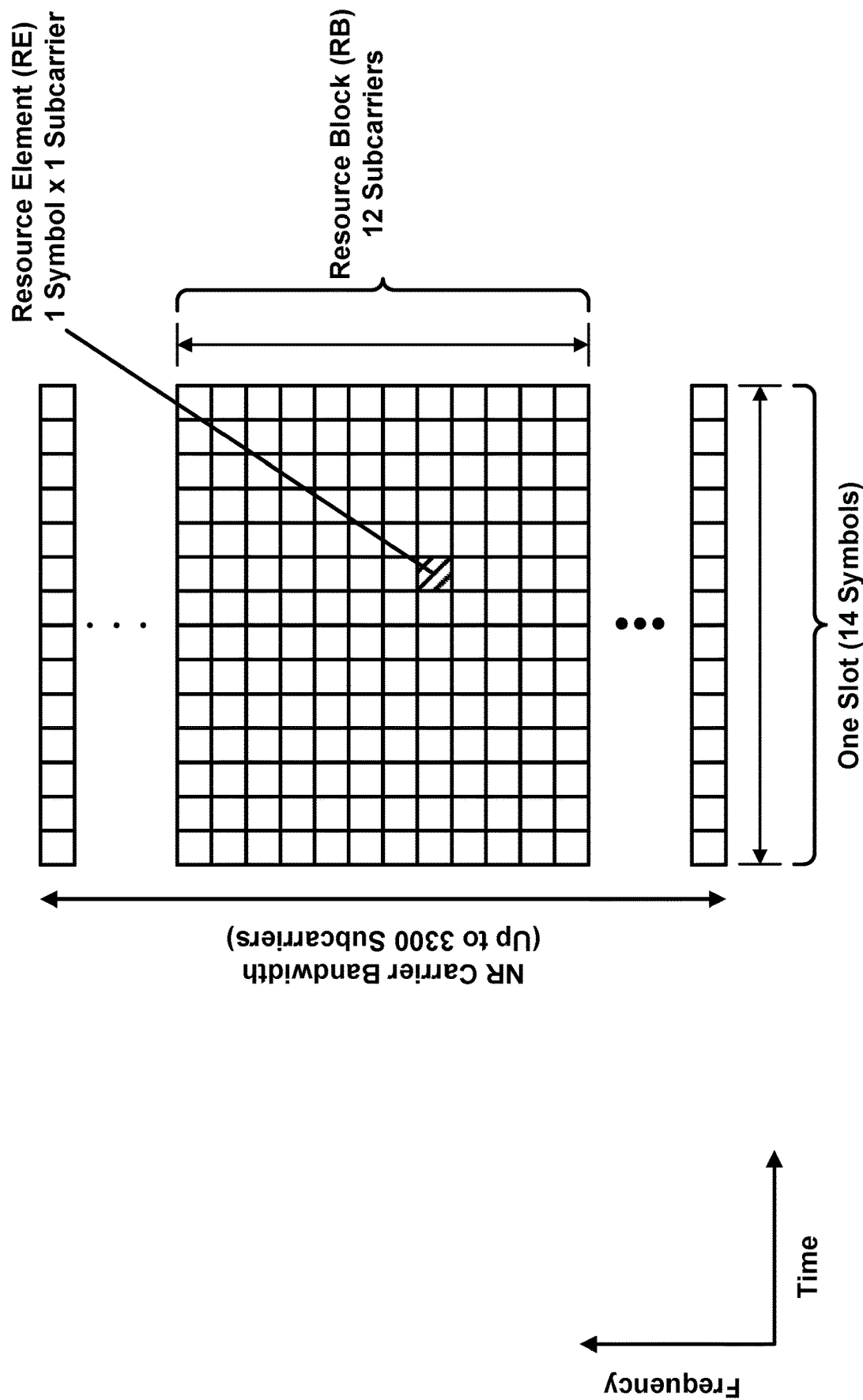
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
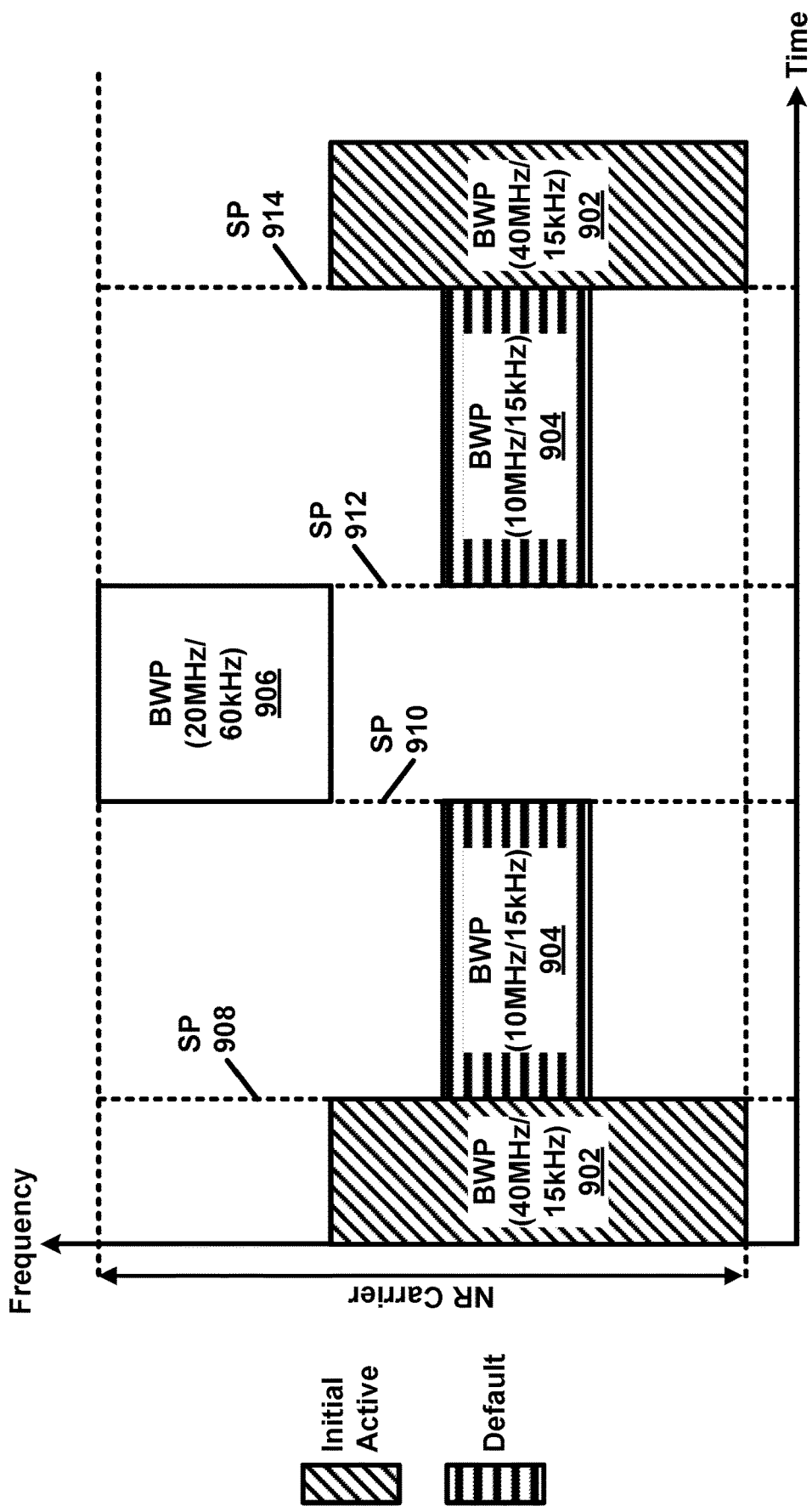
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
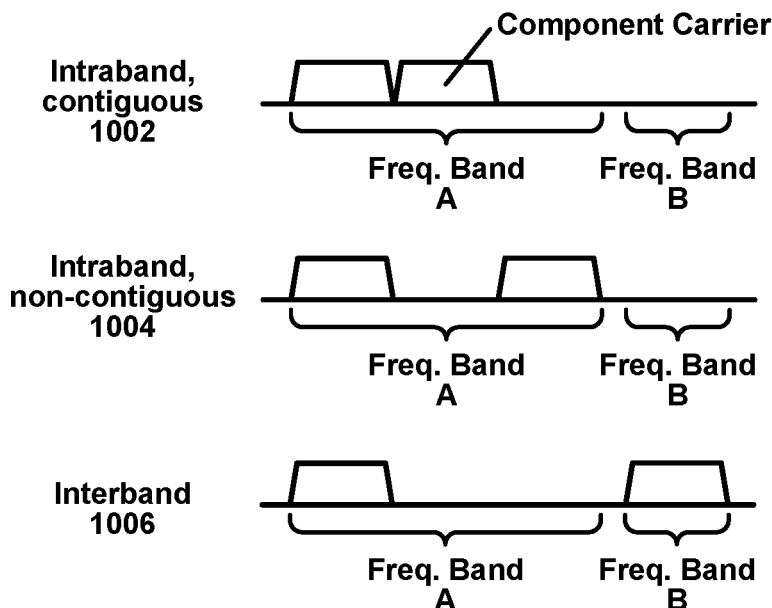
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
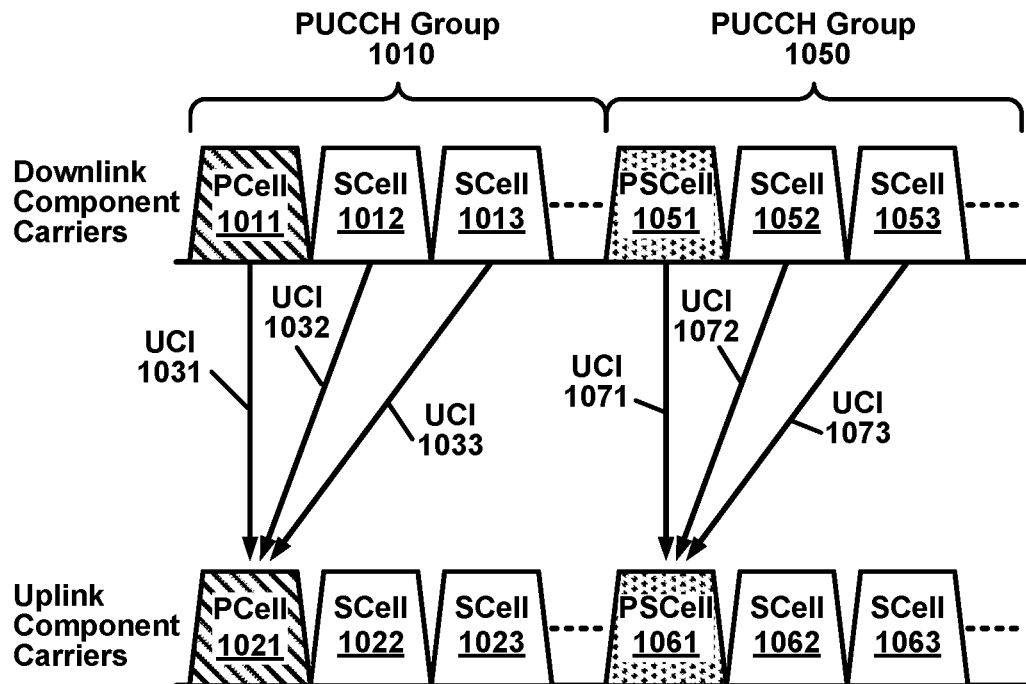
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
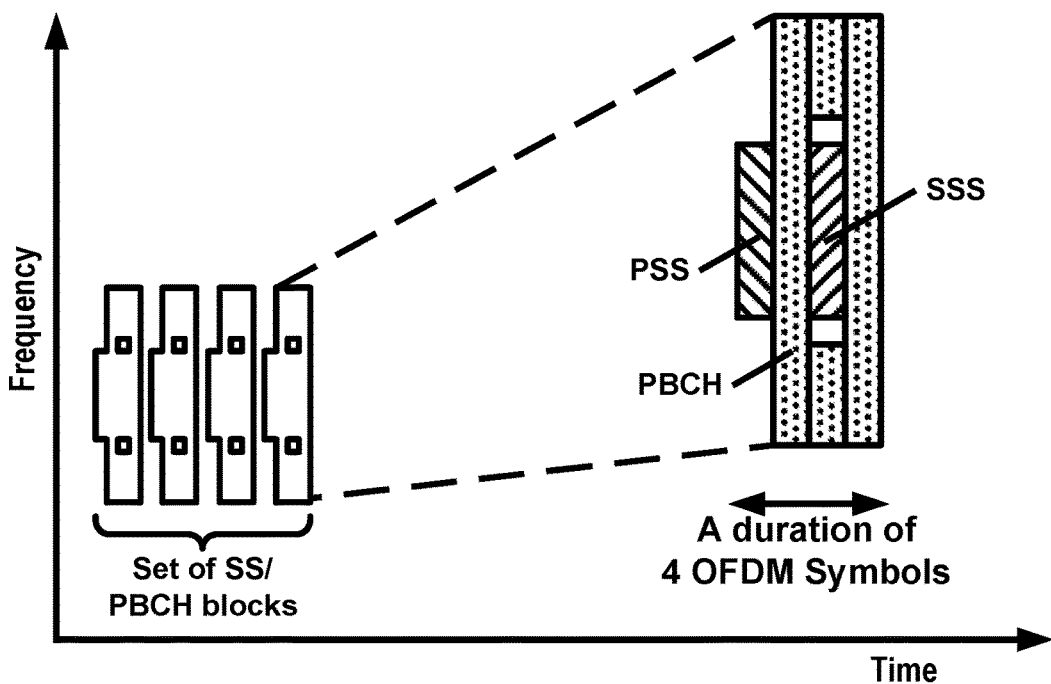
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
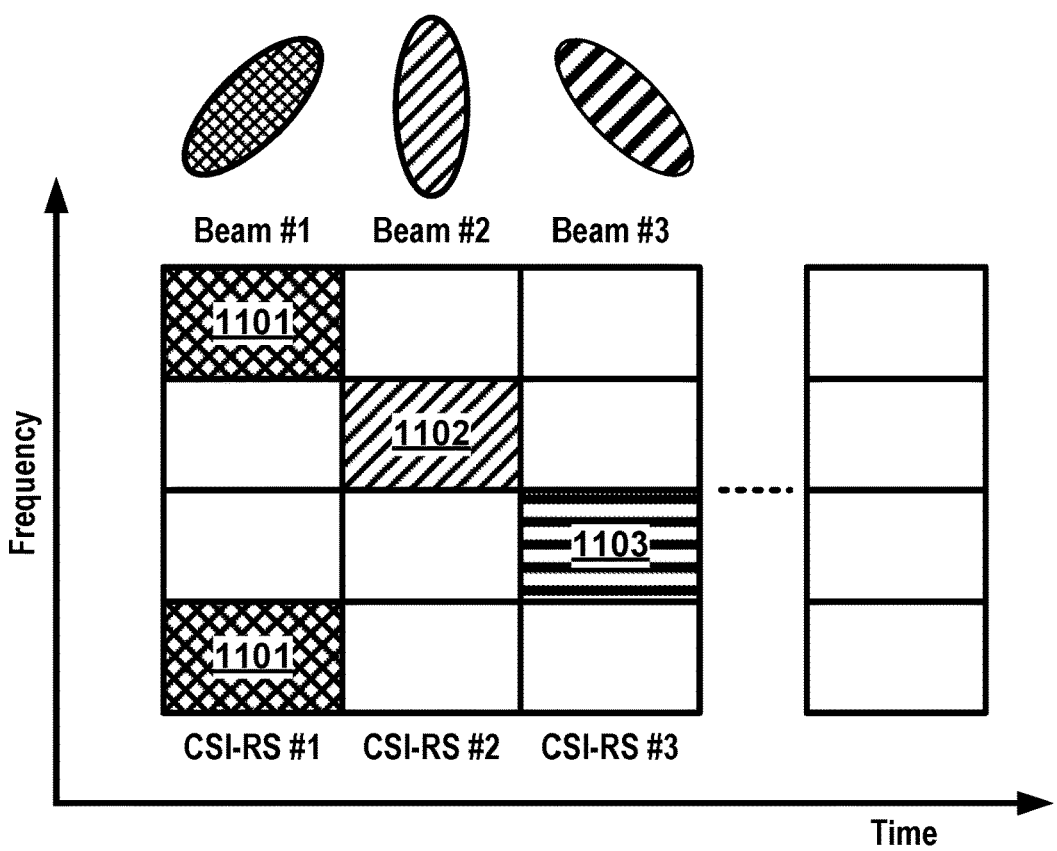
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0<s_id<14), t_id may be an index of a first slot of the PRACH occasion in a system frame (e.g., 0<t_id<80), f_id may be an index of the PRACH occasion in the frequency domain (e.g., 0<fid<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/ or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
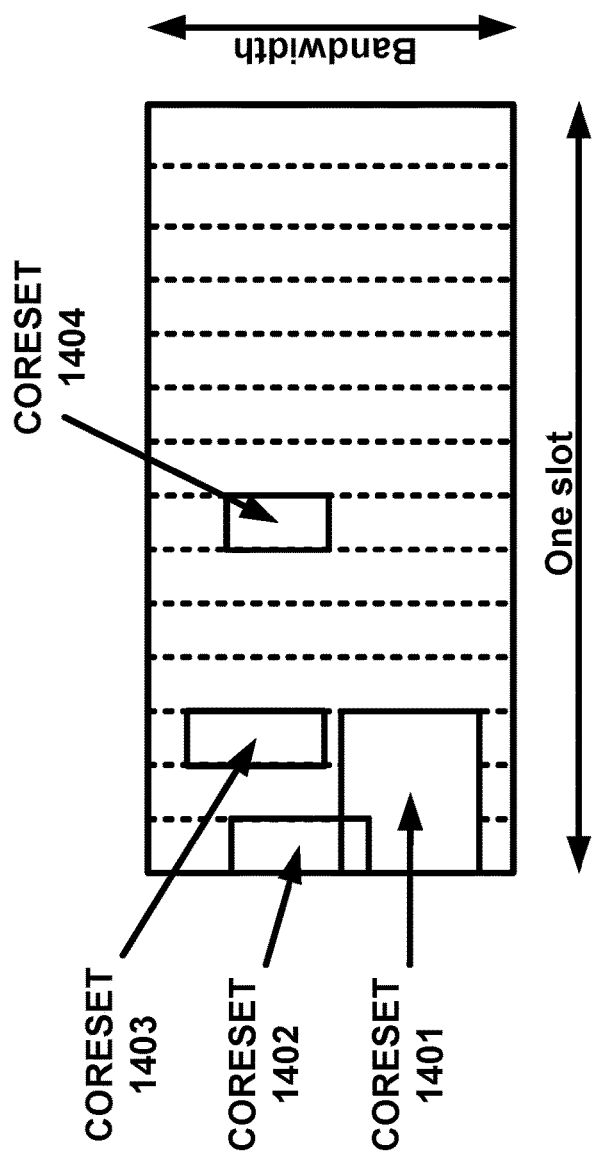
FIG. 14A shows an example of control resource set (CORESET) configurations.

FIG. 14A shows an example of CORESET configurations. The CORESET configurations may be for a bandwidth part or any other frequency bands. The base station may send/ transmit DCI via a PDCCH on one or more control resource sets (CORESETs). A CORESET may comprise a time-frequency resource in which the wireless device attempts/ tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
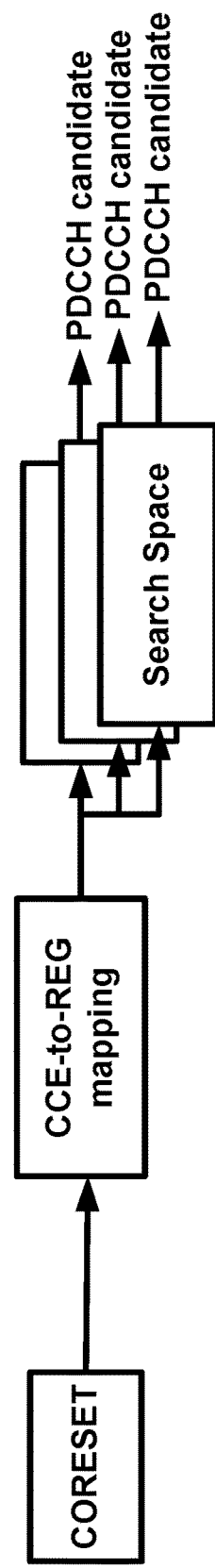
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
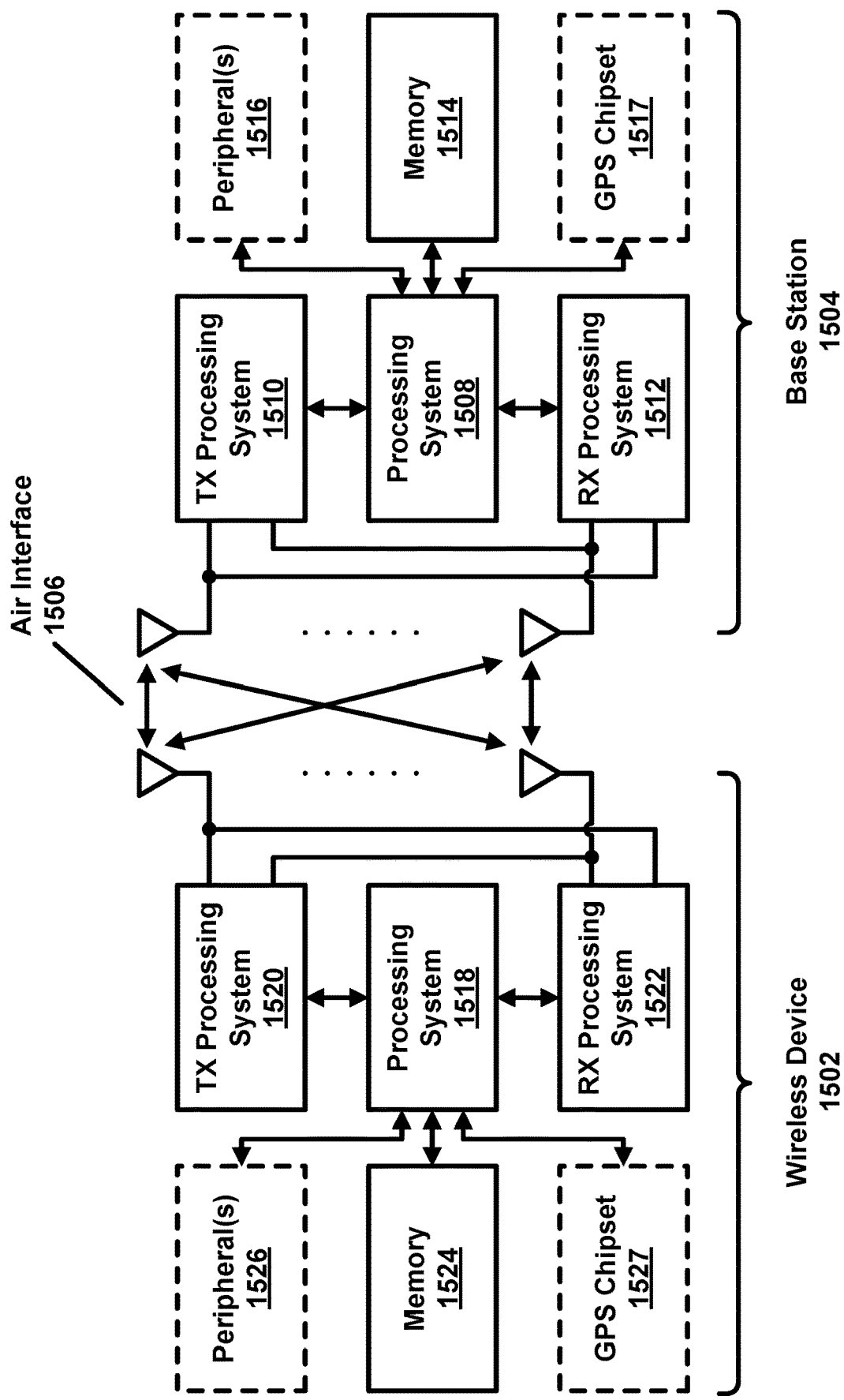
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG.

1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multiuser MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
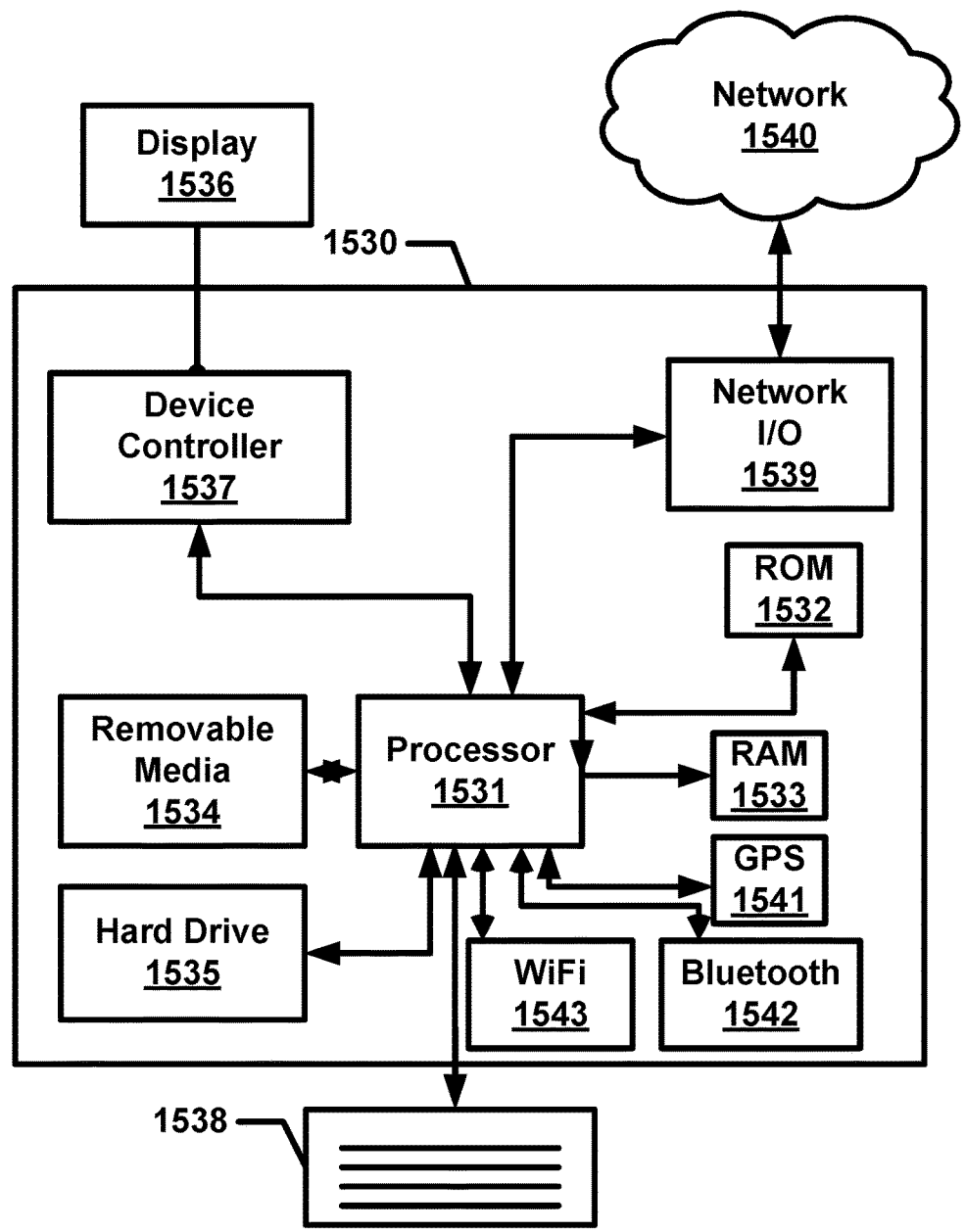
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless communications may use complimentary access technology. Complementary access technology may comprise a combination of two or more access technologies. At least some types of wireless communications (e.g., compatible with 3GPP Release 16, earlier/later 3GPP releases or generations, and/or other access technology) may be enabled with interworking solutions that may allow usage of resources (e.g., an unlicensed spectrum) corresponding to other type(s) of wireless communications (e.g., WLAN, and/or other access technology). Complementary access technology that utilizes unlicensed spectrum may be deployed to meet wireless traffic usage and/or growth. Unlicensed spectrum, if available, may be an effective complement to licensed spectrum and/or may help in addressing high traffic in at least some scenarios (e.g., in areas that may be serviced by hotspots and/or other access points). For example, licensed assisted access (LAA) and/or new radio on unlicensed band(s) (NR-U) may enable the use of unlicensed spectrum for wireless communications (e.g., using 3GPP Release 16, earlier/later 3GPP releases or generations, LTE access technology, and/or other access technology). Usage of unlicensed spectrum may optimize network efficiency and improve network capacity, among other advantages.

A wireless device may use a listen-before-talk (LBT) procedure for communication in a cell configured in an unlicensed band (e.g., which may be referred to as an LAA cell and/or a NR-U cell) and/or a licensed band. An LAA cell and/or NR-U cell may refer to any cell operating in unlicensed band. The cell may operate as a non-standalone cell comprising an anchor cell operating in licensed band, or may operate as a standalone cell without an anchor cell in licensed band. The LBT procedure may comprise a clear channel assessment (CCA). Equipment (e.g., wireless devices and/or other computing devices) may perform a CCA, for example, before using a channel in an LBT procedure. The CCA may utilize at least energy detection to determine presence or absence of other signals on a channel. The presence of other signals on the channel (e.g., an indication of a signal power level above a threshold) may indicate that the channel is occupied. The absence of other signals on the channel (e.g., an indication of a signal power level below a threshold) may indicate that the channel is clear. Usage of LBT may vary based on country-specific, regional-specific, and/or other area regulations and/or requirements. For example, European and Japanese regulations mandate the usage of LBT in the unlicensed bands (e.g., in the 5 GHz unlicensed band). Carrier sensing using LBT may be used for fair sharing of an unlicensed spectrum.

Discontinuous transmission on an unlicensed carrier may be enabled with a limited maximum transmission duration. Some functions may be supported by one or more signals sent (e.g., transmitted), for example, during (e.g., at the beginning of) a discontinuous downlink transmission in the unlicensed band Channel reservation may be enabled by transmission of signals, by an NR-U node, for example, based on (e.g., after) gaining channel access via a successful LBT procedure. Channel reservation may enable other nodes to determine that the channel is occupied based on receiving the transmitted signal with energy that is above a certain threshold. Procedures (e.g, functions) that may be supported by one or more signals for operation in unlicensed band with discontinuous downlink transmission may comprise one or more of the following: detection of the downlink transmission in an unlicensed band (including cell identification) by wireless devices, time and frequency synchronization of a wireless devices, etc.

An LBT procedure may be performed for various wireless communications. An LBT procedure may be used, for example, for coexistence (e.g., fair and friendly coexistence) of wireless communications (e.g., using multiple different access technologies, such as an LTE access technology, an NR access technology, and/or any other access technology) with communications in unlicensed spectrum (e.g., communications corresponding to other operators and/or other access technologies). LBT procedures on a node attempting to transmit on a carrier (or a channel) in an unlicensed spectrum may require the node to perform a CCA to determine if the channel is free for use. An LBT procedure may comprise at least wireless signal energy detection to determine if the channel is being used. Regulatory requirements in some regions (e.g., Europe) may specify an energy detection threshold such that if a measured energy on a carrier (or a channel) is greater than this threshold, the node may assume that the channel is not free (e.g., the channel is being used by other node(s)). A node may optionally use a lower threshold for energy detection than that specified by regulatory requirements. Some communications (e.g., NR-U communications) may adaptively change the energy detection threshold. For example, communications (e.g., NR-U communications) may adaptively lower the energy detection threshold from an upper bound. Adaptation of a threshold may comprise static and/or semi-static determination of the threshold. Category 4 LBT procedures and/or other type of LBT procedures may be used.

Various example LBT procedures may be used. An LBT procedure may not be used by a transmitting entity, for example, for transmission of some signals, in at least some implementation scenarios, in at least some situations, and/or for transmission in at least some frequencies. Category 1 LBT procedure (CAT1, e.g., no LBT procedure) may be used in one or more cases. A wireless device may perform an uplink transmission without an LBT procedure in a channel in an unlicensed band, for example, if the channel is held by a base station for downlink transmissions, and the wireless device takes over the channel for uplink transmission. Category 2 LBT procedure (CAT2, e.g., LBT procedure without random back-off) may be used. A duration of time for which a channel is to be sensed to be idle (e.g., by a wireless device, by a base station) before a transmitting entity may send/transmit data may be deterministic. Category 3 LBT procedure (CAT3, e.g., an LBT procedure with random back-off with a contention window of fixed size) may be used. The LBT procedure may have the following procedure as at least one of its components. A transmitting entity (e.g., a wireless device, a base station) may select a random number N within a contention window. A size of the contention window may be specified by the minimum and maximum value of N. A size of the contention window may be fixed. The random number N may be used in the LBT procedure to determine the duration of time that the channel is to be sensed to be idle before the transmitting entity may send/transmit data in the channel Category 4 LBT procedure (CAT4, e.g., an LBT procedure with random back-off with a contention window of variable size) may be used. A transmitting entity (e.g., a wireless device, a base station) may select a random number N within a contention window. The size of contention window may be specified by a minimum and maximum value of N. The transmitting entity may vary the size of the contention window and select the random number N within the contention window. The random number N may be used in the LBT procedure to determine a duration of time that the channel is to be sensed to be idle before the transmitting entity may send/transmit data in the channel.

A wireless device may use an uplink LBT procedure for uplink transmissions on an unlicensed band. The uplink LBT procedure may be different from a downlink LBT procedure. The uplink LBT procedure and the downlink LBT procedure may use different LBT protocols and/or parameters. For example, the uplink LBT procedure may be based on scheduled access that may affect a wireless device's channel contention opportunities. Other considerations motivating a different uplink LBT procedure include, but are not limited to, multiplexing of multiple wireless devices in a time period (e.g., subframe, slot, and/or mini-slot).

A downlink transmission burst may be a continuous transmission from a downlink transmitting node with no transmission immediately before and/or after from the node on the same carrier component (CC). An uplink transmission burst from a wireless device perspective may be a continuous transmission from a wireless device with no transmission immediately before or after from the same wireless device on the same CC. An uplink transmission burst may be defined from a wireless device perspective. An uplink transmission burst may be defined from a base station perspective. Downlink transmission burst(s) and uplink transmission burst(s) may be scheduled using TDM over a same unlicensed carrier, for example, if a base station operates downlink transmissions and uplink transmission over the same unlicensed carrier. An instant of time may comprise a downlink transmission burst and/or an uplink transmission burst.

Contention-based random access (CBRA) and/or contention-free random access (CFRA) may be supported. CBRA and/or CFRA may be supported on a primary cell of a master cell group or a primary cell of a secondary cell group (SpCell). CFRA may be supported on SCells. An RAR may be transmitted via an SpCell (e.g., in a non-standalone scenario). An RAR may be transmitted via an SpCell and/or an SCell (e.g., in a standalone scenario). A predefined HARQ process indicator/identifier/index (ID) may be used for an RAR.

Carrier aggregation may be supported. Carrier aggregation between a PCell configured on a licensed band and an SCell configured on an unlicensed band may be supported. An SCell may be configured for both downlink transmissions and uplink transmission, or may be configured for downlink transmissions only. Dual connectivity between a PCell (e.g., an LTE cell, or any other cell) configured on a licensed band and a PSCell (e.g., an NR-U cell, or any other cell) configured on unlicensed band may be supported. Stand-alone operation on an unlicensed band, in which all carriers are in one or more unlicensed bands, may be supported. A cell configured for downlink transmissions in an unlicensed band and uplink transmissions in a licensed band, or vice versa, may be supported. Dual connectivity between PCell (e.g., an NR cell, or any other cell) on a licensed band and PSCell (e.g., NR-U cell, or any other cell) on an unlicensed band may be supported.

Figure 17:
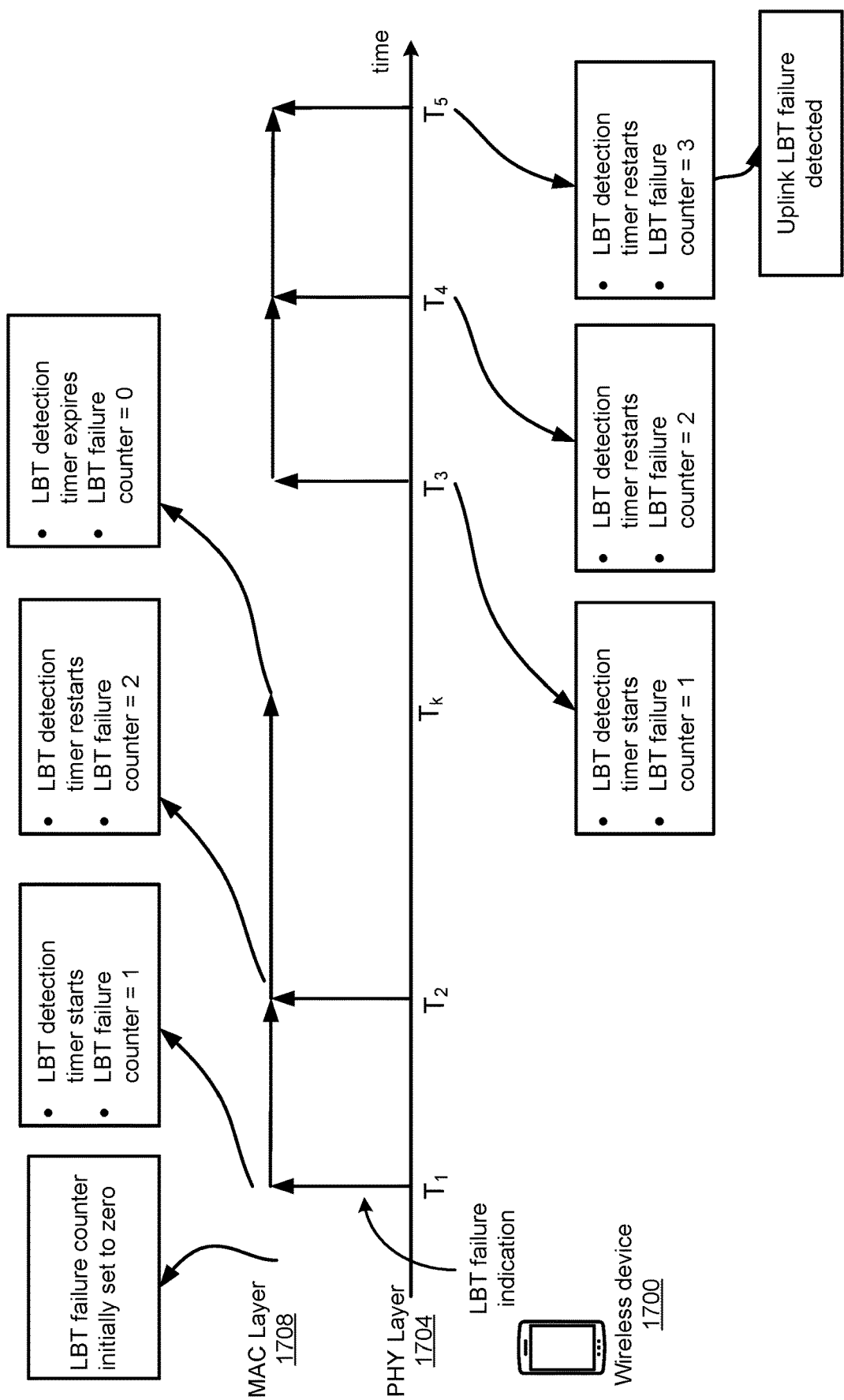
FIG. 17 shows an example of a listen-before-talk (LBT) failure detection.

FIG. 17 shows an example of an LBT failure detection. A wireless device 1700 may determine that an LBT procedure has failed, for example, based on determining a presence of a signal on a channel. The wireless device 1700 may use an LBT failure counter (or similar mechanism/method) to track a quantity of times that a signal is detected on a channel. The wireless device 1700 may determine an uplink LBT failure, for example, if a value indicated by an LBT counter exceeds a threshold value. An LBT failure counter herein is used merely as an example, but one skilled in the art may recognize that any similar mechanism may be used for the purposes of the invention The wireless device 1700 may receive one or more messages. The wireless device 1700 may receive the one or more messages from a base station. The one or more messages may comprise one or more configuration parameters. The one or more configuration parameters may be for a cell. The cell may be a PCell or an SCell. The cell may be an SCell configured with a PUCCH (e.g., a PUCCH SCell). The cell may be an unlicensed cell (e.g., a cell operating in an unlicensed band). The cell may be a licensed cell (e.g., a cell operating in a licensed band).

The cell may comprise a plurality of wireless resources (e.g., BWPs, bands, subbands, and/or any other wireless resources). A plurality of BWPs may comprise one or more uplink BWPs comprising an uplink BWP of the cell. The plurality of BWPs may comprise one or more downlink BWPs comprising a downlink BWP of the cell. A BWP of the plurality of BWPs may be in one of an active state and an inactive state. The wireless device 1700 may monitor a downlink channel/signal (e.g., PDCCH, DCI, CSI-RS, PDSCH) in a downlink BWP of the one or more downlink BWPs, for example, if the downlink BWP is in an active state. The wireless device 1700 may receive a downlink transmission (e.g., a PDSCH transmission) on/via a downlink BWP of the one or more downlink BWPs, for example, if the downlink BWP is in an active state. The wireless device 1700 may not monitor a downlink channel/signal (e.g., PDCCH, DCI, CSI-RS, PDSCH) in a downlink BWP of the one or more downlink BWPs, for example, if the downlink BWP is in an inactive state. The wireless device 1700 may not receive a downlink transmission (e.g., a PDSCH transmission) on/vian a downlink BWP the one or more downlink BWPs, for example, if the downlink BWP is in an inactive state.

The wireless device 1700 may send/transmit an uplink signal/channel (e.g., a PUCCH transmission, a preamble, a PUSCH transmission, a PRACH transmission, an SRS transmission, etc) via an uplink BWP of the one or more uplink BWPs, for example, if the uplink BWP is in an active state. The wireless device 1700 may not send/transmit an uplink signal/channel (e.g., a PUCCH transmission, a preamble, a PUSCH transmission, a PRACH transmission, an SRS transmission, etc) via an uplink BWP of the one or more uplink BWPs, for example, if the uplink BWP is in an inactive state.

The wireless device 1700 may activate a downlink BWP of the one or more downlink BWPs of the cell. Activating the downlink BWP may comprise that the wireless device 1700 sets the downlink BWP as an active downlink BWP of the cell. Activating the downlink BWP may comprise that the wireless device 1700 sets the downlink BWP in an active state. Activating the downlink BWP may comprise switching the downlink BWP from an inactive state to an active state.

The wireless device 1700 may activate an uplink BWP of the one or more uplink BWPs of the cell. Activating the uplink BWP may comprise the wireless device 1700 setting the uplink BWP as an active uplink BWP of the cell. Activating the uplink BWP may comprise the wireless device 1700 setting the uplink BWP in an active state. Activating the uplink BWP may comprise switching the uplink BWP from an inactive state to an active state.

The one or more configuration parameters may comprise LBT failure detection and recovery configuration parameters. The LBT failure detection and recovery configuration parameters may be for the uplink BWP of the cell. The one or more configuration parameters may indicate a maximum quantity (e.g., number) of LBT failures for the uplink BWP. The LBT failure detection and recovery configuration parameters may indicate the maximum quantity (e.g., number) of LBT failures. The one or more configuration parameters may indicate a maximum quantity (e.g., number) of LBT failures for the cell. The LBT failure detection and recovery configuration parameters may indicate the maximum quantity (e.g., number) of LBT failures.

The one or more configuration parameters may indicate an LBT detection timer for the uplink BWP. The one or more configuration parameters may indicate a timer value for the LBT detection timer. The one or more configuration parameters may indicate the timer value associated with the LBT detection timer. The LBT failure detection and recovery configuration parameters may indicate the LBT detection timer. The one or more configuration parameters may indicate an LBT detection timer for the cell.

The wireless device 1700 may monitor uplink LBT failures in the uplink BWP for an uplink transmission. The wireless device 1700 may monitor the uplink LBT failures for an LBT failure detection. The uplink transmission may comprise a random access preamble transmission (e.g., in a RACH). The uplink transmission may comprise a PUCCH transmission (e.g., a SR, a HARQ-ACK, a CSI report, a UCI, etc). The uplink transmission may comprise a PUSCH transmission. The uplink transmission may comprise an SRS transmission.

The uplink BWP may comprise one or more LBT bandwidths (or one or more subbands). An LBT bandwidth of the one or more LBT bandwidths may be 20 MHz, 10 MHz, 50 MHz, or any other bandwidth. The LBT bandwidth may be determined based on regulations. The uplink BWP may be 80 MHz. The uplink BWP may comprise four LBT bandwidths, for example, if the LBT bandwidth is 20 MHz. The uplink BWP may comprise eight LBT bandwidths, for example, if the LBT bandwidth is 10 MHz.

The wireless device 1700 may perform an LBT procedure in/for an uplink transmission (e.g., a PUSCH transmission, a PRACH transmission, a PUCCH transmission, an SRS transmission) via the uplink BWP. The performing the LBT procedure in/for the uplink transmission may comprise performing a CCA on an uplink resource of the uplink transmission, for example, before the uplink transmission. The performing the check on the uplink resource may comprise performing an energy detection procedure to determine a presence or an absence of a signal on the uplink resource.

The wireless device 1700 may determine (and/or detect) a failure of the LBT procedure in/for the uplink transmission based on the performing the LBT procedure. Determining (and/or detecting) the failure of the LBT procedure may be based on determining a presence of a signal on the uplink resource. Determining the failure of the LBT procedure may be based on determining that the uplink resource for the uplink transmission is busy (or occupied, not clear, not available, or not idle). The uplink resource may comprise one or more LBT bandwidths. Determining that the uplink resource for the uplink transmission is busy may comprise determining that at least one LBT bandwidth of the one or more LBT bandwidths is busy. Determining the uplink resource of the uplink transmission is busy may comprise determining that each LBT bandwidth of the one or more LBT bandwidths is busy.

The wireless device 1700 may determine (and/or detect) a success of the LBT procedure in/for the uplink transmission based on the performing the LBT procedure. Determining (and/or detecting) the success of the LBT procedure may be based on determining an absence of a signal on the uplink resource. Determining the success of the LBT procedure may be based on determining that the uplink resource for the uplink transmission is idle (or unoccupied, clear, available, or free). The uplink resource may comprise one or more LBT bandwidths. Determining that the uplink resource for the uplink transmission is idle may comprise determining that at least one LBT bandwidth of the one or more LBT bandwidths is idle. Determining that the uplink resource of the uplink transmission is idle may comprise determining that each LBT bandwidth of the one or more LBT bandwidths is idle.

Determining the failure (or the success) of the LBT procedure may comprise determining the failure (or the success) of the LBT procedure by a PHY layer 1704 of the wireless device 1700. The wireless device 1700 (or the PHY layer 1704 of the wireless device 1700) may determine a failure of an LBT procedure at times T1, T2, T3, T4 and T5. The PHY layer 1704 of the wireless device 1700 may send/transmit an LBT failure indication to a MAC layer 1708 of the wireless device 1700 (e.g., at times T1, T2, T3, T4, and T5). The LBT failure indication may indicate a failure of the LBT procedure in/for the uplink transmission.

The wireless device 1700 may use at least one wireless device variable for LBT failure detection. The at least one wireless device variable may comprise an LBT failure counter. The LBT failure counter may be a counter that tracks a quantity of LBT failure indications (or LBT failure instance indications). The wireless device 1700 may set the LBT failure counter initially to zero (e.g., prior to time T1).

The MAC layer 1708 may receive the LBT failure indication from the PHY layer 1704. The wireless device 1700 may increment the LBT failure counter, for example, based on the receiving the LBT failure indication. The wireless device 1700 may increment the LBT failure counter, for example, at times T1, T2, T3, T4, and T5. Incrementing the LBT failure counter may comprise incrementing the LBT failure counter by the MAC layer 1708 of the wireless device 1700. The wireless device may increment the LBT failure counter by one. The wireless device 1700 may increment the LBT failure counter by any other quantity (e.g., two, three, etc.). The quantity (e.g., number) may be fixed, preconfigured, and/or predefined. The one or more configuration parameters may indicate the quantity. The quantity may be based on a quantity of determined/detected failures of LBT procedures. For example, the quantity may be two if two LBT procedures are determined to be failed, and the quantity may be four if four LBT procedures are determined to be failed, etc. The wireless device 1700 may determine multiple failures of LBT procedures in parallel (e.g., simultaneously or substantially simultaneously). The wireless device 1700 may determine/detect each failure of an LBT procedure of the multiple failures of LBT procedures on a respective LBT bandwidth of the one or more LBT bandwidths.

The MAC layer 1708 may receive the LBT failure indication from the PHY layer 1704. The wireless device 1700 may start (or restart) the LBT detection timer, for example, based on receiving the LBT failure indication. The wireless device 1700 may (re-)start the LBT detection timer at times T1, T2, T3, T4 and T5. Starting (or restarting) the LBT detection timer may comprise starting (or restarting) the LBT detection timer by the MAC layer 1708 of the wireless device 1700.

The LBT detection timer may expire (e.g., at time Tk). The wireless device 1700 may reset the LBT failure counter, for example, based on the expiration of the LBT detection timer. The resetting the LBT failure counter may comprise setting a value of the LBT failure counter to zero. The resetting the LBT failure counter may comprise setting a value of the LBT failure counter to any other value. The value may be fixed, preconfigured, and/or predefined. The one or more configuration parameters may indicate the value.

The wireless device 1700 may determine that a value of the LBT failure counter is equal to or greater than the maximum quantity (e.g., number) of LBT failures, for example, based on the incrementing the LBT failure counter. The wireless device 1700 may determine that the value of the LBT failure counter is equal to or greater than the maximum quantity of LBT failures at time T5, for example, if the maximum quantity of LBT failures is equal to 3. The wireless device 1700 may detect/determine/declare an uplink LBT failure for the uplink BWP of the cell, for example, based on the determining that the value of the LBT failure counter is equal to or greater than the maximum quantity of LBT failures. The wireless device 1700 may detect/determine/declare an uplink LBT failure for the uplink BWP of the cell (e.g., at or after time T5), for example, based on determining that the value of the LBT failure counter is equal to or greater than the maximum quantity of LBT failures (e.g., 3).

An LBT failure may comprise consistent failures (e.g., a quantity of failures satisfying a threshold) of LBT procedures. For example, an uplink LBT failure may comprise consistent failures (e.g., a quantity of failures satisfying a threshold) of LBT procedures on an uplink resource (e.g., uplink BWP). A downlink LBT failure may comprise consistent failures (e.g., a quantity of failures satisfying a threshold) of LBT procedures on a downlink resource (e.g., downlink BWP). The wireless device 1700 may detect/determine/declare an uplink LBT failure for the uplink BWP of the cell based on a quantity of LBT failure indications reaching the maximum quantity of LBT failures. The LBT failure indications may be consecutive. The wireless device 1700 may initiate an LBT failure recovery procedure for the uplink BWP based on the detecting/determining/declaring the uplink LBT failure for the uplink BWP.

Figure 18:
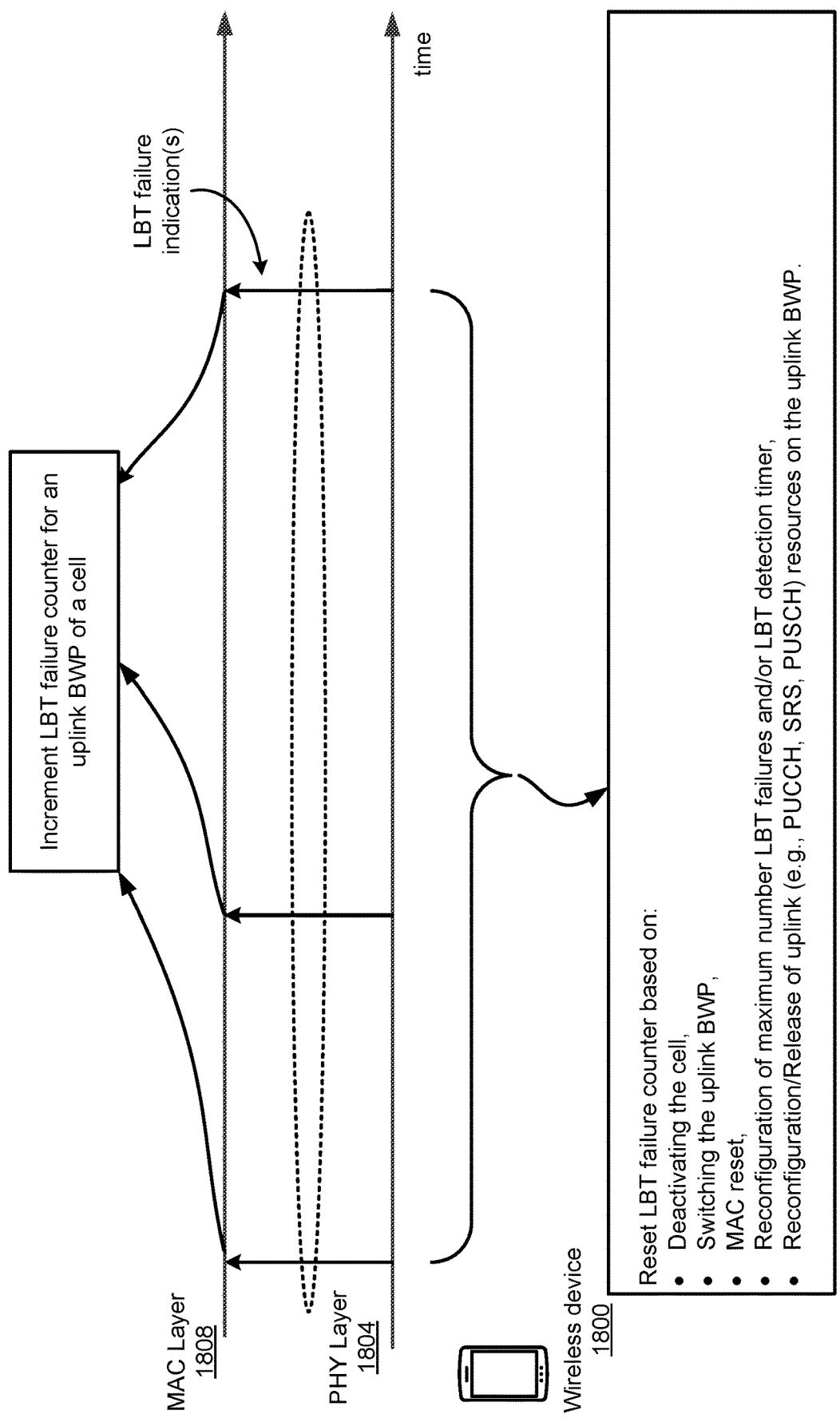
FIG. 18 shows an example of an LBT failure detection.

FIG. 18 shows an example of an LBT failure detection. A wireless device 1800 (e.g., a MAC layer 1808 of the wireless device) may increment an LBT failure counter based on receiving (e.g., from a PHY layer 1804 of the wireless device 1800) an LBT failure indication, for example, as described with reference to FIG. 17. The LBT failure counter may be for an uplink BWP of a cell. The wireless device 1800 may reset the LBT failure counter based on one or more considerations described with reference to FIG. 18. The resetting the LBT failure counter may comprise setting a value of the LBT failure counter to zero. The wireless device 1800 may perform one or more operations described with reference to the wireless device 1700.

The wireless device 1800 may deactivate a cell. Deactivating the cell may be based on an expiration of an SCell deactivation timer (e.g., sCellDeactivationTimer). The one or more configuration parameters may indicate the SCell deactivation timer for the cell. Deactivating the cell may be based on receiving (e.g., from a base station) an SCell activation/deactivation MAC CE deactivating the cell. The wireless device 1800 may reset the LBT failure counter based on the deactivating the cell.

The wireless device 1800 may switch from an uplink BWP to a second uplink BWP of one or more uplink BWPs of the cell. Switching from the uplink BWP to the second uplink BWP may comprise activating the second uplink BWP as a second active uplink BWP of the cell. Activating the second uplink BWP may comprise the wireless device 1800 setting the second uplink BWP in an active state. Switching from the uplink BWP to the second uplink BWP may comprise deactivating the uplink BWP. Deactivating the uplink BWP may comprise the wireless device 1800 setting the uplink BWP in an inactive state. The wireless device 1800 may switch from the uplink BWP to the second uplink BWP based on an expiration of a BWP inactivity timer. The one or more configuration parameters may indicate the BWP inactivity timer for the cell. The wireless device 1800 may switch from the uplink BWP to the second uplink BWP based on receiving a downlink signal (e.g., DCI, an RRC message, a MAC CE) indicating the second uplink BWP. The downlink signal may comprise a field indicating a BWP indicator/index (e.g., bwp-Id) of the second uplink BWP. The one or more configuration parameters may indicate the BWP index for the second uplink BWP. The wireless device 1800 may switch from the uplink BWP to the second uplink BWP based on initiating a random access procedure. The random access procedure may be initiated for the cell. The wireless device 1800 may reset the LBT failure counter based on the switching from the uplink BWP to the second uplink BWP.

A higher layer (e.g., an RRC layer) of the wireless device 1800 may request a reset of the MAC layer 1808 (or the MAC entity). The wireless device 1800 may reset the LBT failure counter, for example, based on the higher layer requesting the reset of the MAC layer 1808.

The one or more configuration parameters may indicate a time alignment timer. The time alignment timer may be for a timing advance group comprising the cell. The wireless device 1800 may reset the LBT failure counter based on an expiration of the time alignment timer.

The wireless device 1800 may release one or more uplink channels/signals (e.g., PUCCH, SRS) of the uplink BWP.

Releasing the one or more uplink channels/signals may be based on an expiration of the time alignment timer. Releasing the one or more uplink channels/signals may be based on the higher layer requesting the reset of the MAC layer. Releasing the one or more uplink channels/signals may be based on a quantity of SR transmissions reaching a maximum quantity of SR transmissions (e.g., as provided by a higher layer parameter sr-TransMax). The one or more configuration parameters may indicate the maximum quantity of SR transmissions. The wireless device 1800 may reset the LBT failure counter based on the quantity of SR transmissions reaching the maximum quantity of SR transmission. The wireless device 1800 may reset the LBT failure counter based on the releasing the one or more uplink channels/signals.

The wireless device 1800 may clear one or more uplink channels/signals (e.g., PUSCH, configured uplink grants) of the uplink BWP. Clearing the one or more uplink channels/signals may be based on an expiration of the time alignment timer. Clearing the one or more uplink channels/signals may be based on the higher layer requesting the reset of the MAC layer. Clearing the one or more uplink channels/signals may be based on a quantity of SR transmissions reaching a maximum quantity of SR transmissions (e.g., as provided by a higher layer parameter sr-TransMax). The one or more configuration parameters may indicate the maximum quantity of SR transmissions. The wireless device 1800 may reset the LBT failure counter based on the clearing the one or more uplink channels/signals.

Clearing a configured uplink grant may comprise that the wireless device 1800 may not send/transmit a transport block via at least one uplink radio resource indicated by the configured uplink grant. Clearing a configured uplink grant may comprise that the wireless device 1800 may not transmit a transport block for the configured uplink grant. A base station may assign/allocate the configured uplink grant (or the at least one uplink radio resource indicated by the configured uplink grant), for example, to a second wireless device. The wireless device 1800 may transmit a transport block via the at least one uplink radio resource indicated by the configured uplink grant, for example, if the wireless device 1800 does not clear the configured uplink grant. Transmitting the transport block via the at least one uplink radio resource may result in a collision with transmissions from the second wireless device. The clearing the configured uplink grant may comprise that the wireless device 1800 may not use the configured uplink grant for an uplink transmission.

Releasing an uplink channel/signal may comprise the wireless device 1800 releasing a configuration of the uplink channel/signal. The base station may reconfigure (or reschedule) the wireless device 1800 with the uplink channel/signal using a message (e.g., an explicit message, PDCCH signaling, MAC CE, RRC message etc.) to enable the wireless device 1800 to (re-)use at least one uplink radio resource indicated by the uplink channel/signal, for example, based on the releasing the uplink channel/signal.

The wireless device 1800 may receive one or more second configuration parameters (e.g., reconfiguration parameters, in an RRC message), for example, from a base station. The one or more second configuration parameters may comprise second LBT failure detection and recovery configuration parameters for the uplink BWP of the cell.

The second LBT failure detection and recovery configuration parameters may indicate a second maximum quantity (e.g., number) of LBT failures. The second LBT failure detection and recovery configuration parameters indicating the second maximum quantity of LBT failures may comprise reconfiguring/replacing/overriding the maximum quantity of LBT failures with the second maximum quantity of LBT failures. The second LBT failure detection and recovery configuration parameters indicating the second maximum number of LBT failures may comprise reconfiguring a value of the maximum quantity of LBT failures with a value of the second maximum quantity of LBT failures. The wireless device 1800 may reset the LBT failure counter based on the second LBT failure detection and recovery configuration parameters indicating the second maximum quantity of LBT failures.

The one or more configuration parameters may indicate a first value for the maximum quantity (e.g., number) of LBT failures. The one or more second configuration parameters may indicate a second value, for the maximum quantity of LBT failures, that is different from the first value. The wireless device 1800 may reset the LBT failure counter based on the one or more second configuration parameters indicating the second value that is different from the first value.

The second LBT failure detection and recovery configuration parameters may indicate a second LBT detection timer. The second LBT failure detection and recovery configuration parameters indicating the second LBT detection timer may comprise reconfiguring/replacing/overriding the LBT detection timer with the second LBT detection timer. The second LBT failure detection and recovery configuration parameters indicating the second LBT detection timer may comprise reconfiguring a value of the LBT detection timer with a value of the second LBT detection timer. The wireless device 1800 may reset the LBT failure counter based on the second LBT failure detection and recovery configuration parameters indicating the second LBT detection timer.

The one or more configuration parameters may indicate a first value for the LBT detection timer. The one or more second configuration parameters may indicate a second value, for the LBT detection timer, that is different from the first value. The wireless device 1800 may reset the LBT failure counter based on the one or more second configuration parameters indicating the second value that is different from the first value.

The one or more second configuration parameters may indicate/reconfigure uplink resources (e.g., PUCCH resources, SRS resources, PUSCH resources) for the uplink BWP. The wireless device 1800 may reset the LBT failure counter based on the one or more second configuration parameters indicating/reconfiguring the uplink resources.

The one or more second configuration parameters may release uplink resources (e.g., PUCCH resources, SRS resources, PUSCH resources) for the uplink BWP. The wireless device 1800 may reset the LBT failure counter based on the one or more second configuration parameters releasing the uplink resources.

Figure 19:
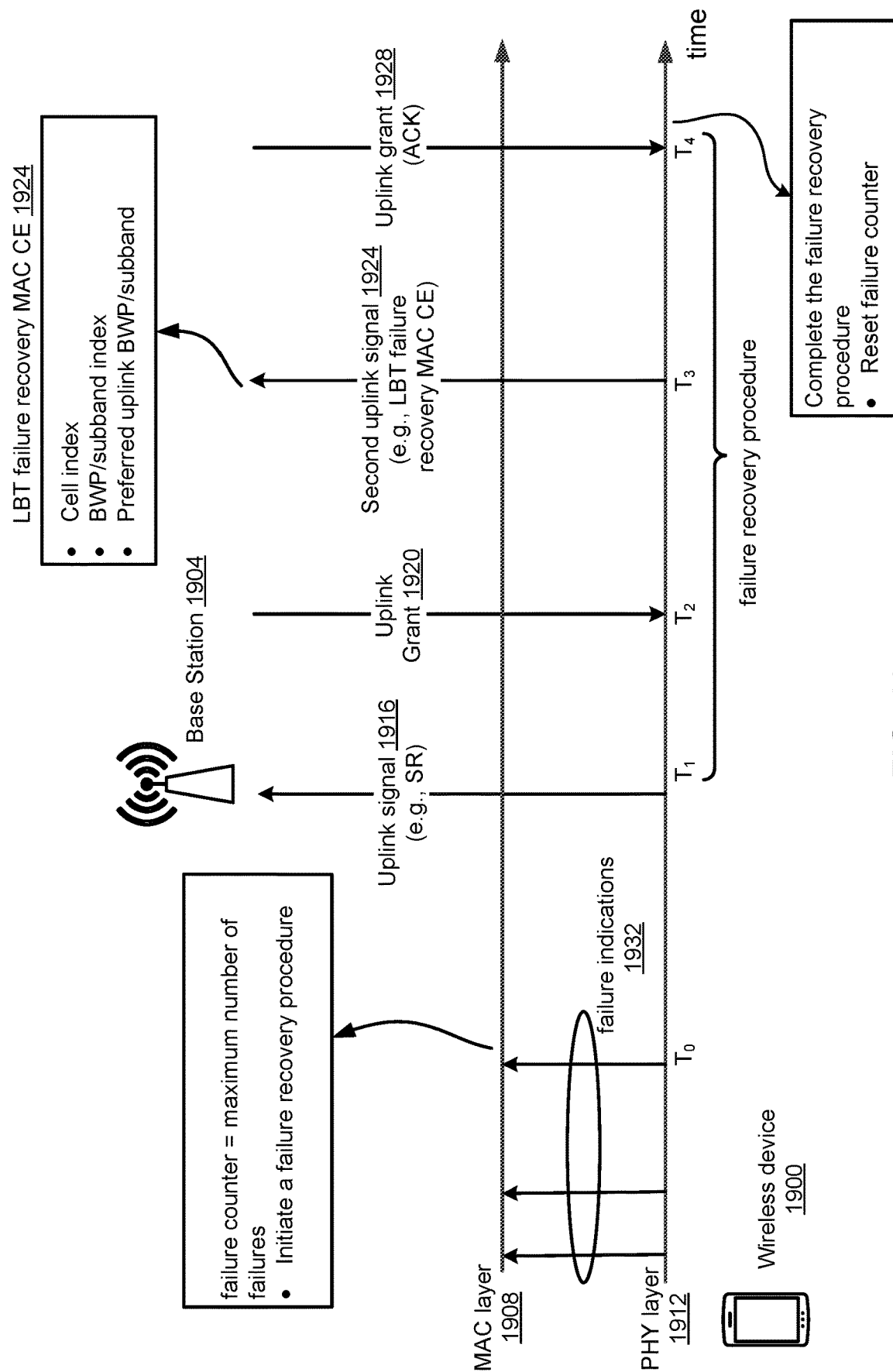
FIG. 19 shows example communication for a failure recovery (e.g., an LBT failure recovery).

FIG. 19 shows example communication for a failure recovery. The failure recovery procedure may comprise an LBT failure recovery. A wireless device 1900 may detect/determine/declare an uplink LBT failure for an uplink BWP based on determining that a value indicated by an LBT failure counter exceeds a maximum quantity of LBT failures (e.g., as described with reference to FIG. 17). The LBT failure counter may be incremented based on receiving one or more LBT failure indications 1932. The wireless device 1900 may detect/determine/declare (e.g., at or after time T0) the uplink LBT failure for the uplink BWP (e.g., as described with reference to FIG. 17). A PHY layer 1912 of the wireless device 1900 may perform one or more operations described with reference to the PHY layer 1704 and the PHY layer 1804 described above with reference to FIGS. 17 and 18. A MAC layer 1908 of the wireless device 1900 may perform one or more operations described with reference to the MAC layer 1708 and the MAC layer 1808 described above with reference to FIGS. 17 and 18.

The wireless device 1900 may trigger transmission of an uplink signal 1916 (e.g., an (SR, a random access preamble, a MAC CE, a PUSCH transmission) to a base station 1904 for an LBT failure recovery procedure of the uplink BWP, for example, based on the detecting/determining/declaring the uplink LBT failure for the uplink BWP (e.g., as described with reference to FIG. 17). The triggering of the transmission of the uplink signal 1916 for the LBT failure recovery procedure may comprise initiating the LBT failure recovery procedure. The wireless device 1900 may initiate the LBT failure recovery procedure based on the detecting/determining/declaring the uplink LBT failure for the uplink BWP. The LBT failure recovery procedure of the uplink BWP may comprise sending/transmitting the uplink signal 1916, receiving an uplink grant 1920, sending/transmitting the second uplink signal 1924, and/or receiving an uplink grant 1928. The LBT failure recovery procedure of the uplink BWP may comprise a time period from time T0 to T4, or a time period from time T1 to time T4.

The triggering of the transmission of the uplink signal 1916 for the LBT failure recovery procedure may be further based on determining that there is no ongoing LBT failure recovery procedure. The ongoing LBT failure recovery procedure may be for the cell. The ongoing LBT failure recovery procedure may be for a second cell different from the cell. The wireless device 1900 may determine that there is no ongoing LBT failure recovery procedure (e.g., for the cell or a second cell different from the cell), for example, at a time at which the wireless device 1900 detects/determines/declares the uplink LBT failure for the uplink BWP. The wireless device 1900 may trigger a transmission of the uplink signal 1916 for the LBT failure recovery procedure of the uplink BWP, for example, based on the determining that there is no ongoing LBT failure recovery procedure. The wireless device 1900 may determine that there is an ongoing LBT failure recovery procedure (e.g., for the cell or a second cell different from the cell), for example, at a time at which the wireless device 1900 detects/determines/declares the uplink LBT failure for the uplink BWP. The wireless device 1900 may not trigger a transmission of the uplink signal 1916 for the LBT failure recovery procedure of the uplink BWP, for example, based on the determining that there is the ongoing LBT failure recovery procedure.

The initiating the LBT failure recovery procedure may be based on determining that there is no ongoing LBT failure recovery procedure. The ongoing LBT failure recovery procedure may be for the cell. The ongoing LBT failure recovery procedure may be for a second cell different from the cell. The wireless device 1900 may determine that there is no ongoing LBT failure recovery procedure (e.g., for the cell or a second cell different from the cell), for example, at a time at which the wireless device 1900 detects/determines/declares the uplink LBT failure for the uplink BWP. The wireless device 1900 may initiate the LBT failure recovery procedure for the uplink BWP, for example, based on the determining that there is no ongoing LBT failure recovery procedure. The wireless device 1900 may determine that there is an ongoing LBT failure recovery procedure (e.g., for the cell or a second cell different from the cell), for example, at a time at which the wireless device 1900 detects/determines/declares the uplink LBT failure for the uplink BWP. The wireless device 1900 may not initiate the LBT failure recovery procedure for the uplink BWP, for example, based on the determining that there is the ongoing LBT failure recovery procedure.

The wireless device 1900 may determine that there is an ongoing LBT failure recovery procedure (e.g., for the cell or a second cell different from the cell), for example, at a time at which the wireless device 1900 detects/determines/declares the uplink LBT failure for the uplink BWP. The wireless device 1900 may stop/abort the ongoing LBT failure recovery procedure, for example, based on the determining that there is the ongoing LBT failure recovery procedure. The wireless device 1900 may trigger transmission of the uplink signal 1916 for the LBT failure recovery procedure of the uplink BWP, for example, based on the stopping/aborting the ongoing LBT failure recovery procedure.

The wireless device 1900 may determine that there is an ongoing LBT failure recovery procedure (e.g., for the cell or a second cell different from the cell), for example, at a time at which the wireless device 1900 detects/determines/declares the uplink LBT failure for the uplink BWP. The wireless device 1900 may determine (e.g., based on an implementation of the wireless device 1900) whether the wireless device 1900 is to stop/abort the ongoing LBT failure recovery procedure or not trigger transmission of the uplink signal 1916 for the LBT failure recovery procedure of the uplink BWP (e.g., continue the ongoing LBT failure recovery procedure), for example, based on the determining that there is the ongoing LBT failure recovery procedure. The wireless device 1900 may determine (e.g., based on an implementation of the wireless device 1900) whether the wireless device 1900 is to stop/abort the ongoing LBT failure recovery procedure or not initiate the LBT failure recovery procedure of the uplink BWP (e.g., continue the ongoing LBT failure recovery procedure), for example, based on determining that there is the ongoing LBT failure recovery procedure.

The wireless device 1900 may perform an LBT procedure in/for an uplink transmission (e.g., a PUSCH transmission, a PRACH transmission, a PUCCH transmission, an SRS transmission, etc.) via the uplink BWP. The wireless device 1900 may perform the LBT procedure during the LBT failure recovery procedure or the ongoing LBT failure recovery procedure (e.g., between time T0 and time T4 in FIG. 19). The wireless device 1900 may determine a failure of the LBT procedure in/for the uplink transmission via the uplink BWP. The wireless device 1900 may determine the failure of the LBT procedure on any LBT bandwidth of one or more LBT bandwidths of the uplink BWP. The wireless device 1900 may determine the failure of the LBT procedure on at least one LBT bandwidth of the one or more LBT bandwidths of the uplink BWP.

The wireless device 1900 may determine the failure of the LBT procedure during the LBT failure recovery procedure or the ongoing LBT failure recovery procedure (e.g., between time T0 and time T4 in FIG. 19). The PHY layer 1908 of the wireless device 1900 may or may not send/transmit an LBT failure indication to the MAC layer 1908 of the wireless device 1900, for example, based on the determining the failure of the LBT procedure in/for the uplink transmission during the LBT failure recovery procedure or the ongoing LBT failure recovery procedure. The LBT failure indication may indicate the failure of the LBT procedure in/for the uplink transmission.

The wireless device 1900 may determine the failure of the LBT procedure at a time at which there is no ongoing LBT failure recovery procedure. The PHY layer 1912 of the wireless device 1900 may send/transmit an LBT failure indication to the MAC layer 1908 of the wireless device 1900, for example, based on determining the failure of the LBT procedure in/for the uplink transmission at a time at which there is no ongoing LBT failure recovery procedure. The LBT failure indication may indicate the failure of the LBT procedure in/for the uplink transmission.

The MAC layer 1908 may receive the LBT failure indication from the PHY layer 1912. The MAC layer 1908 may receive the LBT failure indication from the PHY layer 1912 during the LBT failure recovery procedure or the ongoing LBT failure procedure (e.g., between time T0 and time T4 in FIG. 19). The wireless device 1900 may not increment the LBT failure counter, for example, based on receiving the LBT failure indication during the LBT failure recovery procedure or the ongoing LBT failure procedure.

The MAC layer 1908 may receive the LBT failure indication from the PHY layer 1912. The MAC layer 1908 may receive the LBT failure indication from the PHY layer 1912, for example, at a time at which there is no ongoing LBT failure recovery procedure. The wireless device 1900 may increment the LBT failure counter, for example, based on receiving the LBT failure indication at a time at which there is no ongoing LBT failure recovery procedure.

The wireless device 1900 may trigger transmission of the uplink signal 1916 (e.g., an SR) for an LBT failure recovery procedure based on not having an uplink grant to send/transmit the second uplink signal 1924 (e.g., an LBT failure recovery MAC CE, a PUSCH transmission, a transport block, an aperiodic CSI-report, UCI, a PUCCH transmission), for example, if the wireless device 1900 detects/determines/declares the uplink LBT failure. The uplink grant may comprise a dynamic uplink grant (e.g., obtained/indicated by a DCI). The uplink grant may be a configured uplink grant (e.g., configured grant type 1, configured grant type 2). The uplink grant may be indicated/obtained by a random access response. The uplink grant may be a PUSCH occasion indicated by configuration parameters of a two-step random access procedure.

The wireless device 1900 may not trigger transmission of the uplink signal 1916 (e.g., an SR) based on having an uplink grant (e.g., a dynamic grant, a configured uplink grant, an uplink grant obtained by random access response, etc) to send/transmit the second uplink signal 1924 (e.g., an LBT failure recovery MAC CE, a PUSCH transmission, a transport block, an aperiodic CSI-report, UCI, a PUCCH transmission), for example, if the wireless device 1900 detects/determines/declares the uplink LBT failure. The wireless device may send/transmit the second uplink signal 1924 for an LBT failure recovery procedure based on having the uplink grant, for example, if the wireless device 1900 detects/determines/declares the uplink LBT failure.

The one or more configuration parameters may indicate one or more uplink channel resources (e.g., PUCCH resources, SR resources, PRACH resources, PUSCH resources). The one or more uplink channel resources may be (dedicated) for LBT failure recovery procedures of one or more cells (e.g., may not be used for other procedures and/or communications). The one or more cells may comprise the cell. The one or more uplink channel resources may be on a second cell (e.g., a PCell, a PUCCH SCell). The second cell may be different from the cell. The second cell and the cell may be the same.

The wireless device 1900 may send/transmit the uplink signal 1916 (e.g., an SR) via an uplink channel resource of the one or more uplink channel resources (e.g., at or after time T1 in FIG. 19), for example, based on the triggering the transmission of the uplink signal 1916. The wireless device 1900 may transmit the uplink signal 1916 via the uplink channel resource of an active uplink BWP of the second cell. The uplink channel resource may be a PUCCH resource with PUCCH format 0. The uplink channel resource may be a PUCCH resource with a PUCCH format 1.

The one or more configuration parameters may indicate one or more second uplink channel resources (e.g., PUCCH resources, SR resources, PRACH resources, PUSCH resources). The one or more second uplink channel resources may be for transmission of a third uplink signal (e.g., an SR.

The one or more second uplink channel resources may be (dedicated) for beam failure recovery procedures of one or more cells. The one or more second uplink channel resources may be for transmission of the third uplink signal for the SR in a beam failure recovery procedure. The one or more cells may or may not comprise the cell. The one or more second uplink channel resources may be on a second cell (e.g., a PCell, a PUCCH SCell). The second cell may be different from the cell. The second cell and the cell may be the same.

The one or more second uplink channel resources may be for requesting UL-SCH resources for an uplink transmission (e.g., a PUSCH transmission, a transport block). The one or more second uplink channel resources may be used for a SR. The one or more second uplink channel resources may be for transmission of the third uplink signal for the SR in requesting UL-SCH resources. The wireless device 1900 may trigger the transmission of the third uplink signal via a second uplink channel resource of the one or more second uplink channel resources, for example, based on one or more pending SRs.

The wireless device 1900 may determine that the uplink channel resource of the one or more uplink channel resources overlaps with the second uplink channel resource of the one or more second uplink channel resources. The uplink channel resource may overlap with the second uplink channel resource at least partially in time (e.g., at least one symbol, at least one slot, at least one subframe, etc). The uplink channel resource may completely overlap with the second uplink channel resource.

The wireless device 1900 may drop the transmission of the third uplink signal. The wireless device 1900 may drop the transmission of the third uplink signal, for example, based on the determining that the uplink channel resource overlaps with the second uplink channel resource. The wireless device 1900 may not perform the transmission of the third uplink signal, for example, based on the determining that the uplink channel resource overlaps with the second uplink channel resource. The wireless device 1900 may send/transmit the uplink signal 1916 via the uplink channel resource, for example, based on determining that the uplink channel resource overlaps with the second uplink channel resource. The wireless device 1900 may perform the transmission of the uplink signal 1916, for example, based on determining that the uplink channel resource overlaps with the second uplink channel resource. The second uplink channel resource may be (dedicated) for the beam failure recovery procedures of one or more cells. The second uplink channel resource may be for requesting UL-SCH resources.

The wireless device 1900 may drop the transmission of the uplink signal 1916, for example, based on determining that the uplink channel resource overlaps with the second uplink channel resource. The wireless device 1900 may not perform the transmission of the uplink signal 1916, for example, based on determining that the uplink channel resource overlaps with the second uplink channel resource. The wireless device 1900 may send/transmit the third uplink signal via the second uplink channel resource, for example, based on determining that the uplink channel resource overlaps with the second uplink channel resource. The wireless device 1900 may perform the transmission of the third uplink signal, for example, based on determining that the uplink channel resource overlaps with the second uplink channel resource. The second uplink channel resource may be (dedicated) for the beam failure recovery procedures of one or more cells.

The wireless device 1900 may monitor for DCI indicating/comprising an uplink grant 1920, for example, based on transmitting the uplink signal 1916. The wireless device 1900 may receive the DCI indicating/comprising the uplink grant 1920 (e.g., at or after time T2). The uplink grant 1920 may indicate at least one uplink resource. The at least one uplink resource may comprise at least one time resource. The at least one uplink resource may comprise at least one frequency resource.

The at least one uplink resource indicated (or provided by) the uplink grant 1920 may be a resource to be used for transmission of the second uplink signal 1924 (e.g., an LBT failure recovery MAC CE). The at least one uplink resource indicated (or provided by) the uplink grant 1920 may accommodate the second uplink signal 1924 and a subheader of the second uplink signal 1924. The wireless device 1900 may send/transmit (at or after time T3) the second uplink signal 1924 via the at least one uplink resource indicated by the dynamic grant. The second uplink signal 1924 may comprise one or more fields. A field of the one or more fields may indicate a cell indicator/index of the cell (e.g., provided by a higher layer parameter servCellIndex). The one or more configuration parameters may indicate the cell index identifying the cell. A field of the one or more fields may indicate a BWP indicator/index of the uplink BWP (e.g., provided by a higher layer parameter bwp-Id). The one or more configuration parameters may indicate the BWP index that may be associated with (e.g., indicating, identifying, etc.) the uplink BWP.

A field of the one or more fields may indicate a BWP index of a preferred uplink BWP of the one or more uplink BWPs of the cell (e.g., provided by a higher layer parameter bwp-Id). The one or more configuration parameters may indicate the BWP index associated with (indicating, identifying, etc.) the preferred uplink BWP. The base station 1904 may send/transmit a downlink signal (e.g., DCI, an RRC message, a MAC CE) switching the wireless device 1900 from the uplink BWP to the preferred uplink BWP, for example, based on receiving the second uplink signal 1924 with the field indicating the BWP index of the preferred uplink BWP. The wireless device 1900 may perform LBT procedures in the one or more uplink BWPs of the cell. The wireless device 1900 may perform each LBT procedure for the LBT procedures in/for a respective uplink BWP of the one or more uplink BWPs. The wireless device 1900 may determine (or detect) a success of an LBT procedure, of the LBT procedures, in/for the preferred uplink BWP.

A field of the one or more fields may indicate at least one LBT bandwidth indicator/index of at least one LBT bandwidth. The one or more configuration parameters may indicate the at least one LBT bandwidth index. The uplink BWP may comprise the at least one LBT bandwidth. The preferred uplink BWP may comprise the at least one LBT bandwidth.

The wireless device 1900 may transmit the second uplink signal 1924 (e.g., an LBT failure recovery MAC CE) with a HARQ process indicator/index (ID) that is equal to a value. The DCI indicating/comprising the uplink grant 1920 may indicate the value of the HARQ process ID. A PUSCH transmission comprising the second uplink signal 1924 (e.g., an LBT failure recovery MAC CE) may have the HARQ process ID that is equal to the value. The wireless device 1900 may send/transmit the PUSCH transmission comprising the second uplink signal 1924 with the HARQ process ID that is equal to the value.

The wireless device 1900 may receive (e.g., at or after time T4) second DCI indicating/comprising a grant (e.g., the uplink grant 1928). The second DCI (or the grant) may schedule a new transmission (e.g., a new PUSCH transmission). The second DCI may may schedule the new transmission via a new and/or different communication channel (e.g., a new uplink BWP) different from a communication channel (e.g., uplink BWP) on which the uplink LBT failure was detected. The second DCI may schedule the new transmission with a second HARQ process ID with a second value that is the same as the value of the HARQ process ID of the PUSCH transmission comprising the second uplink signal 1924 (e.g., with a toggled NDI). The second DCI may indicate the second value of the second HARQ process ID. The wireless device 1900 may complete the LBT failure recovery procedure, for example, based on the receiving the second DCI indicating/comprising the uplink grant 1928 scheduling the new transmission. The wireless device 1900 may complete the LBT failure recovery procedure, for example, based on the receiving the uplink grant 1928 scheduling the new transmission for the second HARQ process ID with the second value that is the same as the value of the HARQ process ID of the PUSCH transmission comprising the second uplink signal 1924. The wireless device 1900 may complete the LBT failure recovery procedure, for example, based on receiving an acknowledgement (ACK) message for the second uplink signal 1924. The wireless device 1924 may receive the second DCI in a CORESET of a second cell (e.g., same as the cell or different from the cell). The CORESET may be different from a BFR CORESET monitored during/for a beam failure recovery procedure.

The wireless device 1900 may reset the LBT failure counter based on the completing the LBT failure recovery procedure. The wireless device 1900 may reset the LBT detection timer based on the completing the LBT failure recovery procedure.

A wireless device may send/transmit one or more messages based on an uplink grant. For example, the wireless device may send/transmit multiple MAC CEs (e.g., a BFR MAC CE for a beam failure recovery procedure, an LBT failure recovery MAC CE for an LBT failure recovery procedure, etc.) based on an uplink grant. The wireless device may trigger transmission of a signal (e.g., a BFR MAC CE) for a beam failure recovery procedure of the cell based on detecting a beam failure. The wireless device may detect/determine/declare an uplink LBT failure for an uplink resource (e.g., BWP) of the cell (e.g., based on consistent failures of LBT procedures of the cell, such as described with reference to FIG. 17). The wireless device may trigger transmission of an LBT failure recovery MAC CE (e.g., such as described with reference to FIG. 19) for an uplink LBT failure recovery procedure of the cell based on detecting/determining/declaring the uplink LBT failure. The wireless device may receive an uplink grant (e.g., the uplink grant 1920) for transmission of the BFR MAC CE and/or the LBT failure recovery MAC CE. The uplink grant may have a limited size (e.g., 10 bytes, 60 bytes, etc.) and may be unable to accommodate both the BFR MAC CE and the LBT failure recovery MAC CE.

In at least some examples, downlink communications that may depend on a successful beam failure recovery that may be more important (e.g., higher priority, more urgent, greater service level, etc.) than uplink communications that may depend on uplink LBT failure recovery. For example, uplink transmissions may be scheduled by DCI received in downlink control channels. The wireless device may receive DCI, for example, scheduling a transmission such as a PUSCH transmission, triggering aperiodic SRS/CSI transmission, and/or indicating HARQ-ACK transmission for a transport block. The base station may send/transmit, via downlink control channels, an ACK message (e.g., such as the ACK message corresponding to the uplink grant 1928) for an uplink transmission (e.g., a random access preamble transmission, a configured grant transmission, etc.). The wireless device (and/or a base station or other wireless device) may be unable to receive the DCI and/or the ACK message, for example, if the beam failure recovery procedure has not been successfully completed.

As described herein, a wireless device may determine a prioritization order of a beam failure recovery procedure and an LBT failure recovery procedure. The wireless device may determine a prioritization order of an LBT failure recovery MAC CE and a BFR MAC CE for transmission based on an uplink grant (e.g., in a MAC PDU), for example, if the wireless device has to transmit both LBT failure recovery MAC CE and BFR MAC CE. The wireless device may determine a prioritization order between the LBT failure recovery MAC CE and BFR MAC CE, and include a higher priority MAC CE in the MAC PDU, for example, first and/or before the lower priority MAC CE. The wireless device may include a lower priority MAC CE in the MAC PDU, for example, after the higher priority MAC CE, for example, if there are bits available and the MAC PDU is able to accommodate both MAC CEs. The wireless device may prioritize the beam failure recovery procedure such that the wireless device may be able to access a downlink channel for downlink communications. For example, the BFR MAC CE may be prioritized over the LBT failure recovery MAC CE. Prioritizing the BFR MAC CE may enable a successful beam failure recovery procedure and allow a downlink communication channel to be established. The base station may use the downlink communication channel to direct the wireless device to another BWP or deactivate a cell with an uplink LBT failure.

In at least some examples, the LBT failure recovery MAC CE may be prioritized over the BFR MAC CE. Prioritizing the LBT failure recovery MAC CE may be advantageous, such as for wireless device using a single active cell (e.g., using only a Pcell without carrier aggregation). Prioritizing the LBT failure recovery MAC CE may enable a successful LBT failure recovery procedure and/or allow an uplink communication channel to be established. The wireless device may use the uplink communication channel for sending uplink signals for a beam failure recovery procedure.

Logical channels (LCHs) may be prioritized. The LBT failure recovery MAC CE may have a higher priority than a BFR MAC CE. The LBT failure recovery MAC CE may have a higher priority than a C-RNTI MAC CE or data transmitted in uplink CCCH (UL-CCCH). The LBT failure recovery MAC CE may have a higher priority than configured grant confirmation MAC CE. The LBT failure recovery MAC CE may have a higher priority than MAC CE for a buffer status report (BSR) (e.g., with exception of a MAC CE for a BSR included for padding). The wireless device 1900 may (e.g., if the wireless device 1900 receives/has the uplink grant 1920 for the second uplink signal 1924) first include/add the LBT failure recovery MAC CE (e.g., to a MAC PDU of the second uplink signal 1924) and then include/add the BFR MAC CE (e.g., to the MAC PDU), for example, based on the LBT failure recovery MAC CE having the higher priority than the BFR MAC CE. The wireless device may include the BFR MAC CE in the MAC PDU only if bits are available in the MAC PDU to accommodate the BFR MAC CE.

LCHs may be prioritized. The LBT failure recovery MAC CE may have a lower priority than a BFR MAC CE. The LBT failure recovery MAC CE may have a lower priority than a C-RNTI MAC CE or data transmitted in UL-CCCH. The LBT failure recovery MAC CE may have a lower priority than configured grant confirmation MAC CE. The LBT failure recovery MAC CE may have a lower priority than MAC CE for BSR (e.g., with exception of a MAC CE for a BSR included for padding). The wireless device 1900 may (e.g., if the wireless device 1900 has received the uplink grant 1920 for the second uplink signal 1924) first include/add the BFR MAC CE (e.g., to a MAC PDU of the second uplink signal 1924) and then include/add the LBT failure recovery MAC CE (e.g., to the MAC PDU), for example, based on the LBT failure recovery MAC CE having the lower priority than the BFR MAC CE. The wireless device may include the LBT failure recovery MAC CE in the MAC PDU, for example, only if bits are available in the MAC PDU to accommodate the LBT failure recovery MAC CE LCHs may be prioritized. The LBT failure recovery MAC CE may have a same priority as a BFR MAC CE. The LBT failure recovery MAC CE may have a same priority as a C-RNTI MAC CE or data transmitted in UL-CCCH. The LBT failure recovery MAC CE may have a same priority as configured grant confirmation MAC CE. The LBT failure recovery MAC CE may have a same priority as MAC CE for BSR, with exception of a BSR included for padding.

Figure 20:
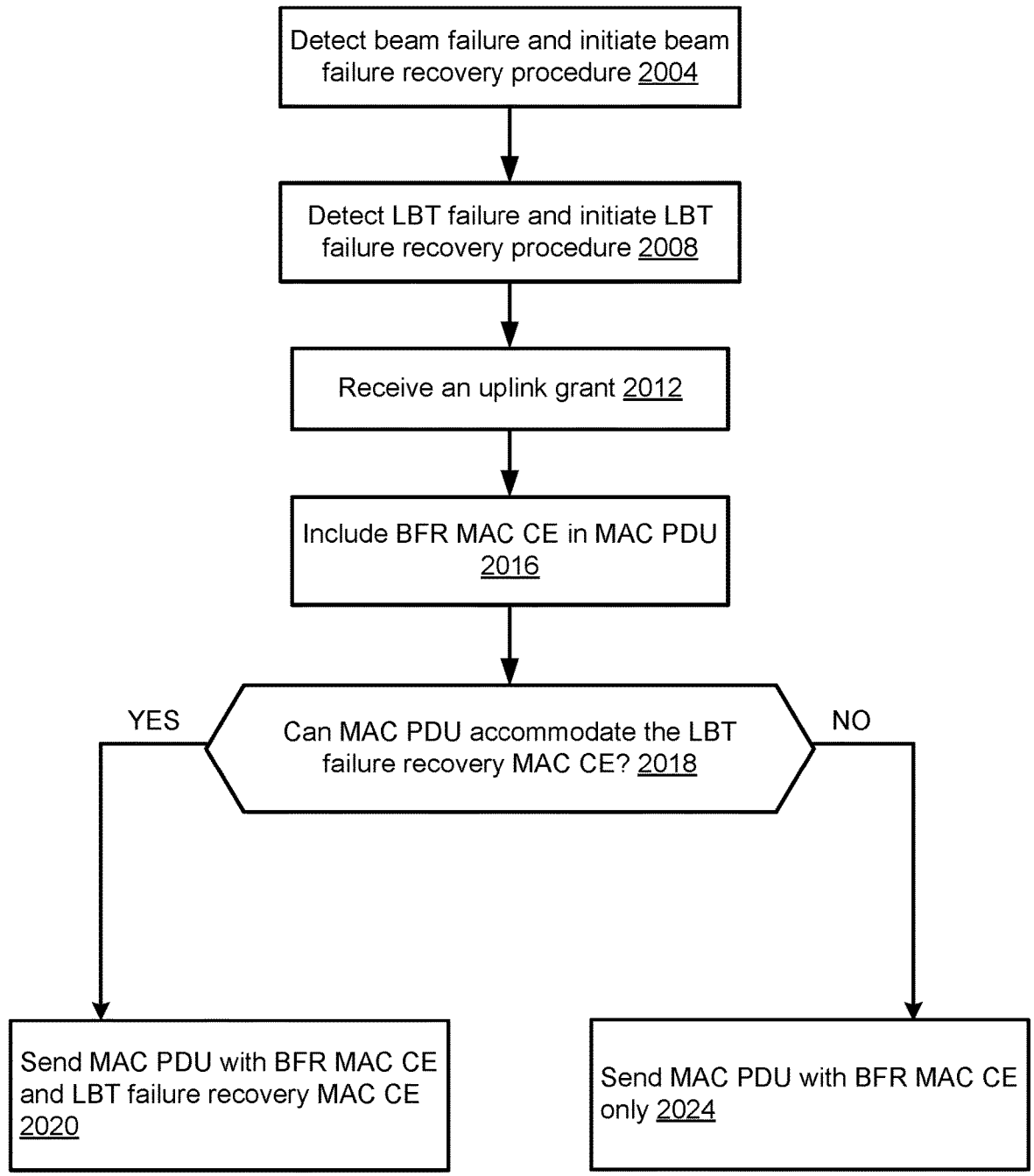
FIG. 20 shows an example method for a beam failure recovery and an LBT failure recovery.

FIG. 20 shows an example method for a beam failure recovery procedure and an LBT failure recovery procedure. The example method 2000 shown in FIG. 20 may be performed by, for example, a wireless device and/or a base station. At step 2004, the wireless device may detect a beam failure and initiate a beam failure recovery procedure. At step 2008, the wireless device may detect an LBT failure (e.g., based on detecting consecutive failures of LBT procedures, for example, as described with reference to FIG. 17) and/or initiate an LBT failure recovery procedure. Initiating an LBT failure recovery procedure may comprise sending an uplink signal (e.g., an SR, the uplink signal 1916). At step 2012, the wireless device may receive an uplink grant for an uplink transmission from the wireless device. The uplink grant may correspond to an LBT failure recovery procedure (e.g., the uplink grant 1920). The wireless device may determine an uplink message (e.g., a MAC PDU) for transmission based on the uplink grant. The wireless device may prioritize a BFR MAC CE associated with a beam failure recovery procedure for transmission. At step 2016, the wireless device may include the BFR MAC CE in the MAC PDU. At step 2018, the wireless device may determine whether the MAC PDU may accommodate an LBT failure recovery MAC CE. At step 2020, the wireless device may send the MAC PDU comprising both the BFR MAC CE and an LBT failure recovery MAC CE (e.g., associated with the LBT failure recovery procedure), for example, based on determining that the MAC PDU may accommodate the LBT failure recovery MAC CE (e.g., has sufficient bits to accommodate the LBT failure recovery MAC CE). At step 2024, the wireless device may send the MAC PDU comprising the BFR MAC CE (but not the LBT failure MAC CE), for example, based on determining that the MAC PDU may not accommodate the LBT failure recovery MAC CE (e.g., may not have sufficient bits to accommodate both the BFR MAC CE and the LBT failure MAC CE).

A wireless device may initiate an LBT failure recovery procedure for an active uplink BWP (e.g., based on determining an uplink LBT failure) in a cell. A base station may not be aware of the ongoing LBT failure recovery procedure and may perform one or more operations and/or send one or more signals to the wireless device. The base station may send (e.g., during the ongoing LBT failure recovery procedure) one or more of: a message (e.g., MAC CE) deactivating the cell (and/or activating a new cell), a message (e.g., DCI, RRC message) indicating switching of a resource to a new resource (e.g., switching of the uplink BWP to a new uplink BWP), a message (e.g., comprising RRC reconfiguration parameters) updating LBT failure recovery parameters (e.g., relaxing, adjusting, or expanding the LBT failure recovery parameters), a request to reset a layer (e.g., a MAC layer) of the wireless device, etc. Additionally, or alternatively, a deactivation timer (e.g., an SCell deactivation timer) may expire (e.g., during the ongoing LBT procedure) resulting in a deactivation of the cell. The wireless device may continue the LBT failure recovery procedure even under one or more of the above conditions. For example, the wireless device may continue the LBT failure recovery procedure of: a cell that may no longer be active; a (previous) active uplink BWP; an LBT failure recovery procedure having stringent LBT failure recovery parameters (e.g., even if the RRC reconfiguration parameters has relaxed the LBT failure recovery parameters); and/or an LBT failure recovery procedure at a MAC layer that has been reset. Continuing the LBT failure recovery procedure by the wireless device may result in increased uplink interference to other cells and/or other devices (e.g., wireless devices, base stations, etc.), increased power consumption (e.g., at the wireless device), and/or overall communication inefficiency. Continuing the LBT failure recovery procedure (e.g., of the (previous) uplink BWP on the new uplink BWP) may result in the wireless device sending one or more messages (e.g., the first uplink signal 1916, the second uplink signal 2024), which may result in the base station determining/assuming that the wireless device has detected an LBT failure on a new wireless resource (e.g., the new uplink BWP).

As described herein, a wireless device may abort/cancel an ongoing LBT failure recovery procedure to prevent continuation of the LBT failure recovery procedure (e.g., based on one or more conditions). The wireless device may abort/cancel the LBT failure recovery procedure, for example, if the cell is deactivated. The wireless device may cancel the LBT failure recovery procedure, for example, if an active wireless resource (e.g., an active BWP) of the cell is switched. Canceling/aborting the LBT failure recovery procedure may prevent the wireless device from sending one or more messages (e.g., the first uplink signal 1916, the second uplink signal 1924, etc.), which may prevent the base station from determining/assuming that the wireless device has detected an LBT failure on a new wireless resource (e.g., the new uplink BWP).

The wireless device may cancel the LBT failure recovery procedure based on one or more conditions. The wireless device may cancel the LBT failure recovery procedure, for example, if a message updating LBT failure recovery parameters is received. The wireless device may cancel the LBT failure recovery procedure, for example, if a MAC layer of the wireless device receives a request (e.g., from an RRC layer of the wireless device) to reset a layer (e.g., the MAC layer) of the wireless device. Canceling the LBT failure recovery procedure at the wireless device may provide advantages such as reduced uplink interference to other cells and/or other devices (e.g., wireless devices, base stations, etc.) and/or reduce power consumption (e.g., at the wireless device), among other advantages.

A wireless device may use an LBT failure counter to initiate an LBT failure recovery procedure. The wireless device may initiate an LBT failure recovery procedure, for example, if a value of the LBT failure counter is equal to or greater than a maximum quantity of LBT failures. Canceling an ongoing LBT failure recovery procedure may result in the wireless device (again) initiating an LBT failure recovery procedure, for example, based on determining that the value of the LBT failure counter is equal to or greater than the maximum quantity of LBT failures. Re-initiating an LBT recovery procedure following aborting an LBT recovery procedure may result in communication inefficiencies.

As described herein, a wireless device may reset an LBT failure counter, for example, based on canceling an LBT failure recovery procedure. Resetting the LBT failure counter may avoid re-initiation of a new LBT failure recovery procedure immediately following cancellation of an LBT failure recovery procedure, which may provide advantages such as increased efficiency of wireless communications.

Figure 21:
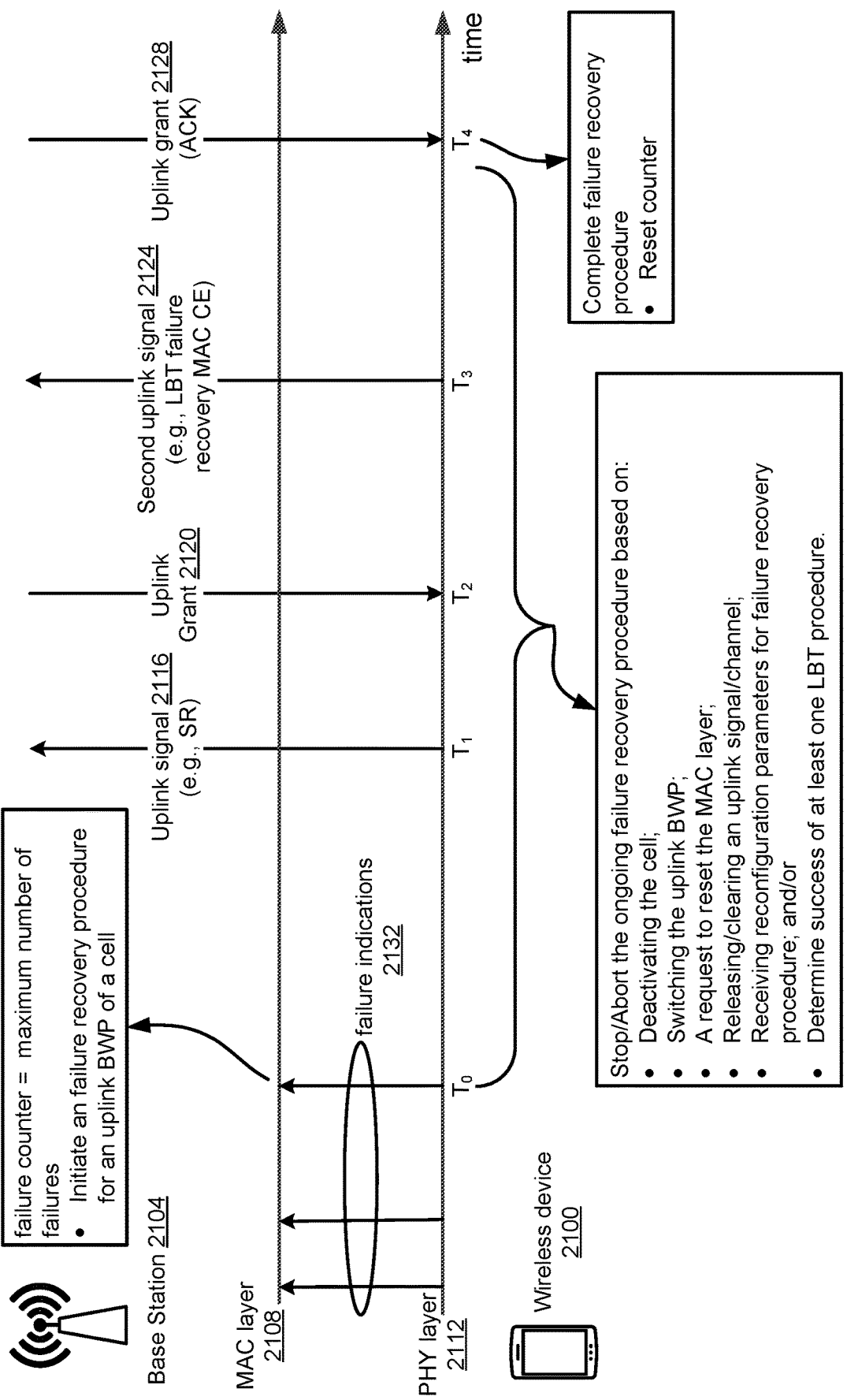
FIG. 21 shows communication for a failure recovery (e.g., an LBT failure recovery).

FIG. 21 shows example communication for an LBT failure recovery. A wireless device 2100, a base station 2104, a PHY layer 2112, and a MAC layer 2108 may perform one or more operations described with reference to the wireless device 1900, the base station 1904, the PHY layer 1912, and the MAC layer 1908, respectively, as described with reference to FIG. 19. LBT failure indications 2132, an uplink signal 2116, an uplink grant 2120, a second uplink signal 2114, and the uplink grant 2128 in an LBT failure recovery procedure may be similar to the LBT failure indications 1932, the uplink signal 1916, the uplink grant 1921, the second uplink signal 1914, and the uplink grant 1928, respectively as described with reference to FIG. 19. The steps at times T0, T1, T2, T3 and T4 in FIG. 21 may be similar to the steps at time T0, T1, T2, T3 and T4 in FIG. 19, respectively. The wireless device 2100 may cancel the LBT failure recovery procedure based on one or more considerations described herein. Cancelling the LBT failure recovery procedure may comprise refraining from transmission/reception of one or more signals associated with an LBT failure recovery procedure.

The wireless device 2100 may deactivate the cell (e.g., based on an SCell deactivation timer, receiving an SCell activation/deactivation MAC CE). The wireless device 2100 may deactivate the cell, for example, during the (ongoing) LBT failure recovery procedure (e.g., between time T0 and time T4). The wireless device 2100 may stop/abort/cancel the (ongoing) LBT failure recovery procedure, for example, based on deactivating the cell during the (ongoing) LBT failure recovery procedure.

The wireless device 2100 may switch from the uplink BWP to a second uplink BWP of the one or more uplink BWPs of the cell. The wireless device may switch from the uplink BWP to the second uplink BWP, for example, during the (ongoing) LBT failure recovery procedure (e.g., between time T0 and time T4). The wireless device 2100 may stop/abort/cancel the (ongoing) LBT failure recovery procedure, for example, based on switching from the uplink BWP to the second uplink BWP during the (ongoing) LBT failure recovery procedure.

A higher layer (e.g., an RRC layer) of the wireless device 2100 may request a reset of the MAC layer 2108 (or the MAC entity). The higher layer may request the reset of the MAC layer 2108 (or the MAC entity), for example, during the (ongoing) LBT failure recovery procedure (e.g., between time T0 and time T4). The wireless device 2100 may stop/abort/cancel the (ongoing) LBT failure recovery procedure, for example, based on the higher layer requesting the reset of the MAC layer 2108 during the (ongoing) LBT failure recovery procedure.

A time alignment timer may expire. The time alignment timer may expire, for example, during the (ongoing) LBT failure recovery procedure (e.g., between time T0 and time T4). The wireless device 2100 may stop/abort/cancel the (ongoing) LBT failure recovery procedure, for example, based on the time alignment timer expiring during the (ongoing) LBT failure recovery procedure.

The wireless device 2100 may release one or more uplink channels/signals (e.g., PUCCH, SRS) of the uplink BWP. The wireless device 2100 may release one or more uplink channels/signals (e.g., PUCCH, SRS) of the uplink BWP, for example, during the (ongoing) LBT failure recovery procedure (e.g., between time T0 and time). The wireless device 2100 may stop/abort/cancel the (ongoing) LBT failure recovery procedure, for example, based on the releasing the one or more uplink channels/signals during the (ongoing) LBT failure recovery procedure.

The wireless device 2100 may clear one or more uplink channels/signals (e.g., PUSCH, configured uplink grants) of the uplink BWP. The wireless device 2100 may clear one or more uplink channels/signals (e.g., PUSCH, configured uplink grants) of the uplink BWP, for example, during the (ongoing) LBT failure recovery procedure (e.g., between time T0 and time T4). The wireless device 2100 may stop/abort/cancel the (ongoing) LBT failure recovery procedure, for example, based on the clearing the one or more uplink channels/signals during the (ongoing) LBT failure recovery procedure.

The wireless device 2100 may receive (e.g., from the base station 2104) one or more second configuration parameters (e.g., reconfiguration parameters). The one or more second configuration parameters may comprise second LBT failure detection and recovery configuration parameters for the uplink BWP of the cell. The second LBT failure detection and recovery configuration parameters may indicate a second maximum quantity of LBT failures. The second LBT failure detection and recovery configuration parameters may indicate a second LBT detection timer. The one or more second configuration parameters may indicate/reconfigure uplink resources (e.g., PUCCH resources, SRS resources) for the uplink BWP. The wireless device 2100 may receive the one or more second configuration parameters during the (ongoing) LBT failure recovery procedure (e.g., between time T0 and time T4). The wireless device 2100 may stop/abort/cancel the (ongoing) LBT failure recovery procedure, for example, based on receiving the one or more second configuration parameters during the (ongoing) LBT failure recovery procedure.

The wireless device 2100 may perform an LBT procedure in/for an uplink transmission (e.g., a PUSCH transmission, a PRACH transmission, a PUCCH transmission, an SRS transmission) via the uplink BWP. The wireless device 2100 may perform the LBT procedure, for example, during the (ongoing) LBT failure recovery procedure (e.g., between time T0 and time T4). The wireless device 2100 may determine that the LBT procedure in/for the uplink transmission via the uplink BWP is successful. The wireless device 2100 may determine that the LBT procedure is successful on any LBT bandwidth of the uplink BWP. The wireless device 2100 may determine that the LBT procedure is successful on at least one LBT bandwidth of the uplink BWP. The wireless device 2100 may determine that the LBT procedure is successful, for example, during the (ongoing) LBT failure recovery procedure.

The PHY layer 2112 of the wireless device may not send/transmit (e.g., refrain from transmitting) an LBT failure indication to the MAC layer 2108 of the wireless device 2100, for example, based on the determining that the LBT procedure in/for the uplink transmission is successful. The MAC layer 2108 may not start (or restart) the LBT detection timer, for example, based on the not transmitting the LBT failure indication. The LBT detection timer may expire. The LBT detection timer may expire, for example, during the (ongoing) LBT failure recovery procedure. The LBT detection timer may expire, for example, based on not starting (or restarting) the LBT detection timer. The wireless device 2100 may stop/abort/cancel the (ongoing) LBT failure recovery procedure, for example, based on the LBT detection timer expiring during the (ongoing) LBT failure recovery procedure. The wireless device 2100 may stop/abort/cancel the (ongoing) LBT failure recovery procedure, for example, based on the determining that the LBT procedure in/for the uplink transmission is successful.

The wireless device 2100 may perform one or more LBT procedures in/for one or more uplink transmissions (e.g., a PUSCH transmission, a PRACH transmission, a PUCCH transmission, an SRS transmission) via the uplink BWP. The wireless device 2100 may perform the one or more LBT procedures, for example, during the (ongoing) LBT failure recovery procedure (e.g., between time T0 and time T4). A quantity of the one or more LBT procedures may be successful. The wireless device 2100 may determine that the quantity of the one or more LBT procedures are successful. The wireless device 2100 may determine that the quantity of the one or more LBT procedures are successful, for example, during the (ongoing) LBT failure recovery procedure. The quantity may be fixed (e.g., 1, 2, 3, 5, 10, or any other quantity). The quantity may be preconfigured. The quantity may be predefined. The one or more configuration parameters may indicate the quantity. The one or more configuration parameters may indicate the quantity for the uplink BWP. The one or more configuration parameters may indicate the quantity for the cell. The wireless device 2100 may stop/abort/cancel the (ongoing) LBT failure recovery procedure, for example, based on the determining that the quantity of the one or more LBT procedures are successful during the (ongoing) LBT failure recovery procedure.

The wireless device 2100 may reset the LBT failure counter based on the stopping/aborting/canceling the (ongoing) LBT failure recovery procedure. Resetting the LBT failure counter may comprise setting a value of the LBT failure counter to zero (or any other value). The wireless device 2100 may reset the LBT detection timer based on the stopping/aborting/canceling the (ongoing) LBT failure recovery procedure. The resetting the LBT detection timer may comprise setting a value of the LBT detection timer to zero (or any other value).

A wireless device may send/transmit (e.g., to a base station) at least one message comprising capability parameters. The capability parameters may indicate a maximum number of cells for which the wireless supports LBT failure detection. The capability parameters may indicate the maximum number of cells for which the wireless device supports an LBT failure recovery procedure.

The wireless device may monitor uplink LBT failures in active uplink BWPs of one or more cells for LBT failure detection. A quantity of the one or more cells may not be greater than the maximum number of cells. The quantity of the one or more cells may be equal to or less than the maximum number of cells.

The base station may send/transmit one or more messages comprising one or more configuration parameters, for example, based on receiving the at least one message comprising the capability parameters indicating the maximum quantity of cells. The one or more configuration parameters may indicate LBT failure detection and recovery configuration parameters for one or more cells. Each LBT failure detection and recovery configuration parameter of the LBT failure detection and recovery configuration parameters may be for a respective cell of the one or more cells A quantity of the one or more cells may not be more than the maximum quantity of cells. The quantity of the one or more cells may be equal to or less than the maximum quantity of cells.

The wireless device may monitor uplink LBT failures in active uplink BWPs of the one or more cells, for example, based on receiving the one or more configuration parameters indicating the LBT failure detection and recovery configuration parameters for the one or more cells. The monitoring the uplink LBT failures may comprise performing LBT failure detection (e.g., as described with reference to FIGS. 17 and 18) and/or performing an LBT failure recovery procedure (e.g., as described with reference to FIG. 19). The monitoring the uplink LBT failures may comprise tracking/incrementing an LBT failure counter, starting/restarting LBT detection timer, sending/receiving LBT failure indications, etc. (e.g., as described in FIG. 17). The monitoring the uplink LBT failures may comprise initiating an LBT failure recovery procedure (e.g., as described in FIG. 19).

A wireless device may initiate an LBT failure recovery procedure based on one or more uplink LBT failures. The wireless device may initiate a random access procedure (e.g., send a random access preamble) for the LBT failure recovery procedure. The wireless device may initiate the random access procedure for the LBT failure recovery procedure, for example, during an ongoing random access procedure (e.g., initiated for a beam failure recovery procedure, or any other procedure). Random access procedures may use one or more counters to track transmissions of random access preambles (e.g., a random access preamble counter, a power ramping counter). The random access procedure initiated for the LBT failure recovery procedure may use counter values as determined based on an ongoing random access procedure. Use of the counter values (e.g., as determined based on an ongoing random access procedure) for the random access procedure initiated for the LBT failure recovery procedure may result in early termination of the random access procedure (initiated for the LBT failure recovery procedure) and/or increased transmission power for the random access preamble transmission (for the LBT failure recovery procedure).

As described herein, a wireless device may abort/cancel an ongoing random access procedure and/or initiate an LBT failure recovery procedure, for example, if the wireless device determines one or more uplink LBT failures. For example, the wireless device may abort/cancel an ongoing random access procedure and/or initiate an LBT failure recovery procedure if a quantity of LBT failure indications (e.g., as tracked by an LBT failure counter) reaches a maximum quantity of LBT failures. Aborting/canceling an ongoing random access procedure may comprise resetting one or more counter values (e.g., values of a random access preamble counter, a power ramping counter, etc.). Aborting/canceling an ongoing random access procedure and/or resetting the counter values may help ensure proper operation of a random access procedure for the LBT failure recovery procedure.

FIG. 22 shows example communication for an LBT failure recovery and a beam failure recovery. A wireless device 2200 may be similar to the wireless device 1700, the wireless device 1800, the wireless device 1900, and/or the wireless device 2100, and may perform one or more operations described with reference to FIGS. 17-21. A PHY layer 2204 of the wireless device 2200 may send, to a MAC layer 2208 of the wireless device 2200, one or more beam failure indications 2212. The PHY layer 2204 of the wireless device 2200 may send, to the MAC layer 2208 of the wireless device 2200, one or more LBT failure indications 2216 based on detecting failure of one or more LBT procedures.

The wireless device 2200 may detect (e.g., at or after time T1 in FIG. 22) a beam failure for a second cell (e.g., PCell, SCell, PUCCH SCell). The wireless device 2200 may detect the beam failure for an active downlink BWP of the second cell. The second cell and the cell may be the same. The second cell and the cell may be different. The wireless device 2200 may detect the beam failure based on a quantity of beam failure indications 2212 (e.g., beam failure instance indications) reaching/exceeding a maximum quantity of beam failures defined for a beam failure counter. The one or more configuration parameters may indicate the maximum quantity of beam failures defined for a beam failure counter for the second cell. The one or more configuration parameters may indicate the maximum quantity of beam failures defined for a beam failure counter for the active downlink BWP of the second cell.

The wireless device 2200 may initiate a beam failure recovery procedure (e.g., a PRACH-based beam failure recovery procedure, PUCCH-based beam failure recovery procedure) based on the detecting the beam failure. The wireless device 2200 may initiate the beam failure recovery procedure for the second cell. The wireless device 2200 may initiate the beam failure recovery procedure for the active downlink BWP of the second cell. Initiating the beam failure recovery procedure may comprise initiating a random access procedure for the beam failure recovery procedure.

The wireless device 2200 may detect/determine/declare the uplink LBT failure for the uplink BWP of the cell (e.g. at or after time T2 in FIG. 22). The wireless device 2200 may detect/determine/declare the uplink LBT failure for the uplink BWP of the cell during the (ongoing) beam failure recovery procedure. The wireless device 2200 may stop/abort/cancel the (ongoing) beam failure recovery procedure, for example, based on the detecting/determining/declaring the uplink LBT failure for the uplink BWP of the cell during the (ongoing) beam failure recovery procedure. Canceling the (ongoing) beam failure recovery procedure may comprise stopping/aborting a random access procedure for the beam failure recovery procedure. The wireless device 2200 may initiate an LBT failure recovery procedure for the uplink BWP of the cell, for example, based on the canceling the (ongoing) beam failure recovery procedure. The wireless device 2200 may trigger transmission of an uplink signal (e.g., a SR, a random access preamble) for an LBT failure recovery procedure of the uplink BWP of the cell, for example, based on the canceling the (ongoing) beam failure recovery procedure.

The wireless device 2200 may suspend the (ongoing) beam failure recovery procedure until the LBT failure recovery procedure is completed (e.g., at or after time T4 in FIG. 19), for example, based on the detecting/determining/declaring the uplink LBT failure for the uplink BWP of the cell during the (ongoing) beam failure recovery procedure. The wireless device 2200 may resume the (ongoing) beam failure recovery procedure based on (e.g., after) the LBT failure recovery procedure being completed.

The wireless device 2200 may keep performing the (ongoing) beam failure recovery procedure (e.g., send/transmit a random access preamble, send/transmit a BFR MAC CE, monitor a BFR CORESET, etc), for example, based on the detecting/determining/declaring the uplink LBT failure for the uplink BWP of the cell during the (ongoing) beam failure recovery procedure. The wireless device 2200 may not initiate an LBT failure recovery procedure for the uplink BWP of the cell, for example, based on the detecting/determining/declaring the uplink LBT failure for the uplink BWP of the cell during the (ongoing) beam failure recovery procedure. The wireless device 2200 may not initiate the LBT failure recovery procedure for the uplink BWP, for example, at least until the (ongoing) beam failure recovery procedure is completed. The wireless device 2200 may not trigger transmission of an uplink signal (e.g., an SR, a random access preamble) for an LBT failure recovery procedure of the uplink BWP of the cell, for example, based on detecting/determining/declaring the uplink LBT failure for the uplink BWP of the cell during the (ongoing) beam failure recovery procedure.

The wireless device 2200 may initiate an LBT failure recovery procedure for the uplink BWP of the cell based on the detecting/determining/declaring the uplink LBT failure for the uplink BWP of the cell. The wireless device 2200 may initiate the LBT failure recovery procedure for the uplink BWP of the cell, for example, during the (ongoing) beam failure recovery procedure. The wireless device 2200 may cancel the (ongoing) beam failure recovery procedure, for example, based on initiating the LBT failure recovery procedure during the (ongoing) beam failure recovery procedure. The wireless device 2200 may trigger transmission of an uplink signal (e.g., an SR, a random access preamble) for the LBT failure recovery procedure of the uplink BWP of the cell, for example, based on canceling the (ongoing) beam failure recovery procedure. The wireless device 2200 may suspend the (ongoing) beam failure recovery procedure until the LBT failure recovery procedure is completed (e.g., time T4 in FIG. 19), for example, based on initiating the LBT failure recovery procedure during the (ongoing) beam failure recovery procedure. The wireless device 2200 may resume the (ongoing) beam failure recovery procedure based on (e.g., after) the LBT failure recovery procedure being completed.

The wireless device 2200 may keep (e.g., continue) performing the (ongoing) beam failure recovery procedure (e.g., transmit a random access preamble, transmit a BFR MAC CE, monitor a BFR CORESET, etc), for example, based on initiating the LBT failure recovery procedure during the (ongoing) beam failure recovery procedure. The wireless device 2200 may not trigger transmission of an uplink signal (e.g., an SR, a random access preamble) for the LBT failure recovery procedure of the uplink BWP of the cell, for example, based on initiating the LBT failure recovery procedure during the (ongoing) beam failure recovery procedure.

The wireless device 2200 may trigger transmission of an uplink signal (e.g., an SR, random access preamble) for an LBT failure recovery procedure of the uplink BWP of the cell based on the detecting/determining/declaring the uplink LBT failure for the uplink BWP of the cell. The wireless device 2200 may trigger transmission of the uplink signal for the LBT failure recovery procedure, for example, during the (ongoing) beam failure recovery procedure. The wireless device 2200 may cancel the (ongoing) beam failure recovery procedure, for example, based on triggering transmission of the uplink signal during the (ongoing) beam failure recovery procedure. The wireless device 2200 may send/transmit the uplink signal via an uplink channel resource of the one or more uplink channel resources (e.g., at of after time T1 in FIG. 19), for example, based on canceling the (ongoing) beam failure recovery procedure. The wireless device 2200 may suspend the (ongoing) beam failure recovery procedure until the LBT failure recovery procedure is completed (e.g., at or after time T4 in FIG. 19), for example, based on triggering transmission of the uplink signal during the (ongoing) beam failure recovery procedure. The wireless device 2200 may resume the (ongoing) beam failure recovery procedure based on (e.g., after) the LBT failure recovery procedure being completed.

The wireless device 2200 may keep performing the (ongoing) beam failure recovery procedure (e.g., transmit a random access preamble, transmit a BFR MAC CE, monitor a BFR CORESET, etc), for example, based on triggering transmission of the uplink signal during the (ongoing) beam failure recovery procedure. The wireless device 2200 may not send/transmit the uplink signal via an uplink channel resource of the one or more uplink channel resources, for example, based on triggering transmission of the uplink signal during the (ongoing) beam failure recovery procedure.

Figure 23:
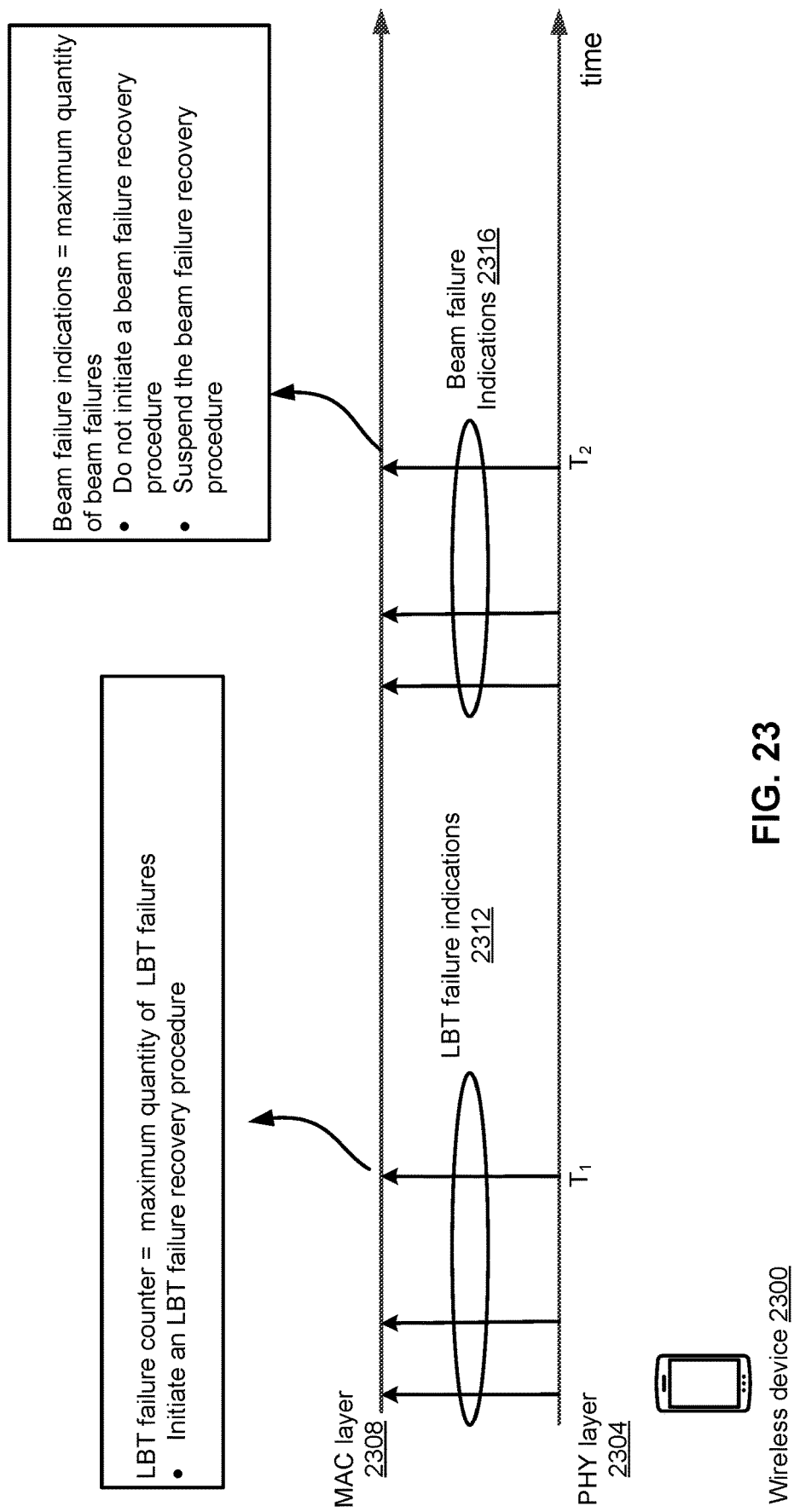
FIG. 23 shows example communication for an LBT failure recovery and a beam failure recovery.

FIG. 23 shows an example communication for an LBT failure recovery and a beam failure recovery. A wireless device 2300 may be similar to the wireless device 1700, the wireless device 1800, the wireless device 1900, the wireless device 2100, and/or the wireless device 2100, and may perform one or more operations described with reference to FIGS. 17-21. A PHY layer 2304 of the wireless device 2300 may send, to a MAC layer 2308 of the wireless device 2300, one or more beam failure indications 2316. The PHY layer 2304 of the wireless device 2300 may send, to the MAC layer 2308 of the wireless device 2300, one or more LBT failure indications 2312 based on detecting one or more failures of LBT procedures.

The wireless device 2300 may detect/determine/declare an uplink LBT failure for the uplink BWP of a cell (e.g., at or after time T1 in FIG. 23). The wireless device 2300 may initiate an LBT failure recovery procedure for the uplink BWP of the cell based on the detecting/determining/declaring the uplink LBT failure. The wireless device 2300 may trigger transmission of an uplink signal (e.g., an SR, a random access preamble) for an LBT failure recovery procedure of the uplink BWP of the cell based on the detecting/determining/declaring the uplink LBT failure.

The wireless device 2300 may detect a beam failure (e.g., at or after time T2 in FIG. 23, as described with reference to FIG. 17 or 22). The wireless device 2300 may detect the beam failure during the (ongoing) LBT failure recovery procedure. The wireless device 2300 may not initiate a beam failure recovery procedure, for example, based on the detecting the beam failure during the (ongoing) LBT failure recovery procedure. The wireless device 2300 may suspend initiating the beam failure recovery procedure until the (ongoing) LBT failure recovery procedure is completed, for example, based on the detecting the beam failure during the (ongoing) LBT failure recovery procedure. The wireless device 2300 may initiate the beam failure recovery procedure based on (or after) the completion of the (ongoing) LBT failure recovery procedure, for example, based on suspending the initiating the beam failure recovery procedure.

The wireless device 2300 may stop/abort/cancel the (ongoing) LBT failure recovery procedure, for example, based on the detecting the beam failure during the (ongoing) LBT failure recovery procedure. The wireless device 2300 may initiate a beam failure recovery procedure (e.g, send/transmit a random access preamble, scheduling request, BFR MAC CE, etc), for example, based on the canceling the (ongoing) LBT failure recovery procedure. The wireless device 2300 may suspend the (ongoing) LBT failure recovery procedure until the beam failure recovery procedure is completed, for example, based on detecting the beam failure during the (ongoing) LBT failure recovery procedure. The wireless device 2300 may resume the (ongoing) LBT failure recovery procedure based on (e.g., after) the completion of the beam failure recovery procedure.

The wireless device 2300 may detect/determine/declare the uplink LBT failure for the uplink BWP of the cell. The wireless device 2300 may initiate an LBT failure recovery procedure for the uplink BWP of the cell based on the detecting/determining/declaring the uplink LBT failure. The wireless device 2300 may trigger transmission of an uplink signal (e.g., an SR, a random access preamble) for an LBT failure recovery procedure of the uplink BWP of the cell based on the detecting/determining/declaring the uplink LBT failure.

The wireless device 2300 may detect/determine/declare a second uplink LBT failure for a second uplink BWP of a second cell. The second cell may be different from the cell. The second cell may be same as the cell. The second cell may be a primary cell (PCell, SpCell). The cell may be a secondary cell (e.g., SCell, PsCell). The second cell may have a higher priority than the cell. A second LBT failure recovery procedure of the second cell may have a higher priority than the (ongoing) LBT failure recovery procedure of the cell.

The wireless device 2300 may detect/determine/declare the second uplink LBT failure for the second uplink BWP of the second cell during the (ongoing) LBT failure recovery procedure for the uplink BWP of the cell. The wireless device 2300 may cancel the (ongoing) LBT failure recovery procedure, for example, based on detecting/determining/declaring the second uplink LBT failure during the (ongoing) LBT failure recovery procedure. The wireless device 2300 may initiate a second LBT failure recovery procedure for the second uplink BWP of the second cell, for example, based on canceling the (ongoing) LBT failure recovery procedure.

The wireless device 2300 may initiate the second LBT failure recovery procedure for the second uplink BWP of the second cell based on the detecting/determining/declaring the second uplink LBT failure. The wireless device 2300 may initiate the second LBT failure recovery procedure during the (ongoing) LBT failure recovery procedure for the uplink BWP of the cell. The wireless device 2300 may cancel the (ongoing) LBT failure recovery procedure of the cell, for example, based on he initiating the second LBT failure recovery procedure during the (ongoing) LBT failure recovery procedure.

The wireless device 2300 may trigger transmission of a second uplink signal (e.g., a SR, random access preamble) for a second LBT failure recovery procedure of the second uplink BWP of the second cell based on detecting/determining/declaring the second uplink LBT failure. The wireless device 2300 may trigger transmission of the second uplink signal, for example, during the (ongoing) LBT failure recovery procedure for the uplink BWP of the cell. The wireless device 2300 may cancel the (ongoing) LBT failure recovery procedure of the cell, for example, based on triggering transmission of the second uplink signal during the (ongoing) LBT failure recovery procedure. The wireless device 2300 may send/transmit the second uplink signal for the second LBT failure recovery procedure of the second uplink BWP of the second cell, for example, based on canceling the (ongoing) LBT failure recovery procedure.

A wireless device may monitor uplink LBT failures in an uplink BWP of a cell. The monitoring the uplink LBT failures may comprise performing one or more LBT procedures in/for uplink transmissions (e.g., PUSCH transmissions, PRACH transmissions, PUCCH transmissions, SRS transmissions) via the uplink BWP. The wireless device may determine a failure of at least one LBT procedure in/for the uplink transmissions based on the performing the one or more LBT procedures. The one or more LBT procedures may comprise the at least one LBT procedure. The wireless device may increment an LBT failure counter based on the determining the failure of the at least one LBT procedure. The wireless device may determine a first value of the LBT failure counter based on the incrementing.

The wireless device may receive/detect (e.g., from a base station) a downlink signal (e.g., a reference signal, a DMRS via PDCCH, a DMRS via GC-PDCCH, a PDCCH transmission, a GC-PDCCH transmission, DCI (e.g., corresponding to DCI format 2_0, or any other DCI format), etc.). The wireless device may determine a downlink burst of the base station, for example, based on the receiving/detecting the downlink signal. The wireless device may determine/assume that the base station has acquired a channel (e.g., a licensed channel, an unlicensed channel) serving the wireless device, for example, based on the receiving/detecting the downlink signal. The wireless device may determine a start of a channel occupancy time (COT), based on the receiving/detecting the downlink signal. The downlink signal may indicate the COT. The downlink signal may be group common DCI for a group of wireless devices comprising the wireless device. The downlink signal may be wireless device-specific DCI. The DCI may indicate COT information (e.g., a duration of COT, PDCCH monitoring information, etc).

The wireless device may start the COT, for example, based on receiving/detecting the downlink signal for the COT. The COT may correspond to a COT duration. The downlink signal may indicate the COT duration. The one or more configuration parameters may indicate the COT duration. The wireless device may stop an LBT detection timer, for example, based on starting the COT. The COT may complete/end. The COT may complete/end at the end of the COT duration. The wireless device may restart the LBT detection timer based on the end of the COT (e.g. or based on the end of the COT).

The wireless device may restart the LBT detection timer, for example, for example, based on starting the COT. The wireless device may or may not reset a first value of the LBT failure counter (e.g., to zero) in the COT (or during the COT duration). The LBT detection timer may expire during the COT duration. The wireless device may or may not reset, during the COT duration, the first value of the LBT failure counter (e.g., to zero) based on the LBT detection timer expiring. The wireless device may start counting/controlling/managing the LBT failure counter based on the first value, for example, based on the end of the COT (e.g., or based on the end of the COT duration). The wireless device may perform the LBT failure detection based on the first value, for example, based on the end of the COT (e.g., or based on the end of the COT duration). The wireless device may keep counting/incrementing the LBT failure counter from a value (e.g., 3, or any other value), for example, after the COT duration (or at the end of the COT) if the LBT failure counter before the COT duration (e.g., at the start of the COT) is equal to the value. The wireless device may not reset the LBT failure counter to zero, for example, during the COT duration.

The wireless device may or may not monitor uplink LBT failures in the uplink BWP of the cell, for example, based on starting the COT (or during the COT). The not monitoring the uplink LBT failures may comprise not performing one or more LBT procedures in/for uplink transmissions via the uplink BWP. The wireless device may stop an LBT failure detection for the uplink BWP, for example, based on starting the COT (or during the COT).

Figure 24:
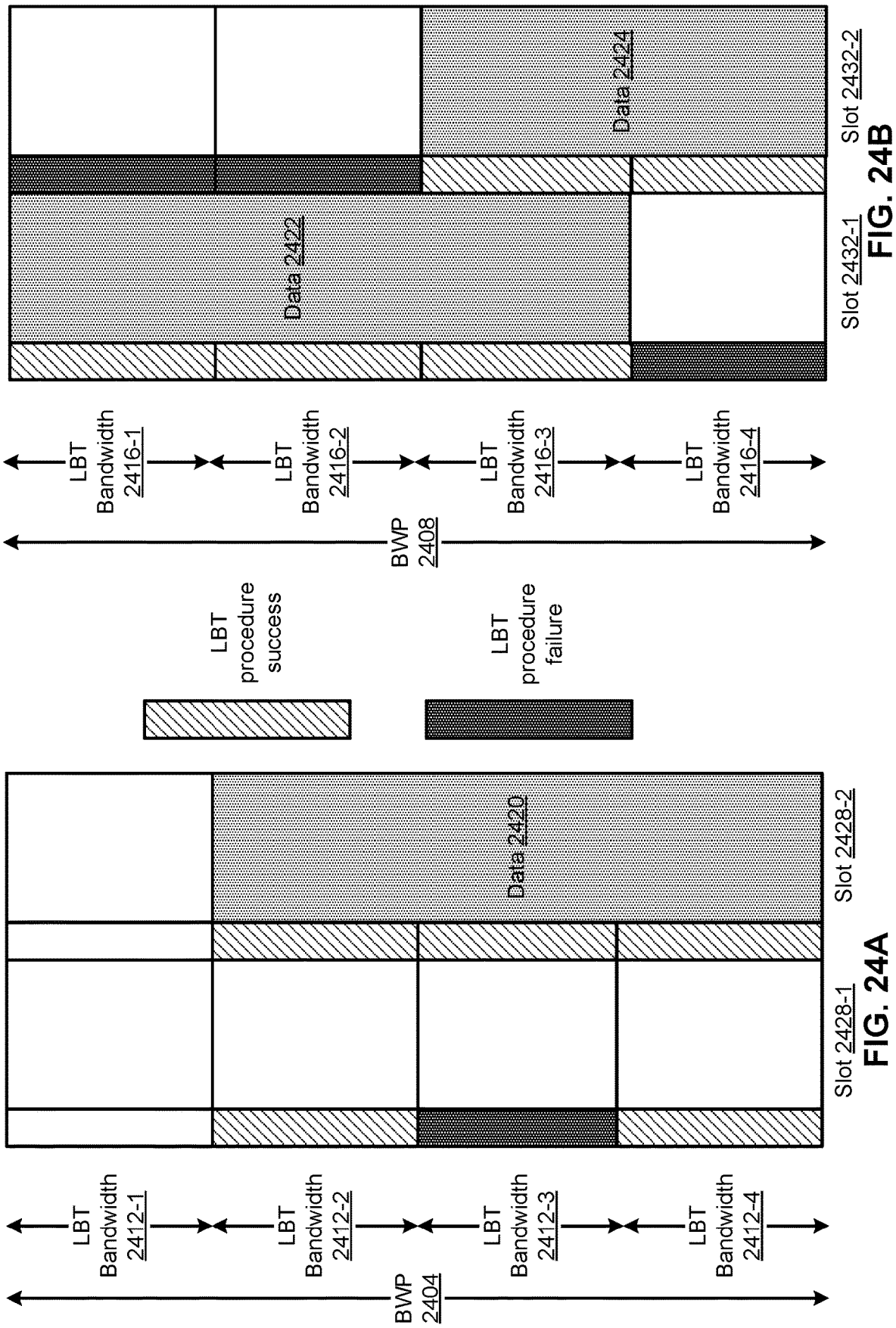
FIG. 24A and FIG. 24B show example transmission of data based on LBT failure detection.

FIG. 24A and FIG. 24B show example transmission of data based on LBT failure detection. A wireless device may send/transmit data via a plurality of LBT bandwidths in an uplink BWP, for example, if LBT procedures on each of the plurality of LBT bandwidths is successful. A wireless device may send/transmit data via at least one LBT bandwidth of a plurality of LBT bandwidths in an uplink BWP, for example, if LBT procedures on the at least one LBT bandwidth of the plurality of LBT bandwidths is successful.

With reference to FIG. 24A, the wireless device may receive DCI. The DCI may schedule transmission of TB (e.g., a PUSCH transmission) via an uplink BWP 2404. The TB may be scheduled for transmission in one or more LBT bandwidths of a plurality of LBT bandwidths comprising the uplink BWP 2404. The TB comprising the one or more LBT bandwidths may comprise that a frequency resource allocation (e.g., physical resource block, subcarriers) of the TB may comprise the one or more LBT bandwidths. The one or more LBT bandwidths of the TB comprise LBT bandwidth 2412-2, LBT bandwidth 2412-3, and LBT bandwidth 2412-4.

The wireless device may perform, for transmission of the TB, one or more LBT procedures in/on the one or more LBT bandwidths associated with a wireless device and/or the TB. The wireless device may perform, for transmission of the TB, a respective LBT procedure of the one or more LBT procedures in/on each LBT bandwidth of the one or more LBT bandwidths. The wireless device may perform, for transmission of the TB, each LBT procedure of the one or more LBT procedures in/on a respective LBT bandwidth of the one or more LBT bandwidths. The wireless device may perform a first LBT procedure in/on LBT bandwidth 2412-2, a second LBT procedure in/on LBT bandwidth 2412-3, and a third LBT procedure in/on LBT bandwidth 2412-4.

The wireless device may determine (or detect) a failure of at least one LBT procedure among the one or more LBT procedures (e.g., at slot 2428-1). The wireless device may determine (or detect) a failure of the second LBT procedure in/on LBT bandwidth 2412-3. The wireless device may not send (e.g., refrain from sending/transmitting) the TB, for example, if the wireless device determines a failure of at least LBT procedure of the one or more LBT procedures. The wireless device may refrain from sending the TB at slot 2428-1, for example, based on determining a failure of the second LBT procedure in/on LBT bandwidth 2412-3.

The wireless device may send/transmit the TB, for example, if the wireless device determines all LBT procedures of the one or more LBT procedures are successful. The wireless device may determine a success of the first LBT procedure in/on LBT bandwidth 2412-2, a success of the second LBT procedure in/on LBT bandwidth 2412-3, and a success of the third LBT procedure in/on LBT bandwidth 2412-4. The wireless device may send the TB (e.g., data 2420) at slot 2428-2 via the one or more LBT bandwidths, for example, based on determining success of the first LBT procedure in/on LBT bandwidth 2412-2, the second LBT procedure in/on LBT bandwidth 2412-3, and the third LBT procedure in/on LBT bandwidth 2412-4.

With reference to FIG. 24B, the wireless device may receive DCI. The DCI may schedule transmission of TB (e.g., a PUSCH transmission) via an uplink BWP 2404. The TB may be scheduled for transmission in one or more LBT bandwidths of a plurality of LBT bandwidths comprising the uplink BWP 2408. The TB comprising the one or more LBT bandwidths may comprise that a frequency resource allocation (e.g., physical resource block, subcarriers) of the TB may comprise the one or more LBT bandwidths. The one or more LBT bandwidths of the TB comprise LBT bandwidth 2416-1, LBT bandwidth 2416-2, LBT bandwidth 2416-3, and LBT bandwidth 2416-4.

The wireless device may perform, for transmission of the TB, one or more LBT procedures in/on the one or more LBT bandwidths associated with the wireless device and/or the TB. The wireless device may perform, for transmission of the TB, a respective LBT procedure of the one or more LBT procedures in/on each LBT bandwidth of the one or more LBT bandwidths. The wireless device may perform, for transmission of the TB, each LBT procedure of the one or more LBT procedures in/on a respective LBT bandwidth of the one or more LBT bandwidths. The wireless device may perform a first LBT procedure in/on LBT bandwidth 2416-1, a second LBT procedure in/on LBT bandwidth 2416-2, a third LBT procedure in/on LBT bandwidth 2416-3, and a fourth LBT procedure in/on LBT bandwidth 2416-4.

The wireless device may send/transmit the TB (e.g., data 2422), for example, via LBT bandwidths for which LBT procedures are successful. The wireless device may send the TB (e.g., data 2422) at slot 2432-1 via the LBT bandwidths 2416-1, 2416-2, and 2416-3, for example, based on determining a success of the first LBT procedure, the second LBT procedure, and the third LBT procedure, and a failure of the fourth LBT procedure. The wireless device may send/transmit the TB (e.g., data 2424) at slot 2432-2 via the LBT bandwidths 2416-3 and 2416-4, for example, based on determining a success of the third LBT procedure and the fourth LBT procedure, and a failure of the first LBT procedure and the second LBT procedure.

Figure 25:
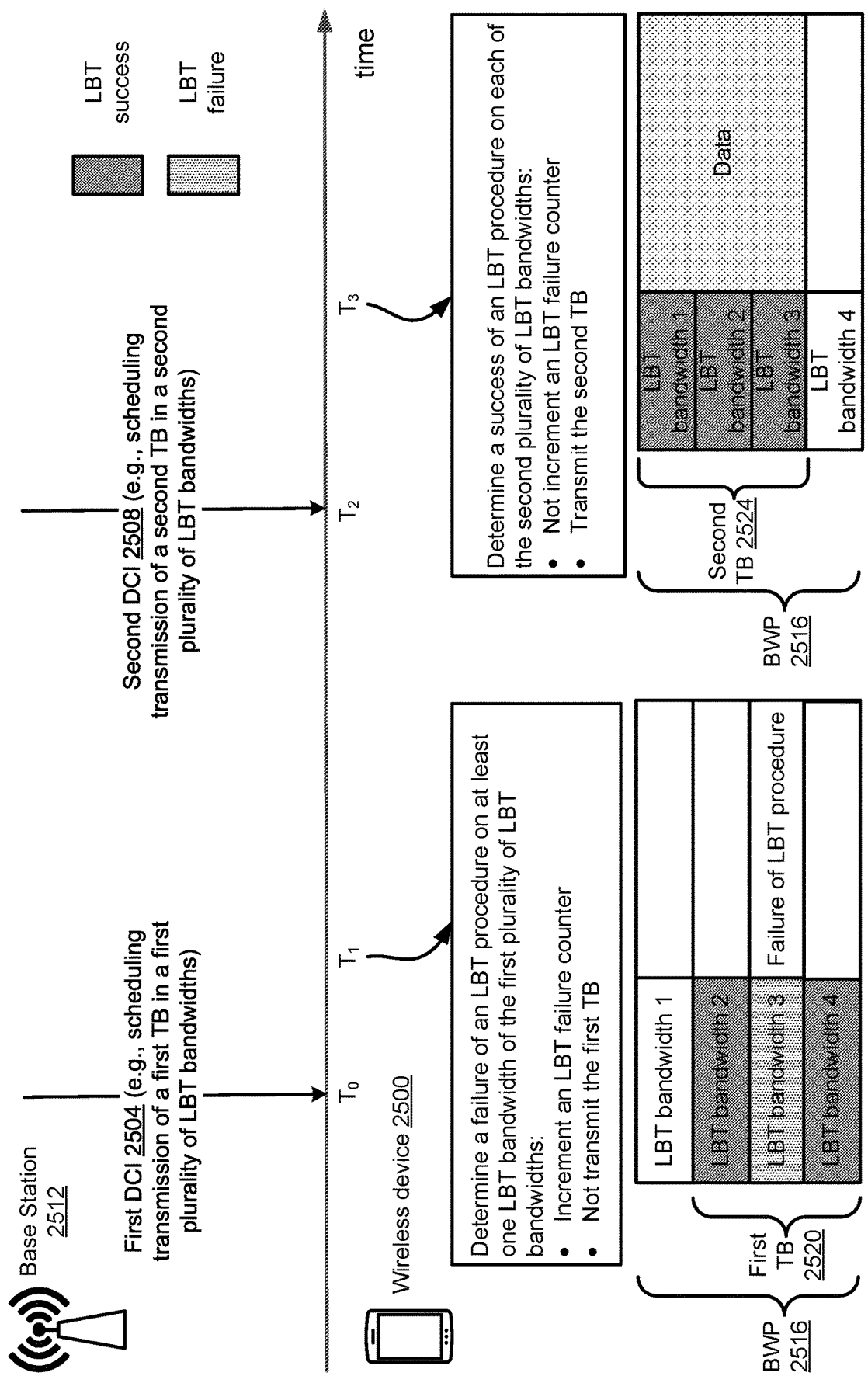
FIG. 25 show example transmission of data based on LBT failure detection.

FIG. 25 shows example transmission of data based on LBT failure detection. A wireless device 2500 may send/transmit data via a plurality of LBT bandwidths in an uplink BWP, for example, if LBT procedures on each of the plurality of LBT bandwidths is successful. The wireless device 2500 may not send/transmit data, for example, if LBT procedures on at least one of the plurality of LBT bandwidths is unsuccessful.

Figure 26:
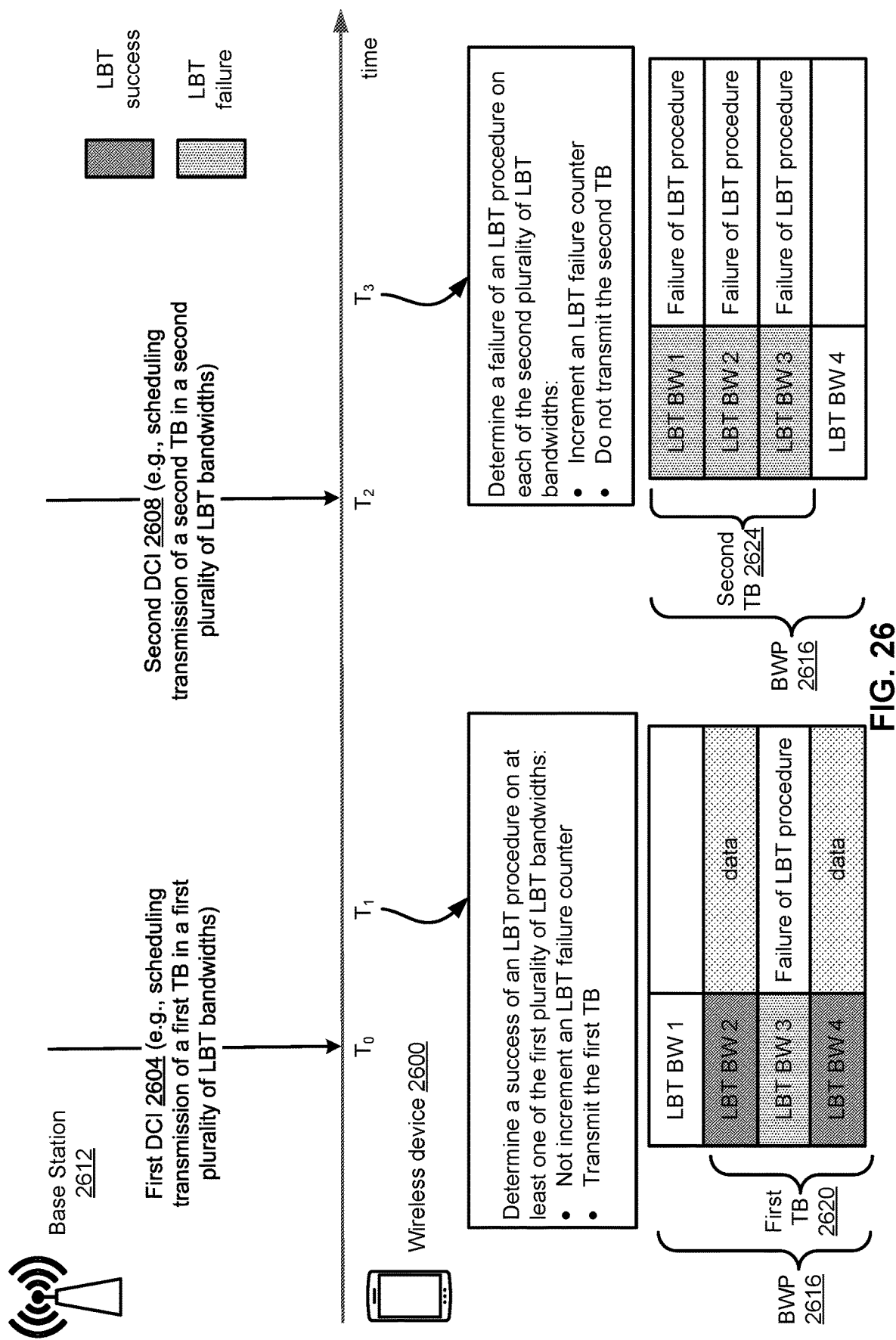
FIG. 26 show example transmission of data based on LBT failure detection.

FIG. 26 shows example transmission of data based on LBT failure detection. A wireless device 2600 may send/transmit data via at least one LBT bandwidth of a plurality of LBT bandwidths in an uplink BWP, for example, if LBT procedures on the at least one LBT bandwidth of the plurality of LBT bandwidths is successful. The wireless device 2600 may not send/transmit data, for example, if LBT procedures on all of the plurality of LBT bandwidths is unsuccessful.

A wireless device (e.g., the wireless device 2500 and/or the wireless device 2600) may receive one or more messages. The wireless device may receive the one or more messages from a base station (e.g., a base station 2512 and/or a base station 2612). The one or more messages may comprise one or more configuration parameters. The one or more configuration parameters may be for a cell. The cell may be a PCell. The cell may be an SCell. The cell may be a PUCCH SCell. The cell may be an unlicensed cell (e.g., a cell operating in an unlicensed band). The cell may be a licensed cell (e.g., a cell operating in a licensed band).

The cell may comprise one or more uplink BWPs comprising an uplink BWP (e.g., BWP 2516 or BWP 2616). The wireless device may activate the uplink BWP. The wireless device may monitor uplink LBT failures for an uplink transmission (e.g., a RACH transmission, an SRS transmission, a PUSCH transmission, a PUCCH transmission, etc) via the uplink BWP. The wireless device may monitor uplink LBT failures for an LBT failure detection of the uplink BWP (as described with reference to FIG. 17). The uplink BWP may comprise a plurality of LBT bandwidths (e.g., LBT bandwidth 1, LBT bandwidth 2, LBT bandwidth 3, LBT bandwidth 4, as shown in FIG. 25 and FIG. 26).

The wireless device may receive DCI). The DCI (e.g., first DCI 2504 at time T0, second DCI 2508 at time T2 in FIG. 25; first DCI 2604, second DCI 2608 in FIG. 26) may schedule transmission of a TB (e.g., a PUSCH transmission) via the uplink BWP. A first DCI and a second DCI may schedule transmissions of a first TB and a second TB, respectively. The first DCI 2504 and the second DCI 2508 may schedule transmissions of the first TB 2520 and the second TB 2524, respectively. The first DCI 2604 and the second DCI 2608 may schedule transmissions of the first TB 2620 and the second TB 2624, respectively.

The TB (e.g., the first TB 2520, the second TB 2524 in FIG. 25; and the first TB 2620 and the second TB 2624 in FIG. 26) may comprise one or more LBT bandwidths of the plurality of LBT bandwidths. The TB comprising the one or more LBT bandwidths may comprise that a frequency resource allocation (e.g., physical resource block, subcarriers) of the TB may comprise the one or more LBT bandwidths. The one or more LBT bandwidths (e.g., a first plurality of LBT bandwidths) of the first TB (e.g., the first TB 2520 or the first TB 2620) may comprise LBT bandwidth 2, LBT bandwidth 3, and LBT bandwidth 4. The one or more LBT bandwidths (e.g., a second plurality of LBT bandwidths) of the second TB (e.g., the second TB 2524 or the second TB 2624) may comprise LBT bandwidth 1, LBT bandwidth 2, and LBT bandwidth 3.

The wireless device may perform, for transmission of the TB, one or more LBT procedures in/on the one or more LBT bandwidths associated with the wireless device and/or the TB. The wireless device may perform, for transmission of the TB, a respective LBT procedure of the one or more LBT procedures in/on each LBT bandwidth of the one or more LBT bandwidths. The wireless device may perform, for transmission of the TB, each LBT procedure of the one or more LBT procedures in/on a respective LBT bandwidth of the one or more LBT bandwidths. The wireless device may perform, for the first TB (e.g., the first TB 2520 and/or the first TB 2620), a first LBT procedure in/on LBT bandwidth 2, a second LBT procedure in/on LBT bandwidth 3, a third LBT procedure in/on LBT bandwidth 4. The wireless device may perform, for the second TB (e.g., the second TB 2524 and/or the second TB 2624), a first LBT procedure in/on LBT bandwidth 1, a second LBT procedure in/on LBT bandwidth 2, a third LBT procedure in/on LBT bandwidth 3.

The wireless device may perform, for the TB, the one or more LBT procedures in parallel. The performing, for the TB, the one or more LBT procedures in parallel may comprise performing, for the TB, the one or more LBT procedures simultaneously (or substantially simultaneously).

The wireless device may perform, for the TB, the one or more LBT procedures at different times (or at similar times). Performing, for the TB, the one or more LBT procedures at different times may comprise performing, for the TB, one or more first LBT procedures of the one or more LBT procedures at a first time and one or more second LBT procedures of the one or more LBT procedures at a second time. The first and the second time may be different. The first and the second time may be the same or substantially the same.

The wireless device (e.g., the wireless device 2500) may determine (or detect) a failure of at least one LBT procedure among the one or more LBT procedures (e.g., at time T1 in FIG. 25). Determining the failure of at least one LBT procedure may comprise determining the failure of the at least one LBT procedure on at least one LBT bandwidth of the one or more LBT bandwidths. The wireless device may perform each LBT procedure of the at least one LBT procedure on a respective LBT bandwidth of the at least one LBT bandwidth. Determining the failure of the at least one LBT procedure on the at least one LBT bandwidth may comprise determining a failure of each LBT procedure, of the at least one LBT procedure, on a respective LBT bandwidth of the at least one LBT bandwidth. Determining the failure of at least one LBT procedure may comprise determining a failure of an LBT procedure on at least one LBT bandwidth of the one or more LBT bandwidths. The at least one LBT procedure of the first TB may comprise the second LBT procedure in/on LBT bandwidth 3, for example, as shown in FIG. 25.

The wireless device (e.g., the wireless device 2500) may support at least a first type of uplink transmission. The wireless device may be capable of supporting a first type of uplink transmission. The wireless device may send/transmit, to a base station, at least one message comprising capability parameters. The capability parameters may indicate that the wireless device supports the first type of uplink transmission. The wireless device may transmit the TB (e.g., the second TB 2524) based on the first type of uplink transmission, for example, if the wireless device supports the first type of uplink transmission.

The one or more configuration parameters may indicate at least a first type of uplink transmission among one or more types of uplink transmissions. The DCI (e.g., the first DCI 2504 and/or the second DCI 2508) may comprise a field indicating a first type of uplink transmission among one or more types of uplink transmissions. The one or more configuration parameters may indicate the one or more types of uplink transmissions.

The wireless device may drop, in the first type of uplink transmission, transmission of the TB (e.g., the first TB 2520 at time T1), for example, based on determining the failure of the at least one LBT procedure. The wireless device may not send/transmit, in the first type of uplink transmission, the TB (e.g., the first TB 2520 at time T1), for example, based on determining the failure of the at least one LBT procedure.

The wireless device (e.g., the wireless device 2500) may increment (e.g., at or after time T1 in FIG. 25), an LBT failure counter (e.g., the LBT failure counter as described with reference to FIG. 17) if the wireless device determines the failure of the at least one LBT procedure, for example, based on the first type of uplink transmission. The wireless device may increment an LBT failure counter if the wireless device determines the failure of the at least one LBT procedure, for example, based on the capability parameters indicating that the wireless device supports the first type of uplink transmission. The wireless device may increment an LBT failure counter if the wireless device determines the failure of the at least one LBT procedure, for example, based on the DCI indicating the first type of uplink transmission. The wireless device may increment an LBT failure counter if the wireless device determines the failure of the at least one LBT procedure, for example, based on the one or more configuration parameters indicating the first type of uplink transmission.

The wireless device may determine (or detect) a failure and/or a success of an LBT procedure. The wireless device may determine (or detect) a failure of at least one first LBT procedure among the one or more LBT procedures and a success of at least one second LBT procedure among the one or more LBT procedures (e.g., at or after time T1 in FIG. 26, FIG. 24B in slot 2332-1 and slot 2332-2). Determining the failure of at least one first LBT procedure and the success of the at least one second LBT procedure may comprise that the wireless device determines a failure of at least one first LBT procedure, but not all, of the one or more LBT procedures. Determining the failure of at least one first LBT procedure, but not all, of the one or more LBT procedures may comprise determining the failure of the at least one first LBT procedure on at least one first LBT bandwidth, but not all, of the one or more LBT bandwidths. The wireless device may perform each LBT procedure of the at least one first LBT procedure on a respective LBT bandwidth of the at least one first LBT bandwidth. Determining the failure of at least one first LBT procedure on the at least one first LBT bandwidth may comprise determining a failure of each LBT procedure, of the at least one first LBT procedure, on a respective LBT bandwidth of the at least one first LBT bandwidth.

Determining the failure of at least one first LBT procedure and the success of the at least one second LBT procedure may comprise that the wireless device determines a success of at least one second LBT procedure, but not all, of the one or more LBT procedures. Determining the success of at least one second LBT procedure, but not all, of the one or more LBT procedures may comprise determining the success of the at least one second LBT procedure on at least one second LBT bandwidth, but not all, of the one or more LBT bandwidths. The wireless device may perform each LBT procedure of the at least one second LBT procedure on a respective LBT bandwidth of the at least one second LBT bandwidth. Determining the success of at least one second LBT procedure on the at least one second LBT bandwidth may comprise determining a success of each LBT procedure, of the at least one second LBT procedure, on a respective LBT bandwidth of the at least one second LBT bandwidth.

The one or more LBT bandwidths may comprise the at least one first LBT bandwidth and the at least one second LBT bandwidth. The at least one first LBT bandwidth and the at least one second LBT bandwidth may be orthogonal. The at least one first LBT bandwidth and the at least one second LBT bandwidth may (or may not) overlap. The at least one first LBT bandwidth may comprise an LBT bandwidth of the one or more LBT bandwidths. The at least one second LBT bandwidth may not comprise the LBT bandwidth, for example, based on the at least one first LBT bandwidth and the at least one second LBT bandwidth being orthogonal (or not overlapping). The at least one second LBT bandwidth may comprise an LBT bandwidth of the one or more LBT bandwidths. The at least one first LBT bandwidth may not comprise the LBT bandwidth, for example, based on the at least one first LBT bandwidth and the at least one second LBT bandwidth being orthogonal (or not overlapping).

The at least one second LBT bandwidth may be contiguous in frequency (e.g., LBT bandwidth 2416-1, LBT bandwidth 2416-2, and LBT bandwidth 2416-3 in slot 2432-1 in FIG. 24B; LBT bandwidth 2416-3 and LBT bandwidth 2416-4 in slot 2432-2 in FIG. 24B). LBT bandwidth 2416-1 and LBT bandwidth 2416-3 may not be contiguous in frequency. LBT bandwidth 2416-2 and LBT bandwidth 2416-4 may not be contiguous in frequency. LBT bandwidth 2416-1 and LBT bandwidth 2416-2 may be contiguous in frequency. LBT bandwidth 2416-3 and LBT bandwidth 2416-4 may be contiguous in frequency.

With reference to FIG. 24B, the at least one first LBT procedure may comprise the first LBT procedure in/on LBT bandwidth 2416-1 and the second LBT procedure in/on LBT bandwidth 2416-2. The at least one second LBT procedure may comprises the third LBT procedure in/on LBT bandwidth 2416-3 and the fourth LBT procedure in/on LBT bandwidth 2416-4.

With reference to FIG. 26, the at least one first LBT procedure, of the first TB, may comprise the second LBT procedure on LBT bandwidth 3. The at least one second LBT procedure, of the first TB, may comprise the first LBT procedure on LBT bandwidth 2 and the third LBT procedure on LBT bandwidth 4.

The wireless device (e.g., the wireless device 2600) may support at least a second type of uplink transmission. The wireless device may be capable of supporting a second type of uplink transmission. The wireless device may send/transmit, to a base station, at least one message comprising capability parameters. The capability parameters may indicate that the wireless device supports the second type of uplink transmission. The wireless device may send/transmit the TB (e.g., the first TB 2620 and/or the second TB 2624) based on the second type of uplink transmission.

The one or more configuration parameters may indicate at least a second type of uplink transmission among one or more types of uplink transmissions. The DCI (e.g., the first DCI 2604 and/or the second DCI 2608) may comprise a field indicating a second type of uplink transmission among one or more types of uplink transmissions. The one or more configuration parameters may indicate the one or more types of uplink transmissions. The base station (e.g., the base station 2512 or the base station 2612) may indicate the first type of uplink transmission or the second type of uplink transmission based on a deployment scenario of the cell. The base station may indicate the second type of uplink transmission in a high-interference environment and a first type of uplink transmission in a low-interference environment, etc.

The wireless device (e.g., the wireless device 2600) may perform transmission of the TB via the at least one second LBT bandwidth of the uplink BWP (e.g., at or after time T1 in FIG. 26), for example, in the second type of uplink transmission and based on the determining the success of the at least one second LBT procedure. The wireless device (e.g., the wireless device 2600) may send/transmit the TB (e.g., the first TB 2620 at or after time T1 in FIG. 26) via the at least one second LBT bandwidth of the uplink BWP, for example, in the second type of uplink transmission and based on the determining the success of the at least one second LBT procedure.

The wireless device supporting (or capable of) the second type of uplink transmission may cause a change of a format (e.g., re-encoding or puncturing, PHY channel reformatting, baseband filtering, adaptive filtering, etc.) of the TB (e.g., a PUSCH transmission), for example, based on determining the failure of at least one first LBT procedure and the success of at least one second LBT procedure. The wireless device supporting (or capable of) the second type of uplink transmission may change the format in a processing time, for example, based on determining the failure of at least one first LBT procedure and the success of at least one second LBT procedure. A second wireless device not capable of the second type of uplink transmission may not change the format of the TB in the processing time, for example, based on determining the failure of at least one first LBT procedure and the success of at least one second LBT procedure.

The wireless device (e.g., the wireless device 2600) may perform transmission of the TB (e.g., the first TB 2620 at or after time T1 in FIG. 26) via the at least one second LBT bandwidth of the uplink BWP, for example, in the second type of uplink transmission and based on determining the failure of at least one first LBT procedure and the success of the at least one second LBT procedure on the at least one second LBT bandwidth. The wireless device may send/transmit the TB (e.g., the first TB 2620 at or after time T1 in FIG. 26) via the at least one second LBT bandwidth of the uplink BWP, for example, in the second type of uplink transmission and based on determining the success of the at least one second LBT procedure.

The wireless device (e.g., the wireless device 2600) may not increment (e.g., at or after time T1 in FIG. 26) an LBT failure counter (e.g., the LBT failure counter as described with reference to FIG. 17), for example, if the wireless device determines the failure of at least one first LBT procedure and the success of the at least one second LBT procedure, for example, based the second type of uplink transmission. The wireless device may not increment an LBT failure counter if the wireless device determines the failure of at least one first LBT procedure and the success of the at least one second LBT procedure, for example, based on the capability parameters indicating that the wireless device supports the second type of uplink transmission. The wireless device may not increment an LBT failure counter if the wireless device determines the failure of at least one first LBT procedure and the success of the at least one second LBT procedure, for example, based on the DCI indicating the second type of uplink transmission. The wireless device may not increment an LBT failure counter if the wireless device determines the failure of at least one first LBT procedure and the success of the at least one second LBT procedure, for example, based on the one or more configuration parameters indicating the second type of uplink transmission.

The wireless device (e.g., the wireless device 2500) may determine (or detect) a success of the one or more LBT procedures (e.g., at or after time T3 in FIG. 25). Determining the success of the one or more LBT procedures may comprise determining a success of each LBT procedure, of the one or more LBT procedures, on a respective LBT bandwidth of the one or more LBT bandwidths. Determining the success of the one or more LBT procedures may comprise determining a success of an LBT procedure on each LBT bandwidth of the one or more LBT bandwidths. The wireless device may determine, for the second TB (e.g., the second TB 2524), a success of the first LBT procedure in/on LBT bandwidth 1, a success of the second LBT procedure in/on LBT bandwidth 2, and a success of the third LBT procedure in/on LBT bandwidth 3.

The wireless device (e.g., the wireless device 2500) may perform transmission of the TB (e.g., the second TB 2524 at or after time T3 in FIG. 25) based on determining the success of the one or more LBT procedures, for example, in the first type of uplink transmission. The wireless device may transmit the TB (e.g., the second TB 2524 at or after time T3 in FIG. 25) based on determining the success of the one or more LBT procedures, for example, in the first type of uplink transmission. The wireless device may transmit the TB via the one or more LBT bandwidths of the uplink BWP.

The wireless device (e.g., the wireless device 2500) may not increment (e.g., at or after time T3 in FIG. 25) an LBT failure counter (e.g., the LBT failure counter as described with reference to FIG. 17) if the wireless device determines the success of the one or more LBT procedures, for example, based on the first type of uplink transmission. The wireless device may not increment an LBT failure counter if the wireless device determines the success of the one or more LBT procedures, for example, based on the capability parameters indicating that the wireless device supports the first type of uplink transmission. The wireless device may not increment an LBT failure counter if the wireless device determines the success of the one or more LBT procedures, for example, based on the DCI indicating the first type of uplink transmission. The wireless device may not increment an LBT failure counter if the wireless device determines the success of the one or more LBT procedures, for example, based on the one or more configuration parameters indicating the first type of uplink transmission.

The wireless device (e.g., the wireless device 2600) may determine (or detect) a failure of the one or more LBT procedures (e.g., at or after time T3 in FIG. 26). The determining the failure of the one or more LBT procedures may comprise determining a failure of each LBT procedure, of the one or more LBT procedures, on a respective LBT bandwidth of the one or more LBT bandwidths. Determining the failure of the one or more LBT procedures may comprise determining a failure of an LBT procedure on each LBT bandwidth of the one or more LBT bandwidths. The wireless device may determine (e.g., at or after time T3 in FIG. 26), for the second TB (e.g., the second TB 2624), a failure of the first LBT procedure in/on LBT bandwidth 1, a failure of the second LBT procedure in/on LBT bandwidth 2, and a failure of the third LBT procedure in/on LBT bandwidth 3.

The wireless device (e.g., the wireless device 2600) may drop transmission of the TB (e.g., the second TB 2624 at or after time T3 in FIG. 26) based on determining the failure of the one or more LBT procedures, for example, in the second type of uplink transmission. The wireless device may not send/transmit the TB (e.g., the second TB 2624 at or after time T3 in FIG. 26) based on determining the failure of the one or more LBT procedures, for example, in the second type of uplink transmission.

The wireless device (e.g. the wireless device 2600) may increment (e.g., at or after time T3 in FIG. 26) an LBT failure counter (e.g., the LBT failure counter as described with reference to FIG. 17) if the wireless device determines the failure of the one or more LBT procedures, for example, based on the second type of uplink transmission. The wireless device may increment an LBT failure counter if the wireless device determines the failure of the one or more LBT procedures, for example, based on the capability parameters indicating that the wireless device supports the second type of uplink transmission. The wireless device may increment an LBT failure counter if the wireless device determines the failure of the one or more LBT procedures, for example, based on the DCI indicating the second type of uplink transmission. The wireless device may increment an LBT failure counter if the wireless device determines the failure of the one or more LBT procedures, for example, based on the one or more configuration parameters indicating the second type of uplink transmission.

The wireless device may perform, for an uplink transmission, a first plurality of LBT procedures in/on a first plurality of LBT bandwidths of an uplink BWP. The uplink transmission (e.g., a PUSCH transmission, transport block, a PUCCH transmission, an SRS transmission, a PRACH transmission) may comprise the first plurality of LBT bandwidths. The wireless device may perform, for the uplink transmission, each LBT procedure of the plurality of first LBT procedures in/on a respective LBT bandwidth of the first plurality of LBT bandwidths.

With reference to FIG. 24B, the first plurality of LBT procedures may comprise the first LBT procedure, the second LBT procedure, the third LBT procedure, and the fourth LBT procedure. The first plurality of LBT bandwidths may comprise the LBT bandwidth 2416-1, LBT bandwidth 2416-2, LBT bandwidth 2416-3, and LBT bandwidth 2416-4. The wireless device may perform the first LBT procedure in/on the LBT bandwidth 2416-1, the second LBT procedure in/on the LBT bandwidth 2416-2, the third LBT procedure in/on the LBT bandwidth 2416-3, and the fourth LBT procedure in/on the LBT bandwidth 2416-4.

With reference to FIG. 26, the first plurality of LBT procedures may comprise, for the second TB 2624, a first LBT procedure, a second LBT procedure, and a third LBT procedure. The first plurality of LBT bandwidths may comprise, for the second TB 2624, LBT bandwidth 1, LBT bandwidth 2, and LBT bandwidth 3. The wireless device (e.g., the wireless device 2600) may perform the first LBT procedure in/on the LBT bandwidth 1, the second LBT procedure in/on the LBT bandwidth 2, and the third LBT procedure in/on the LBT bandwidth 3.

The wireless device may perform, for the uplink transmission, the first plurality of LBT procedures in parallel. The performing the first plurality of LBT procedures in parallel may comprise performing the first plurality of LBT procedures simultaneously/parallelly (or substantially simultaneously/parallelly).

The wireless device may determine (or detect) a failure of a second plurality of LBT procedures among the first plurality of LBT procedures. Determining the failure of the second plurality of LBT procedures may comprise determining the failure of the second plurality of LBT procedures on a second plurality of LBT bandwidths of the first plurality of LBT bandwidths. Determining the failure of the second plurality of LBT procedures on the second plurality of LBT bandwidths may comprise determining a failure of each LBT procedure, of the second plurality of LBT procedures, on a respective LBT bandwidth of the second plurality of LBT bandwidths. With reference to FIG. 24B, in the slot 2432-2), the second plurality of LBT procedures may comprise the first LBT procedure in/on the LBT bandwidth 2416-1 and the second LBT procedure in/on the LBT bandwidth 2416-2. The second plurality of LBT bandwidths comprise the LBT bandwidth 1 and the LBT bandwidth 2.

A PHY layer of the wireless device may send/transmit an LBT failure indication to a MAC layer of the wireless device (e.g., at time T1, T2, T3, T4, and T5 such as described with reference to FIG. 17). The LBT failure indication may indicate the failure. The MAC layer of wireless device may increment an LBT failure counter (e.g., by one or any other value), for example, based on receiving the LBT failure indication. The LBT failure indication may not indicate (or comprise) a quantity of the second plurality of LBT procedures. The PHY layer of the wireless device may not indicate the quantity of the second plurality of LBT procedures. The PHY layer of the wireless device may not indicate the quantity of the second plurality of LBT procedures of the first plurality of LBT procedures, for example, based on performing the first plurality of LBT procedures in parallel/simultaneously (or substantially in parallel/simultaneously). The PHY layer of the wireless device may not indicate a quantity of the second plurality of LBT procedures that are performed in parallel/simultaneously (or substantially in parallel/simultaneously). The MAC layer of the wireless device may not be aware of the quantity of the second plurality of LBT procedures, for example, based on the PHY layer of the wireless device not indicating the number of the second plurality of LBT procedures. The MAC layer may increment the LBT failure counter by one based on not being aware of the quantity of the second plurality of LBT procedures.

With reference to FIG. 24B, the MAC layer of the wireless device may increment the LBT counter by one in the second slot 2432-2, for example, if the PHY layer of the wireless device determines a failure of two LBT procedures (e.g., the first LBT procedure in/on the LBT bandwidth 2416-1, the second LBT procedure in/on the LBT bandwidth 2416-2). The MAC layer of the wireless device 2600 may increment the LBT counter by one, for example, if the PHY layer of the wireless device 2600 determines, for the second TB 2624, failure of three LBT procedures (e.g., the first LBT procedure in/on the LBT bandwidth 1, the second LBT procedure in/on the LBT bandwidth 2, the third LBT procedure in/on LBT bandwidth 3).

A PHY layer of the wireless device may send/transmit an LBT failure indication to a MAC layer of the wireless device (e.g., at time T1, T2, T3, T4, and T5 as described with reference to FIG. 17), for example, based on the determining the failure of the second plurality of LBT procedures in/for the uplink transmission. The LBT failure indication may indicate the failure. The MAC layer of wireless device may increment an LBT failure counter by a quantity of the second plurality of LBT procedures, for example, based on receiving the LBT failure indication. The LBT failure indication may indicate (or comprise) the quantity of the second plurality of LBT procedures. The PHY layer of the wireless device may indicate the quantity of the second plurality of LBT procedures. The PHY layer of the wireless device may indicate the quantity of the second plurality of LBT procedures of the first plurality of LBT procedures, for example, based on the performing the first plurality of LBT procedures in parallel/simultaneously (or substantially in parallel/simultaneously). The PHY layer of the wireless device may indicate a quantity of the second plurality of LBT procedures that are performed in parallel/simultaneously (or substantially in parallel/simultaneously). The MAC layer of the wireless device may be aware of the quantity of the second plurality of LBT procedures based on the physical layer (PHY) layer of the wireless device indicating the quantity of the second plurality of LBT procedures. The MAC layer may increment the LBT failure counter by the quantity of the second plurality of LBT procedures based on being aware of the quantity of the second plurality of LBT procedures.

With reference to FIG. 24B, the MAC layer of the wireless device may increment the LBT counter by two in the second slot 2432-2, for example, if the PHY layer of the wireless device determines a failure of two LBT procedures (e.g., the first LBT procedure in/on the LBT bandwidth 2416-1, the second LBT procedure in/on the LBT bandwidth 2416-2). The MAC layer of the wireless device 2600 may increment the LBT counter by three, for example, if the PHY layer of the wireless device 2600 determines, for the second TB 2624, failure of three LBT procedures (e.g., the first LBT procedure in/on the LBT bandwidth 1, the second LBT procedure in/on the LBT bandwidth 2, the third LBT procedure in/on the LBT bandwidth 3).

Figure 27:
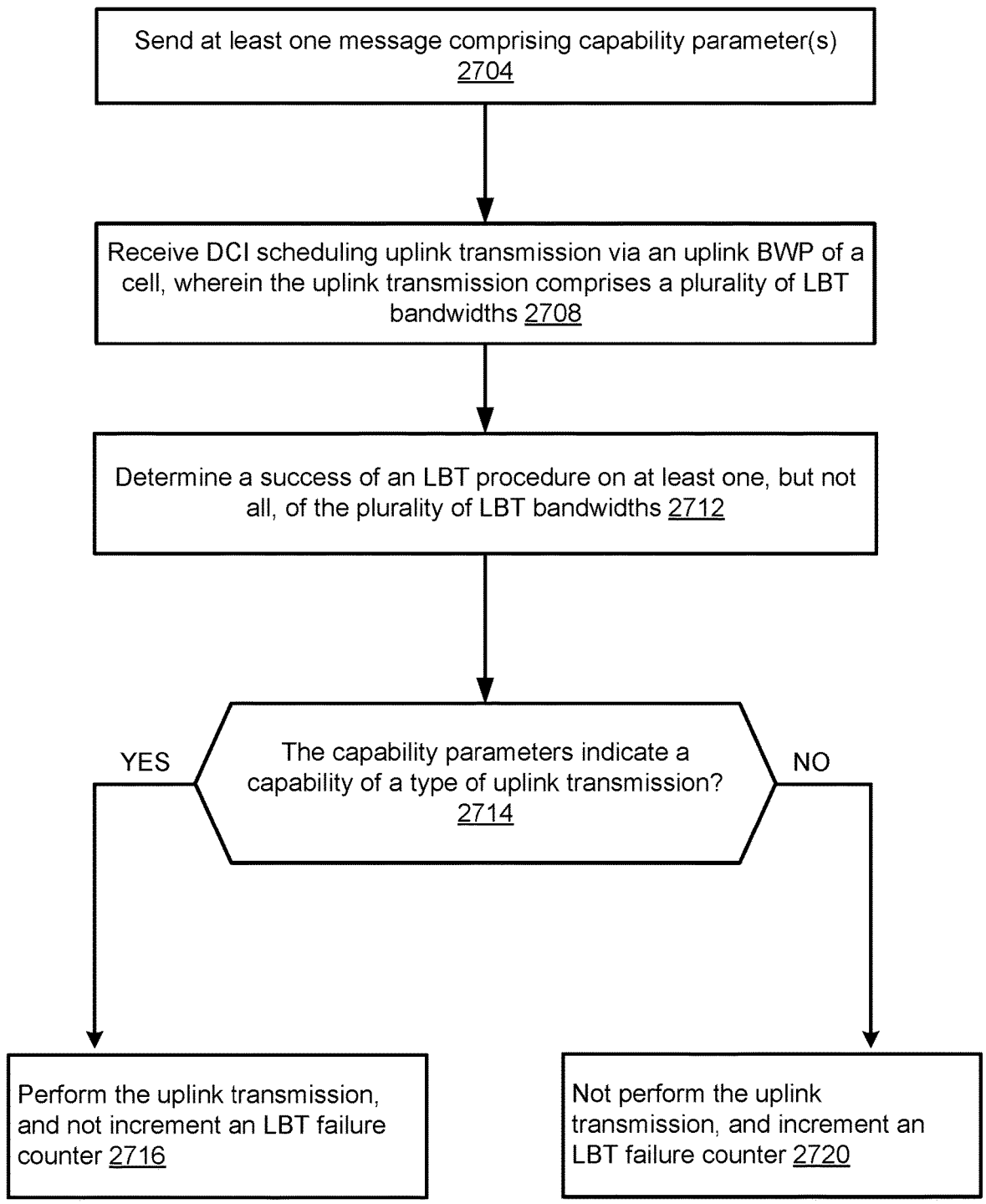
FIG. 27 shows an example method for LBT failure detection.

FIG. 27 shows an example method for an LBT failure detection. The example method 2700 shown in FIG. 27 may be performed by, for example, a wireless device. At step 2704, a wireless device may send/transmit (e.g., to a base station) at least one message comprising one or more capability parameters. The one or more capability parameters may indicate that the wireless device supports a first type of uplink transmission and/or a second type of uplink transmission. At step 2708, the wireless device may receive DCI scheduling an uplink transmission (e.g., a PUSCH transmission, a transmission based on a configured grant) via an uplink BWP of a cell. The uplink transmission may comprise a plurality of LBT bandwidths in the uplink BWP.

At step 2712, the wireless device may determine a success of an LBT procedure on at least one, but not all, of the plurality of LBT bandwidths. At step 2714, the wireless device may determine whether the the one or more capability parameters indicate that the wireless device supports the second type of uplink transmission (e.g., a PUSCH transmission, a PUCCH transmission, etc). At step 2716, the wireless device may not increment an LBT failure counter, for example, based on the determining the success of the LBT procedure on at least one, but not all, of the plurality of LBT bandwidths and based on the one or more capability parameters indicating that the wireless device supports the second type of uplink transmission (e.g., a PUSCH transmission, a PUCCH transmission, etc). The wireless device may not increment the LBT failure counter based on receiving one or more configuration parameters indicating the second type of uplink transmission. The wireless device may not increment the LBT failure counter based on the DCI comprising a field indicating the second type of uplink transmission. At step 2716, the wireless device may perform an uplink transmission via the at least one, but not all, of the plurality of LBT bandwidths.

At step 2720, the wireless device may not increment an LBT failure counter, for example, based on the determining the success of an LBT procedure on at least one, but not all, of the plurality of LBT bandwidths and based on the one or more capability parameters indicating that the wireless device supports the first type of uplink transmission (e.g., a PUSCH transmission, a PUCCH transmission, etc). The wireless device may increment the LBT failure counter based on receiving one or more configuration parameters indicating the first type of uplink transmission. The wireless device may not increment the LBT failure counter based on the DCI comprising a field indicating the first type of uplink transmission. At step 2720, the wireless device may not perform an uplink transmission.

The wireless device may determine a failure of an LBT procedure on at least one LBT bandwidth of the plurality of LBT bandwidths. The wireless device may increment an LBT failure counter based on the determining. The wireless device may increment the LBT failure counter based on the one or more capability parameters. Incrementing the LBT failure counter based on the one or more capability parameters may comprise incrementing the LBT failure counter based on the one or more capability parameters indicating that the wireless device supports the first type of uplink transmission (e.g., a PUSCH transmission, a PUCCH transmission, etc). The wireless device may increment the LBT failure counter based on receiving one or more configuration parameters indicating the first type of uplink transmission. The wireless device may increment the LBT failure counter based on the DCI comprising a field indicating the first type of uplink transmission.

The wireless device may determine a failure of an LBT procedure on each of the plurality of LBT bandwidths. The wireless device may increment an LBT failure counter based on the determining. The wireless device may increment the LBT failure counter based on the one or more capability parameters. The incrementing the LBT failure counter based on the one or more capability parameters may comprise incrementing the LBT failure counter based on the one or more capability parameters indicating that the wireless device supports the second type of uplink transmission (e.g., a PUSCH transmission, a PUCCH transmission, etc). The wireless device may increment the LBT failure counter based on receiving one or more configuration parameters indicating the second type of uplink transmission. The wireless device may increment the LBT failure counter based on the DCI comprising a field indicating the second type of uplink transmission.

The wireless device may determine a success of an LBT procedure on each LBT bandwidth of the plurality of LBT bandwidths. The wireless device may not increment an LBT failure counter based on the determining. The wireless device may not increment the LBT failure counter based on the one or more capability parameters. The not incrementing the LBT failure counter based on the one or more capability parameters may comprise not incrementing the LBT failure counter based on the one or more capability parameters indicating that the wireless device supports the first type of uplink transmission (e.g., a PUSCH transmission, a PUCCH transmission, etc). The wireless device may not increment the LBT failure counter based on receiving one or more configuration parameters indicating the first type of uplink transmission. The wireless device may not increment the LBT failure counter based on the DCI comprising a field indicating the first type of uplink transmission.

A wireless device may perform a method comprising multiple operations. The wireless device may determine a quantity of listen-before-talk (LBT) failures for an active uplink bandwidth part (BWP) of a cell. The wireless device may send, based on the quantity satisfying a threshold, an uplink signal associated with an LBT failure recovery procedure for the active uplink BWP of the cell. The wireless device may abort and/or cancel the LBT failure recovery procedure based on at least one of: receiving, during the LBT failure recovery procedure, LBT failure recovery reconfiguration parameters for the cell; receiving, during the LBT failure recovery procedure, downlink information indicating BWP switching for the cell; deactivating the cell during the LBT failure recovery procedure; or receiving, by a medium access control (MAC) layer of the wireless device from a radio resource control (RRC) layer of the wireless device and during the LBT failure recovery procedure, a request to reset the MAC layer. The wireless device may also perform one or more additional operations. The wireless device may set, based on the aborting and/or cancelling, the quantity of LBT failures to zero. The determining the quantity of LBT failures may comprise determining the quantity during a random access procedure associated with the cell. The determining the quantity of LBT failures may comprise determining the quantity during a random access procedure associated with the cell, the method further comprising, stopping the random access procedure. The wireless device may initiate a beam failure recovery procedure for the cell. The wireless device may cause transmission of: an LBT MAC control element (LBT MAC CE) for the LBT failure recovery procedure; and a beam failure recovery MAC control element (BFR MAC CE) for the beam failure recovery procedure. The wireless device may send a MAC protocol data unit (MAC PDU) comprising a logical channel of the BFR MAC CE before a logical channel of the LBT MAC CE. The sending the uplink signal may comprise sending the uplink signal via a second cell different from the cell. The uplink signal may comprise at least one of: a random access preamble; a scheduling request; or an LBT MAC control element. The wireless device may increment an LBT counter of the cell based on determining an LBT failure of the cell. The wireless device may set, based on aborting and/or cancelling the LBT failure recovery procedure, the LBT counter to zero. The deactivating the cell may be based on at least one of: receiving a MAC control element; or an expiration of a deactivation timer. The downlink information may comprise at least one of: downlink control information (DCI); or an RRC message. The wireless device may receive one or more messages comprising one or more configuration parameters for the cell, wherein the one or more configuration parameters may indicate one or more of: a maximum LBT failure count for the active uplink BWP of the cell; or an LBT failure detection timer for the active uplink BWP of the cell. Determining an LBT failure of the quantity of LBT failures for the active uplink BWP may comprise determining that the active uplink BWP is occupied. Determining an LBT failure of the quantity of LBT failures for the active uplink BWP may comprise performing a clear channel assessment (CCA) check. The wireless device may start or restart an LBT failure detection timer based on the determining an LBT failure of the quantity of LBT failures. The wireless device may set an LBT counter to zero based on an expiry of the LBT failure detection timer. Sending the uplink signal may comprise sending, via a physical uplink control channel (PUCCH) resource, a scheduling request (SR). Sending the uplink signal may comprise sending, via a physical random-access channel (PRACH) resource, a random access preamble. Sending the uplink signal may comprise sending, via a physical uplink shared channel (PUSCH) resource, an LBT failure MAC control element. Sending the uplink signal may comprise sending, based on having a valid uplink grant indicating one or more uplink resources to transmit an LBT failure MAC control element, the LBT failure MAC control element. Sending the uplink signal may comprise sending, based on not having a valid uplink grant indicating one or more uplink resources to transmit an LBT failure MAC control element, a scheduling request. Sending the uplink signal may comprise sending an LBT failure MAC control element, wherein the LBT failure MAC control element may indicate at least one of: the cell; the uplink BWP; a preferred uplink BWP of a plurality of uplink BWPs of the cell; and at least one LBT bandwidth of a plurality of LBT bandwidths of the uplink BWP. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the uplink signal. A computer-readable medium may store instructions that, when executed, cause performance of the described method, additional operations and/or include the additional elements.

A wireless device may perform a method comprising multiple operations. The wireless device may determine a quantity of listen-before-talk (LBT) failures for an active uplink bandwidth part (BWP) of a cell. The wireless device may send, based on the quantity satisfying a threshold, an uplink signal associated with an LBT failure recovery procedure for the active uplink BWP of the cell. The wireless device may abort and/or cancel the LBT failure recovery procedure based on receiving, during the LBT failure recovery procedure, reconfiguration parameters for the cell. The wireless device may also perform one or more additional operations. Aborting and/or cancelling the LBT failure recovery procedure may be further based on at least one of: receiving, during the LBT failure recovery procedure, downlink information indicating BWP switching for the cell; deactivating the cell during the LBT failure recovery procedure; or receiving, by a medium access control (MAC) layer of the wireless device from a radio resource control (RRC) layer of the wireless device and during the LBT failure recovery procedure, a request to reset the MAC layer. The reconfiguration parameters for the cell may comprise LBT failure recovery reconfiguration parameters for the cell. Aborting and/or cancelling the LBT failure recovery procedure may comprise dropping a configured transmission associated with the LBT failure recovery procedure. Determining the quantity of LBT failures may comprise determining the quantity during a random access procedure associated with the cell. The wireless device may stop the random access procedure. The wireless device may initiate a beam failure recovery procedure for the cell. The wireless device may cause transmission of: an LBT MAC control element (LBT MAC CE) for the LBT failure recovery procedure; and a beam failure recovery MAC control element (BFR MAC CE) for the beam failure recovery procedure. The wireless device may send a MAC protocol data unit (MAC PDU) comprising a logical channel of the BFR MAC CE before a logical channel of the LBT MAC CE. The sending the uplink signal may comprise sending the uplink signal via a second cell different from the cell. The wireless device may increment an LBT counter of the cell based on determining an LBT failure of the quantity of LBT failures of the cell. The wireless device may set, based on aborting and/or cancelling the LBT failure recovery procedure, the LBT counter to zero. The wireless device may receive one or more messages comprising one or more configuration parameters for a cell, wherein the one or more configuration parameters may indicate one or more of: a maximum LBT failure count for the active uplink BWP of the cell; or an LBT failure detection timer for the active uplink BWP of the cell. Determining an LBT failure of the quantity of LBT failures for the active uplink BWP may comprise determining that the active uplink BWP is occupied. Determining an LBT failure of the quantity of LBT failures for the active uplink BWP may comprise performing a clear channel assessment (CCA) check. Sending the uplink signal may comprise sending an LBT failure MAC control element, wherein the LBT failure MAC control element may indicate at least one of: the cell; the uplink BWP; a preferred uplink BWP of a plurality of uplink BWPs of the cell; and at least one LBT bandwidth of a plurality of LBT bandwidths of the uplink BWP. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the uplink signal. A computer-readable medium may store instructions that, when executed, cause performance of the described method, additional operations and/or include the additional elements.

A wireless device may perform a method comprising multiple operations. The wireless device may send, based on determining one or more listen-before-talk (LBT) failures for an active uplink bandwidth part (BWP) of a cell, an uplink signal associated with an LBT failure recovery procedure for the active uplink BWP of the cell. The wireless device may abort and/or cancel the LBT failure recovery procedure based on receiving, during the LBT failure recovery procedure, downlink information indicating BWP switching for the cell. The wireless device may also perform one or more additional operations. The sending the uplink signal may be based on a quantity of the one or more LBT failures exceeding a threshold. Aborting and/or cancelling the LBT failure recovery procedure may be further based on at least one of: receiving, during the LBT failure recovery procedure, LBT failure recovery reconfiguration parameters for the cell; deactivating the cell during the LBT failure recovery procedure; or receiving, by a medium access control (MAC) layer of the wireless device from a radio resource control (RRC) layer of the wireless device and during the LBT failure recovery procedure, a request to reset the MAC layer. Aborting and/or cancelling the LBT failure recovery procedure may comprise dropping a configured transmission associated with the LBT failure recovery procedure. Determining the one or more LBT failures may comprise determining the one or more LBT failures during a random access procedure associated with the cell. The wireless device may stop the random access procedure. The wireless device may initiate a beam failure recovery procedure for the cell. The wireless device may cause transmission of: an LBT MAC control element (LBT MAC CE) for the LBT failure recovery procedure; and a beam failure recovery MAC control element (BFR MAC CE) for the beam failure recovery procedure. The wireless device may send a MAC protocol data unit (MAC PDU) comprising a logical channel of the BFR MAC CE before a logical channel of the LBT MAC CE. The wireless device may increment an LBT counter of the cell based on determining an LBT failure of the one or more LBT failures of the cell. The wireless device may set, based on aborting and/or cancelling the LBT failure recovery procedure, the LBT counter to zero. The downlink information may comprise at least one of: downlink control information (DCI); or an RRC message. The wireless device may receive one or more messages comprising one or more configuration parameters for a cell, wherein the one or more configuration parameters may indicate one or more of: a maximum LBT failure count for the active uplink BWP of the cell; or an LBT failure detection timer for the active uplink BWP of the cell. Determining an LBT failure of the one or more LBT failures for the active uplink BWP may comprise determining that the active uplink BWP is occupied. Determining an LBT failure of the one or more of LBT failures for the active uplink BWP may comprise performing a clear channel assessment (CCA) check. The wireless device may start or restart an LBT failure detection timer based on the detecting an LBT failure of the one or more LBT failures. The wireless device may set an LBT counter to zero based on an expiry of an LBT failure detection timer. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the uplink signal. A computer-readable medium may store instructions that, when executed, cause performance of the described method, additional operations and/or include the additional elements.

A wireless device may perform a method comprising multiple operations. The wireless device may initiate a random access procedure for a cell. The wireless device may trigger, during the random access procedure, a listen-before-talk (LBT) failure recovery procedure of the cell. The wireless device may, based on the triggering: stop the random access procedure; and transmit, for the LBT failure recovery procedure, an uplink signal. The wireless device may also perform one or more additional operations. The initiating the random access procedure may be based on detecting a beam failure for the cell. The wireless device may determine a quantity of LBT failures for an active uplink bandwidth part (BWP) of the cell, wherein the triggering the LBT failure recovery procedure may be based on the quantity of LBT failures satisfying a threshold. The wireless device may abort and/or cancel the LBT failure recovery procedure based on receiving, during the LBT failure recovery procedure, LBT failure recovery reconfiguration parameters for the cell. The wireless device may abort and/or cancel the LBT failure recovery procedure based on receiving, during the LBT failure recovery procedure, downlink information indicating bandwidth part (BWP) switching for the cell. The wireless device may abort and/or cancel the LBT failure recovery procedure based on deactivating the cell during the LBT failure recovery procedure. The wireless device may abort and/or cancel the LBT failure recovery procedure based on receiving, by a medium access control (MAC) layer of the wireless device from a radio resource control (RRC) layer of the wireless device and during the LBT failure recovery procedure, a request to reset the MAC layer. The wireless device may complete the LBT failure recovery procedure based on receiving an uplink grant scheduling a new transmission for a hybrid automatic repeat request (HARQ) process, wherein an index of the HARQ process may be the same as an index of a HARQ process of a physical uplink scheduled channel (PUSCH) transmission comprising the uplink signal. The wireless device may reset, based on completing the LBT failure recovery procedure: an LBT counter; and an LBT failure detection timer. The wireless device may receive one or more messages comprising one or more configuration parameters for the cell, wherein the one or more configuration parameters may indicate one or more of: a maximum LBT failure count for an active uplink BWP of the cell; or an LBT failure detection timer for the active uplink BWP of the cell. Determining an LBT failure may comprise determining that an active uplink BWP is occupied. Determining an LBT failure may comprise performing a clear channel assessment (CCA) check. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the uplink signal. A computer-readable medium may store instructions that, when executed, cause performance of the described method, additional operations and/or include the additional elements.

A wireless device may perform a method comprising multiple operations. The wireless device may initiate a beam failure recovery (BFR) procedure for a cell. The wireless device may trigger, during the BFR procedure, a listen-before-talk (LBT) failure recovery procedure. The wireless device may multiplex, in a medium access control (MAC) protocol data unit, at least one of a BFR MAC control element (CE) of the BFR procedure and an LBT failure MAC CE of the LBT failure recovery procedure based on: a logical channel priority of the BFR MAC CE; and a logical channel of the LBT failure MAC CE. The wireless device may send, to a base station, the MAC PDU. The wireless device may also perform one or more additional operations. The wireless device may determine a quantity of LBT failures for an active uplink bandwidth part (BWP) of the cell, wherein the triggering the LBT failure recovery procedure may be based on the quantity of LBT failures satisfying a threshold. The wireless device may abort and/or cancel the LBT failure recovery procedure based on receiving, during the LBT failure recovery procedure, LBT failure recovery reconfiguration parameters for the cell. The wireless device may abort and/or cancel the LBT failure recovery procedure based on receiving, during the LBT failure recovery procedure, downlink information indicating bandwidth part (BWP) switching for the cell. The wireless device may abort and/or cancel the LBT failure recovery procedure based on deactivating the cell during the LBT failure recovery procedure. The wireless device may abort and/or cancel the LBT failure recovery procedure based on receiving, by a MAC layer of the wireless device from a radio resource control (RRC) layer of the wireless device and during the LBT failure recovery procedure, a request to reset the MAC layer. The wireless device may complete the LBT failure recovery procedure based on receiving an uplink grant scheduling a new transmission for a hybrid automatic repeat request (HARQ) process, wherein an index of the HARQ process may be the same as an index of a HARQ process of a physical uplink scheduled channel (PUSCH) transmission comprising the uplink signal. The wireless device may reset, based on completing the LBT failure recovery procedure: an LBT counter; and an LBT failure detection timer. The wireless device may receive one or more messages comprising one or more configuration parameters for the cell, wherein the one or more configuration parameters may indicate one or more of: a maximum LBT failure count for an active uplink BWP of the cell; or an LBT failure detection timer for the active uplink BWP of the cell. Determining an LBT failure may comprise determining that an active uplink BWP is occupied. Determining an LBT failure may comprise performing a clear channel assessment (CCA) check. Sending the MAC PDU may comprise sending the MAC PDU with a logical channel of the BFR MAC CE before a logical channel of the LBT failure MAC CE. Sending the MAC PDU may comprise sending the MAC PDU with a logical channel of the LBT failure MAC CE before a logical channel of the BFR MAC CE. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the MAC PDU. A computer-readable medium may store instructions that, when executed, cause performance of the described method, additional operations and/or include the additional elements.

A wireless device may perform a method comprising multiple operations. The wireless device may trigger transmission of a: listen-before-talk (LBT) failure medium access control (MAC) control element (CE); and beam failure recovery (BFR) MAC CE. The wireless device may prioritize a logical channel of the BFR MAC CE over a logical channel of the LBT failure MAC CE by including the BFR MAC CE in a MAC protocol data unit (PDU) before the LBT failure MAC CE. The wireless device may send, to a base station, the MAC PDU. The wireless device may also perform one or more additional operations. The wireless device may prioritize the logical channel of the LBT failure MAC CE over data by including the LBT failure MAC CE in the MAC PDU before the data. The wireless device may prioritize the logical channel of the LBT failure MAC CE over a logical channel of a buffer status report (BSR) MAC CE by including the LBT failure MAC CE in the MAC PDU before the BSR MAC CE. The wireless device may prioritize a logical channel of a configured grant confirmation MAC CE over the logical channel of the LBT failure MAC CE by including the configured grant confirmation MAC CE in the MAC PDU before the LBT failure MAC CE. The wireless device may determine a quantity of LBT failures for an active uplink bandwidth part (BWP) of a cell, wherein the triggering the LBT failure MAC CE may be based on the quantity of LBT failures satisfying a threshold. The wireless device may abort and/or cancel an LBT failure recovery procedure based on receiving, during the LBT failure recovery procedure, LBT failure recovery reconfiguration parameters for a cell. The wireless device may abort and/or cancel an LBT failure recovery procedure based on receiving, during the LBT failure recovery procedure, downlink information indicating bandwidth part (BWP) switching for a cell. The wireless device may abort and/or cancel an LBT failure recovery procedure based on deactivating a cell during the LBT failure recovery procedure. The wireless device may abort and/or cancel an LBT failure recovery procedure based on receiving, by a MAC layer of the wireless device from a radio resource control (RRC) layer of the wireless device and during the LBT failure recovery procedure, a request to reset the MAC layer. The wireless device may complete an LBT failure recovery procedure based on receiving an uplink grant scheduling a new transmission for a hybrid automatic repeat request (HARQ) process, wherein an index of the HARQ process may be the same as an index of a HARQ process of a physical uplink scheduled channel (PUSCH) transmission comprising the MAC PDU. The wireless device may reset, based on completing an LBT failure recovery procedure: an LBT counter; and an LBT failure detection timer. The wireless device may receive one or more messages comprising one or more configuration parameters for a cell, wherein the one or more configuration parameters may indicate one or more of: a maximum LBT failure count for an active uplink BWP of the cell; or an LBT failure detection timer for the active uplink BWP of the cell. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the MAC PDU. A computer-readable medium may store instructions that, when executed, cause performance of the described method, additional operations and/or include the additional elements.

A wireless device may perform a method comprising multiple operations. The wireless device may determine a quantity of listen-before-talk (LBT) failures for an active uplink bandwidth part (BWP) of a cell. The wireless device may send, based on the quantity satisfying a threshold, an uplink signal associated with an LBT failure recovery procedure for the active uplink BWP of the cell. The wireless device may abort and/or cancel the LBT failure recovery procedure. The wireless device may set, based on the aborting and/or cancelling, the quantity of LBT failures to zero. The wireless device may also perform one or more additional operations. Aborting and/or cancelling the LBT failure recovery procedure may comprise aborting and/or cancelling the LBT failure recovery procedure based on at least one of: receiving, during the LBT failure recovery procedure, LBT failure recovery reconfiguration parameters for the cell; receiving, during the LBT failure recovery procedure, downlink information indicating BWP switching for the cell; deactivating the cell during the LBT failure recovery procedure; or receiving, by a medium access control (MAC) layer of the wireless device from a radio resource control (RRC) layer of the wireless device and during the LBT failure recovery procedure, a request to reset the MAC layer. Determining the quantity of LBT failures may comprise determining the quantity during a random access procedure associated with the cell. Determining the quantity of LBT failures may comprise determining the quantity during a random access procedure associated with the cell. The wireless device may stop the random access procedure. The wireless device may initiate a beam failure recovery procedure for the cell. The wireless device may cause transmission of: an LBT MAC control element (LBT MAC CE) for the LBT failure recovery procedure; and a beam failure recovery MAC control element (BFR MAC CE) for the beam failure recovery procedure. The wireless device may send a MAC protocol data unit (MAC PDU) comprising a logical channel of the BFR MAC CE before a logical channel of the LBT MAC CE. Sending the uplink signal may comprise sending the uplink signal via a second cell different from the cell. The uplink signal may comprise at least one of: a random access preamble; a scheduling request; or an LBT MAC control element. The wireless device may increment an LBT counter of the cell based on determining an LBT failure of the cell. The wireless device may set, based on aborting and/or cancelling the LBT failure recovery procedure, the LBT counter to zero. The wireless device may receive one or more messages comprising one or more configuration parameters for the cell, wherein the one or more configuration parameters may indicate one or more of: a maximum LBT failure count for the active uplink BWP of the cell; or an LBT failure detection timer for the active uplink BWP of the cell. Determining an LBT failure of the quantity of LBT failures for the active uplink BWP may comprise determining that the active uplink BWP is occupied. Determining an LBT failure of the quantity of LBT failures for the active uplink BWP may comprise performing a clear channel assessment (CCA) check. The wireless device may start or restart an LBT failure detection timer based on the determining an LBT failure of the quantity of LBT failures. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the uplink signal. A computer-readable medium may store instructions that, when executed, cause performance of the described method, additional operations and/or include the additional elements.

A wireless device may perform a method comprising multiple operations. The wireless device may determine a quantity of listen-before-talk (LBT) failures for an active uplink bandwidth part (BWP) of a cell. The wireless device may, based on the quantity satisfying a threshold, send, via a second cell different from the cell, an uplink signal associated with an LBT failure recovery procedure for the active uplink BWP of the cell. The wireless device may also perform one or more additional operations. The wireless device may abort and/or cancel the LBT failure recovery procedure based on at least one of: receiving, during the LBT failure recovery procedure, LBT failure recovery reconfiguration parameters for the cell; receiving, during the LBT failure recovery procedure, downlink information indicating BWP switching for the cell; deactivating the cell during the LBT failure recovery procedure; or receiving, by a medium access control (MAC) layer of the wireless device from a radio resource control (RRC) layer of the wireless device and during the LBT failure recovery procedure, a request to reset the MAC layer. Determining the quantity of LBT failures may comprise determining the quantity during a random access procedure associated with the cell. Determining the quantity of LBT failures may comprise determining the quantity during a random access procedure associated with the cell. The wireless device may stop the random access procedure. The wireless device may initiate a beam failure recovery procedure for the cell. The wireless device may cause transmission of: an LBT MAC control element (LBT MAC CE) for the LBT failure recovery procedure; and a beam failure recovery MAC control element (BFR MAC CE) for the beam failure recovery procedure. The wireless device may send a MAC protocol data unit (MAC PDU) comprising a logical channel of the BFR MAC CE before a logical channel of the LBT MAC CE. The uplink signal may comprise at least one of: a random access preamble; a scheduling request; or an LBT MAC control element. The wireless device may increment an LBT counter of the cell based on determining an LBT failure of the cell. The wireless device may set, based on aborting and/or cancelling the LBT failure recovery procedure, the LBT counter to zero. The wireless device may receive one or more messages comprising one or more configuration parameters for the cell, wherein the one or more configuration parameters may indicate one or more of: a maximum LBT failure count for the active uplink BWP of the cell; or an LBT failure detection timer for the active uplink BWP of the cell. Determining an LBT failure of the quantity of LBT failures for the active uplink BWP may comprise determining that the active uplink BWP is occupied. Determining an LBT failure of the quantity of LBT failures for the active uplink BWP may comprise performing a clear channel assessment (CCA) check. The wireless device may start or restarting an LBT failure detection timer based on the determining an LBT failure of the quantity of LBT failures. The wireless device may set an LBT counter to zero based on an expiry of the LBT failure detection timer. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the uplink signal. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
    determining, by a wireless device, a quantity of listen-before-talk (LBT) failures for an active uplink bandwidth part (BWP) of a cell;
    sending, based on the quantity satisfying a threshold, an uplink signal associated with an LBT failure recovery procedure for the active uplink BWP of the cell; and
    cancelling the LBT failure recovery procedure based on at least one of:
        receiving, by the wireless device and during the LBT failure recovery procedure, LBT failure recovery reconfiguration parameters for the cell;
        receiving, by the wireless device and during the LBT failure recovery procedure, downlink information indicating BWP switching for the cell;
        deactivating the cell during the LBT failure recovery procedure; or
        receiving, by a medium access control (MAC) layer of the wireless device from a radio resource control (RRC) layer of the wireless device and during the LBT failure recovery procedure, a request to reset the MAC layer.

2. The method of claim 1, further comprising:
    setting, based on the cancelling the LBT failure recovery procedure, the quantity of LBT failures to zero.

3. The method of claim 1, wherein the determining the quantity of LBT failures comprises determining the quantity during a random access procedure associated with the cell.

4. The method of claim 1, further comprising: cancelling, based on the quantity of LBT failures, a random access procedure associated with the cell, wherein the sending the uplink signal is based on the cancelling the random access procedure.

5. The method of claim 1, further comprising:
    initiating a beam failure recovery procedure for the cell;
    causing transmission of:
        an LBT MAC control element (LBT MAC CE) for the LBT failure recovery procedure; and
        a beam failure recovery MAC control element (BFR MAC CE) for the beam failure recovery procedure; and
    sending a MAC protocol data unit (MAC PDU) comprising a logical channel of the BFR MAC CE preceding a logical channel of the LBT MAC CE.

6. The method of claim 1, wherein the sending the uplink signal comprises sending the uplink signal via a second cell different from the cell.

7. The method of claim 1, wherein the uplink signal comprises at least one of:
    a random access preamble;
    a scheduling request; or
    an LBT MAC control element.

8. A method comprising:
    determining, by a wireless device, a quantity of listen-before-talk (LBT) failures for an active uplink bandwidth part (BWP) of a cell;
    sending, based on the quantity satisfying a threshold, an uplink signal associated with an LBT failure recovery procedure for the active uplink BWP of the cell; and
    cancelling the LBT failure recovery procedure based on receiving, by the wireless device and during the LBT failure recovery procedure, reconfiguration parameters for the cell.

9. The method of claim 8, wherein cancelling the LBT failure recovery procedure is further based on at least one of:
    receiving, during the LBT failure recovery procedure, downlink information indicating BWP switching for the cell;
    deactivating the cell during the LBT failure recovery procedure; or
    receiving, by a medium access control (MAC) layer of the wireless device from a radio resource control (RRC) layer of the wireless device and during the LBT failure recovery procedure, a request to reset the MAC layer.

10. The method of claim 8, wherein the reconfiguration parameters for the cell comprise LBT failure recovery reconfiguration parameters for the cell.

11. The method of claim 8, wherein cancelling the LBT failure recovery procedure comprises dropping a configured transmission associated with the LBT failure recovery procedure.

12. The method of claim 8, further comprising: cancelling, based on the quantity of LBT failures, a random access procedure associated with the cell, wherein the sending the uplink signal is based on the cancelling the random access procedure.

13. The method of claim 8, further comprising:
    initiating a beam failure recovery procedure for the cell;
    causing transmission of:
        an LBT MAC control element (LBT MAC CE) for the LBT failure recovery procedure; and
        a beam failure recovery MAC control element (BFR MAC CE) for the beam failure recovery procedure; and
    sending a MAC protocol data unit (MAC PDU) comprising a logical channel of the BFR MAC CE preceding a logical channel of the LBT MAC CE.

14. The method of claim 8, wherein the sending the uplink signal comprises sending the uplink signal via a second cell different from the cell.

15. A method comprising:
    sending, by a wireless device and based on a determination of one or more listen-before-talk (LBT) failures for an active uplink bandwidth part (BWP) of a cell, an uplink signal associated with an LBT failure recovery procedure for the active uplink BWP of the cell; and cancelling the LBT failure recovery procedure based on receiving, by the wireless device and during the LBT failure recovery procedure, downlink information indicating BWP switching for the cell.

16. The method of claim 15, wherein the sending the uplink signal is based on a quantity of the one or more LBT failures exceeding a threshold.

17. The method of claim 15, wherein cancelling the LBT failure recovery procedure is further based on at least one of:

receiving, during the LBT failure recovery procedure, LBT failure recovery reconfiguration parameters for the cell;

deactivating the cell during the LBT failure recovery procedure; or receiving, by a medium access control (MAC) layer of the wireless device from a radio resource control (RRC) layer of the wireless device and during the LBT failure recovery procedure, a request to reset the MAC layer.

18. The method of claim 15, wherein cancelling the LBT failure recovery procedure comprises dropping a configured transmission associated with the LBT failure recovery procedure.

19. The method of claim 15, further comprising: cancelling, based on the one or more LBT failures, a random access procedure associated with the cell, wherein the sending the uplink signal is based on the cancelling the random access procedure.

20. The method of claim 15, further comprising:

initiating a beam failure recovery procedure for the cell;

causing transmission of:

an LBT MAC control element (LBT MAC CE) for the LBT failure recovery procedure; and a beam failure recovery MAC control element (BFR MAC CE) for the beam failure recovery procedure; and sending a MAC protocol data unit (MAC PDU) comprising a logical channel of the BFR MAC CE before a logical channel of the LBT MAC CE.

* * * * *

UNITED STATES PATENT AND TRADEMARK OFFICE
CERTIFICATE OF CORRECTION

PATENT NO. : 11,950,279 B2
APPLICATION NO. : 17/038742
DATED : April 2, 2024
INVENTOR(S) : Cirik et al.

Page 1 of 8

It is certified that error appears in the above-identified patent and that said Letters Patent is hereby corrected as shown below:

On the Title Page

In the References

Page 2, Column 1, Other Publications, Line 34:
Delete "Netwrok;" and insert --Network;--

Page 2, Column 1, Other Publications, Line 38:
Delete "specation" and insert --specification--

Page 2, Column 1, Other Publications, Line 38:
Delete "(Relesae" and insert --(Release--

Page 2, Column 1, Other Publications, Line 41:
Delete "Resorce" and insert --Resource--

Page 2, Column 2, Line 3:
Delete "deceting" and insert --detecting--

Page 2, Column 2, Line 8:
Delete "TitleL" and insert --Title:--

Page 2, Column 2, Line 9:
Delete "Deceting" and insert --Detecting--

Page 2, Column 2, Line 9:
Delete "Handing" and insert --Handling--

Page 2, Column 2, Line 11:
Delete "TitleL" and insert --Title:--

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 11,950,279 B2

Page 2, Column 2, Line 14:
Delete "ofconsistent" and insert --of consistent--

Page 2, Column 2, Line 15:
Delete "faliures." and insert --failures.--

Page 2, Column 2, Line 21:
Delete "LBTfailure" and insert --LBT failure--

Page 2, Column 2, Line 25:
Delete "dectection" and insert --detection--

Page 2, Column 2, Line 40:
Delete "Persisitentn" and insert --Persistent--

Page 2, Column 2, Line 43:
Delete "hadling" and insert --handling--

Page 2, Column 2, Line 55:
Delete "Dettection" and insert --Detection--

In the Specification

In the Detailed Description

Column 10, Line 42:
Delete "(TB s)" and insert --(TBs)--

Column 11, Line 42:
Delete "laters" and insert --layers--

Column 12, Line 10:
Delete "223" and insert --212--

Column 13, Line 39:
Delete "commands" and insert --commands.--

Column 27, Line 19:
Delete "DMRSs" and insert --DM-RSs--

Column 28, Line 7:
Delete "DMRSs)" and insert --DM-RSs)--

Column 33, Line 60:
Delete "rsrp-ThresholdCSl-RS)." and insert --rsrp-ThresholdCSI-RS).--

Column 35, Line 38:
Delete "0<s_id<14)," and insert --0≤s_id<14),--

Column 35, Line 40:
Delete "0<t_id<80)," and insert --0≤t_id<80),--

Column 35, Line 41:
Delete "0<fid<8)," and insert --0≤f_id<8),--

Column 44, Line 7:
Delete "multiuser" and insert --multi-user--

Column 47, Line 10:
Delete "running" and insert --running.--

Column 48, Line 18:
Delete "band" and insert --band.--

Column 49, Line 20:
Delete "channel" and insert --channel.--

Column 50, Line 63:
Delete "on/vian" and insert --on/via--

Column 52, Line 49:
Delete "T1, T2, T3, T4 and T5." and insert --$T_1$, $T_2$, $T_3$, $T_4$ and $T_5$.--

Column 52, Lines 52-53:
Delete "T1, T2, T3, T4, and T5)." and insert --$T_1$, $T_2$, $T_3$, $T_4$ and $T_5$.--

Column 52, Line 61:
Delete "T1)." and insert --$T_1$).--

Column 52, Line 67:
Delete "T1, T2, T3, T4, and T5." and insert --$T_1$, $T_2$, $T_3$, $T_4$, and $T_5$.--

Column 53, Line 25:
Delete "T1, T2, T3, T4 and T5." and insert --$T_1$, $T_2$, $T_3$, $T_4$ and $T_5$.--

Column 53, Line 29:
Delete "Tk)." and insert --$T_k$).--

Column 53, Line 45:
Delete "T5," and insert --$T_5$,--

Column 53, Line 53:

Delete "T5)," and insert --$T_5$),--

Column 56, Line 65:
Delete "T0)" and insert --$T_0$)--

Column 57, Line 25:
Delete "T0 to T4," and insert --$T_0$ to $T_4$,--

Column 57, Line 26:
Delete "T1 to time T4." and insert --$T_1$ to time $T_4$.--

Column 58, Line 47:
Delete "T0 and time T4" and insert --$T_0$ and time $T_4$--

Column 58, Line 59:
Delete "T0 and time T4" and insert --$T_0$ and time $T_4$--

Column 58, Line 60:
Delete "1908" and insert --1912--

Column 59, Line 15:
Delete "T0 and time T4" and insert --$T_0$ and time $T_4$--

Column 60, Line 4:
Delete "T1" and insert --$T_1$--

Column 61, Line 21:
Delete "T2)." and insert --$T_2$).--

Column 61, Line 33:
Delete "T3)" and insert --$T_3$)--

Column 62, Line 16:
Delete "T4)" and insert --$T_4$)--

Column 62, Line 42:
Delete "1924" and insert --1900--

Column 66, Line 46:
Delete "2114," and insert --2124,--

Column 66, Line 48:
Delete "1921," and insert --1920,--

Column 66, Line 49:
Delete "1914," and insert --1924,--

Column 66, Line 51:
Delete "T0, T1, T2, T3 and T4" and insert --$T_0$, $T_1$, $T_2$, $T_3$ and $T_4$--

Column 66, Line 52:
Delete "T0, T1, T2, T3 and T4" and insert --$T_0$, $T_1$, $T_2$, $T_3$ and $T_4$--

Column 66, Lines 63-64:
Delete "T0 and time T4)." and insert --$T_0$ and time $T_4$).--

Column 67, Line 6:
Delete "T0 and time T4)." and insert --$T_0$ and time $T_4$).--

Column 67, Line 17:
Delete "T0 and time T4)." and insert --$T_0$ and time $T_4$).--

Column 67, Lines 23-24:
Delete "T0 and time T4)." and insert --$T_0$ and time $T_4$).--

Column 67, Line 34:
Delete "T0 and time)." and insert --$T_0$ and time $T_4$).--

Column 67, Line 46:
Delete "T0 and time T4)." and insert --$T_0$ and time $T_4$).--

Column 67, Line 66:
Delete "T0 and time T4)." and insert --$T_0$ and time $T_4$).--

Column 68, Line 10:
Delete "T0 and time T4)." and insert --$T_0$ and time $T_4$).--

Column 68, Line 45:
Delete "T0 and time T4)." and insert "$T_0$ and time $T_4$).--

Column 69, Line 29:
Delete "cells" and insert --cells.--

Column 70, Line 33:
Delete "T1" and insert --$T_1$--

Column 70, Line 60:
Delete "T2" and insert --$T_2$--

Column 71, Line 14:
Delete "T4" and insert --$T_4$--

Column 71, Line 59:

CERTIFICATE OF CORRECTION (continued)
U.S. Pat. No. 11,950,279 B2

Delete "T4" and insert --$T_4$--

Column 72, Line 23:
Delete "of" and insert --or--

Column 72, Line 23:
Delete "T1" and insert --$T_1$--

Column 72, Line 28:
Delete "T4" and insert --$T_4$--

Column 72, Line 60:
Delete "T1" and insert --$T_1$--

Column 73, Line 2:
Delete "T2" and insert --$T_2$--

Column 74, Line 5:
Delete "he" and insert --the--

Column 74, Line 41:
Delete "DMRS" and insert --DM-RS--

Column 74, Line 42:
Delete "DMRS" and insert --DM-RS--

Column 77, Line 38:
Delete "T0," and insert --$T_0$,--

Column 77, Line 38:
Delete "T2" and insert --$T_2$--

Column 78, Line 31:
Delete "T1" and insert --$T_1$--

Column 79, Line 3:
Delete "T1)," and insert --$T_1$),--

Column 79, Line 6:
Delete "T1)," and insert --$T_1$),--

Column 79, Line 9:
Delete "T1" and insert --$T_1$--

Column 79, Line 33:
Delete "T1" and insert --$T_1$--

Column 81, Line 6:
Delete "T1" and insert --$T_1$--

Column 81, Line 11:
Delete "T1" and insert --$T_1$--

Column 81, Line 35:
Delete "T1" and insert --$T_1$--

Column 81, Line 42:
Delete "T1" and insert --T1--

Column 81, Line 48:
Delete "T1" and insert --$T_1$--

Column 82, Line 6:
Delete "T3" and insert --$T_3$--

Column 82, Line 21:
Delete "T3" and insert --$T_3$--

Column 82, Line 25:
Delete "T3" and insert --$T_3$--

Column 82, Line 30:
Delete "T3" and insert --$T_3$--

Column 82, Line 50:
Delete "T3" and insert --$T_3$--

Column 82, Line 58:
Delete "T3" and insert --$T_3$--

Column 82, Line 65:
Delete "T3" and insert --$T_3$--

Column 83, Line 2:
Delete "T3" and insert --$T_3$--

Column 83, Line 6:
Delete "T3" and insert --$T_3$--

Column 84, Line 13:
Delete "T1, T2, T3, T4, and T5" and insert --$T_1$, $T_2$, $T_3$, $T_4$, and $T_5$--

Column 84, Line 53:

Delete "T1, T2, T3, T4, and T5" and insert --$T_1$, $T_2$, $T_3$, $T_4$, and $T_5$--

Column 85, Line 42:
Delete "the the" and insert --the--

Column 96, Line 16:
Delete "Lab VIEWMathScript." and insert --LabVIEWMathScript.--

Column 97, Lines 20-21:
Delete "manner" and insert --manner.--